(12) United States Patent
Shimazaki et al.

(10) Patent No.: US 7,545,829 B2
(45) Date of Patent: Jun. 9, 2009

(54) LAYERED NETWORK NODE, NETWORK INCORPORATING THE SAME, NODE, AND LAYERED NETWORK

(75) Inventors: Daisaku Shimazaki, Tokorozawa (JP); Eiji Oki, Tokyo (JP); Naoaki Yamanaka, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1048 days.

(21) Appl. No.: 10/678,298

(22) Filed: Oct. 3, 2003

(65) Prior Publication Data
US 2004/0081105 A1 Apr. 29, 2004

(30) Foreign Application Priority Data
Oct. 7, 2002 (JP) ............................. 2002-293679
Feb. 14, 2003 (JP) ............................. 2003-036801

(51) Int. Cl.
*H04J 140/00* (2006.01)
(52) U.S. Cl. ...................................... 370/468; 370/238
(58) Field of Classification Search ................. 370/238, 370/252–255, 468–469
See application file for complete search history.

(56) References Cited

U.S. PATENT DOCUMENTS

| 5,831,982 | A |   | 11/1998 | Hummel |  |
|---|---|---|---|---|---|
| 5,854,899 | A | * | 12/1998 | Callon et al. | ................. 709/238 |
| 6,026,077 | A |   | 2/2000 | Iwata |  |
| 6,385,201 | B1 |   | 5/2002 | Iwata |  |
| 6,744,774 | B2 | * | 6/2004 | Sharma | ...................... 370/401 |
| 6,856,627 | B2 | * | 2/2005 | Saleh et al. | .................. 370/397 |
| 6,973,023 | B1 | * | 12/2005 | Saleh et al. | .................. 370/217 |
| 7,136,357 | B2 | * | 11/2006 | Soumiya et al. | ............. 370/236 |

| 2002/0091855 | A1 | * | 7/2002 | Yemini et al. | ............... 709/238 |
|---|---|---|---|---|---|

FOREIGN PATENT DOCUMENTS

CN  1154772  7/1997

(Continued)

OTHER PUBLICATIONS

Chinese Office Action dated Nov. 4, 2005 issued on Chinese Patent Application No. 03165951.3.

(Continued)

*Primary Examiner*—Ricky Ngo
*Assistant Examiner*—Dady Chery
(74) *Attorney, Agent, or Firm*—Harness, Dickey & Pierce, P.L.C.

(57) ABSTRACT

A layered network node of which a network it belongs is divided up into cells which are constituted by a plurality of nodes; the cells are defined as virtual nodes; if links exist which connect the interiors of the virtual nodes and the exterior, contact points between them are defined as interfaces of the virtual nodes; the virtual network constituted by the virtual nodes is further divided up into cells and making them into virtual nodes; said virtual network is defined as a network of a higher level with respect to the initial virtual network; by performing said operation of division into cells and making into virtual nodes once or a plurality of times, the layered network is constituted; path computation is performed from the source node to a destination node in a stepwise manner by dispersing it over the various layers.

61 Claims, 53 Drawing Sheets

FOREIGN PATENT DOCUMENTS

| | | |
|---|---|---|
| CN | 1159690 | 9/1997 |
| JP | 10-4405 | 1/1998 |
| JP | 10-65733 | 3/1998 |
| JP | 10-145362 | 5/1998 |
| JP | 11-205331 | 7/1999 |
| WO | WO 95/34973 | 12/1995 |

OTHER PUBLICATIONS

K. Sato, N. Yamanaka, et al.; "GMPLS-Based Photonic Multilayer Router (Hikari Router) Architecture: An Overview of Traffic Engineering and Signaling Technology"; IEEE Commun. Mag.; vol. 40, Issue 3, Mar. 2002.

E. Oki, N. Yamanaka, et al.; "A Heuristic Multi-Layer Optimum Topology Design Scheme Based on Traffic Measurement for IP + Photonic Networks"; Optical Fiber Communication Conference and Exhibit; pp. 17-22, Mar. 2002.

"Issues in photonic internet; Impact on the Internet architecture of GMPLS protocols", SIG Technical Reports 2002-QAI-4-6.

* cited by examiner

L1, L2··· DENOTE LEVEL 1, LEVEL 2···

|  | a1 | a2 | b | c1 | c2 |
|---|---|---|---|---|---|
| a1 | PSC, LSC | PSC, LSC | PSC | PSC | PSC, LSC |
| a2 | PSC, LSC | PSC, LSC | PSC | PSC | PSC, LSC |
| b | PSC | PSC | PSC | PSC | PSC |
| c1 | PSC | PSC | PSC | PSC | PSC |
| c2 | PSC, LSC | PSC, LSC | PSC | PSC | PSC |

FIG. 8
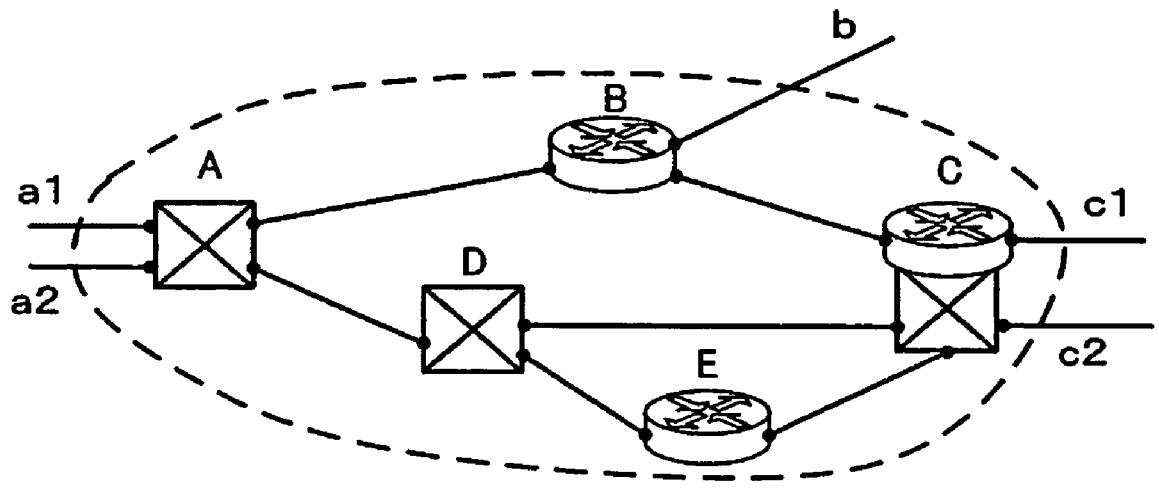
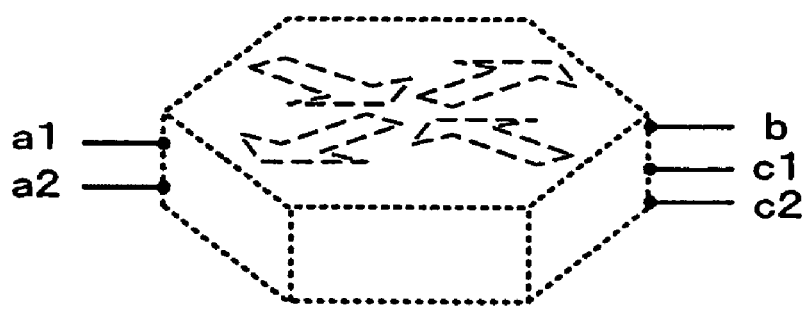

COSTS ALLOCATED INDIVIDUALLY

AS THIS COST, THE COST IS ALLOTTED
OF THE MINIMUM COST PATH
FROM AMONG THE PATH CANDIDATES
A-B-C, A-D-C, AND A-D-E-C

|    | a1        | a2        | b    | c1   | c2        |
|----|-----------|-----------|------|------|-----------|
| a1 | PSC、LSC   | PSC、LSC   | PSC  | PSC  | PSC、LSC   |
| a2 | PSC、LSC   | PSC、LSC   | PSC  | PSC  | PSC、LSC   |
| b  | PSC       | PSC       | PSC  | PSC  | PSC       |
| c1 | PSC       | PSC       | PSC  | PSC  | PSC       |
| c2 | PSC、LSC   | PSC、LSC   | PSC  | PSC  | PSC       |

...

COSTS ALLOCATED INDIVIDUALLY

AS THIS COST, THE COST IS ALLOTTED
OF THE MINIMUM COST PATH
FROM AMONG THE PATH CANDIDATES
A-B-C AND A-D-C

P: NUMBER OF AVAILABLE PSC INTERFACES

W: NUMBER OF AVAILABLE LSC INTERFACES

PSC cost=1/P
LSC cost=1/W

P: NUMBER OF AVAILABLE PSC INTERFACES
PT: TOTAL NUMBER OF PSC INTERFACES

W: NUMBER OF LSC AVAILABLE INTERFACES
WT: TOTAL NUMBER OF LSC INTERFACES

PSC cost=1-P/PT
LSC cost=1-W/WT

FIG. 15
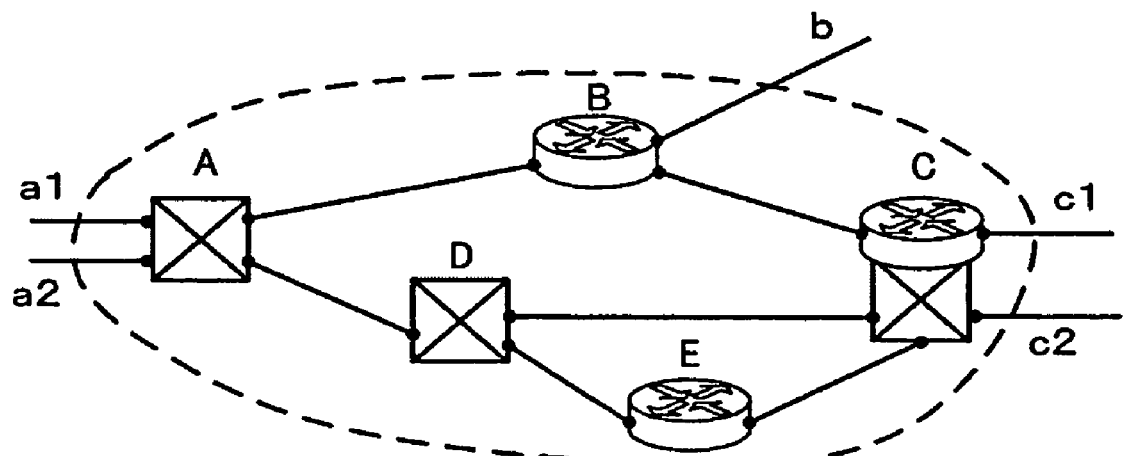
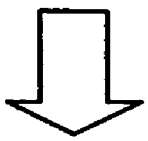
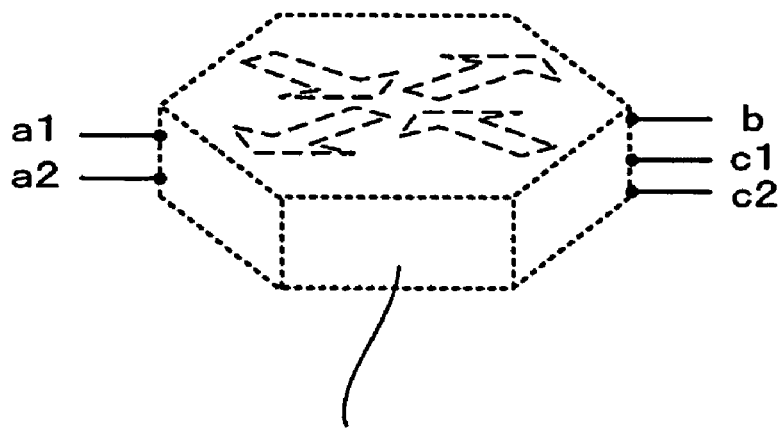
P: NUMBER OF AVAILABLE PSC INTERFACES
W: NUMBER OF AVAILABLE LSC INTERFACES
PSC cost=1/P
LSC cost=1/W P: TOTAL NUMBER OF AVAILABLE PSC INTERFACES
PT: TOTAL NUMBER OF PSC INTERFACES
W: TOTAL NUMBER OF AVAILABLE LSC INTERFACES
WT: TOTAL NUMBER OF LSC INTERFACES PSC cost=1-P/PT
LSC cost=1-W/WT

SOURCE NODE

THIS BORDER ROUTER PERFORMS PATH COMPUTATION WITHIN THIS CELL

DESTINATION NODE

SOURCE NODE

FOR PATH COMPUTATION WITHIN THIS CELL, THIS BORDER ROUTER DIVIDES UP INTO NODES WITHIN THE CELL AND PERFORMS COMPUTATION

DESTINATION NODE

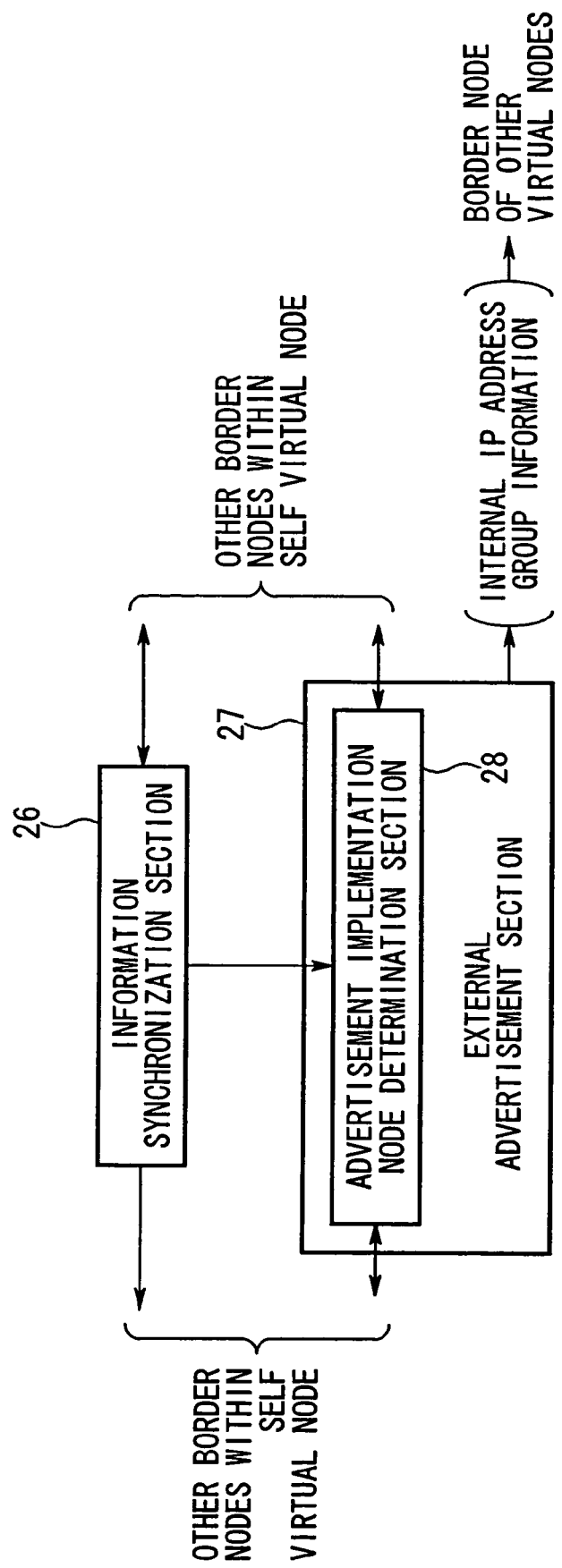

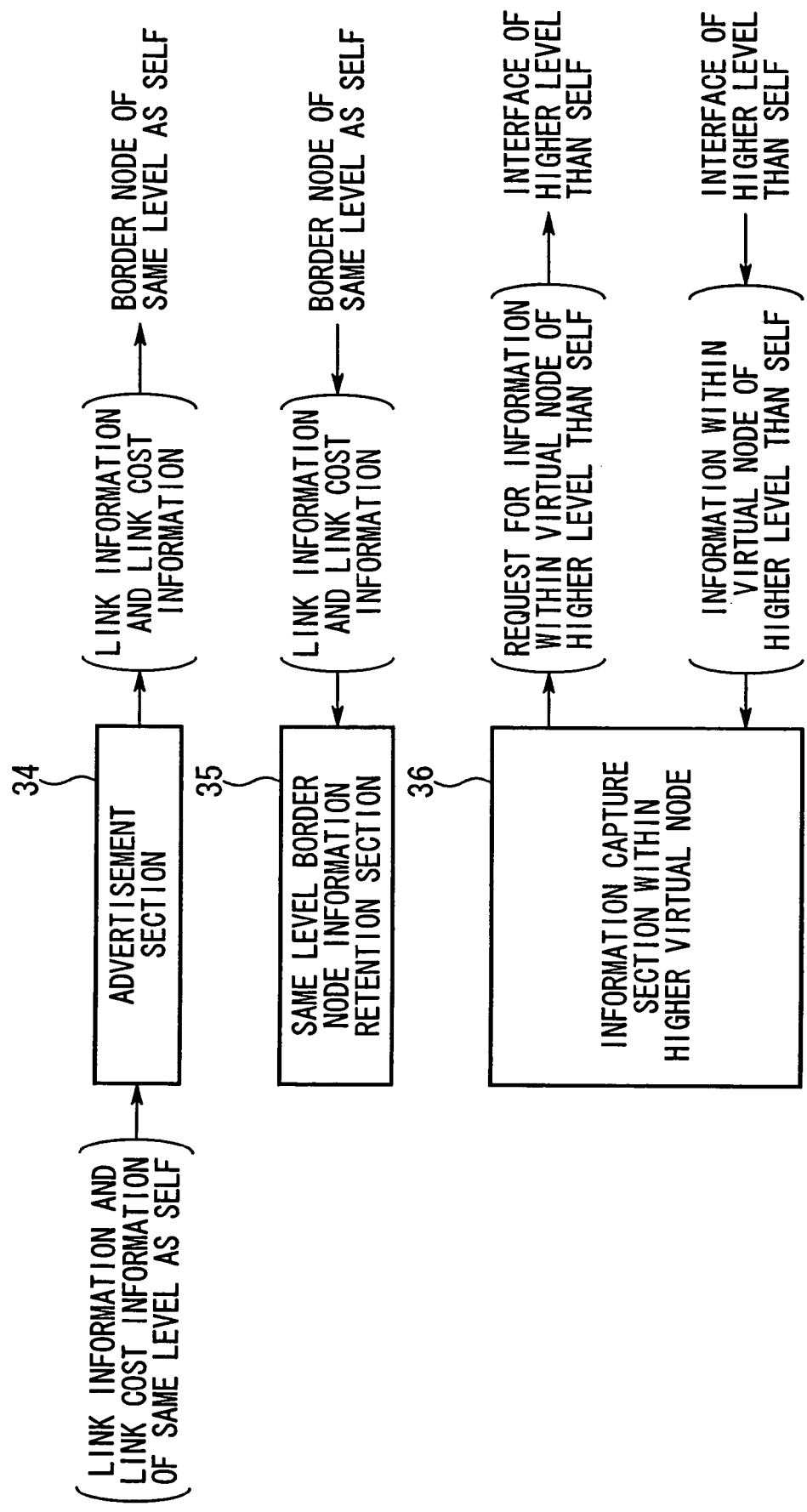

FIG. 50

STEP 1: SPECIFY POSITION OF DESTINATION NODE #8 (SOURCE NODE #1)

STEP 2: HIGHEST LEVEL COMPUTATION POSSIBLE VIRTUAL NODES #4 AND #9 AND SEARCH PATH

STEP 3: HIGHEST LEVEL COMPUTATION POSSIBLE VIRTUAL NODES #4 AND #9 AND NOTIFY PATH

STEP 4: SEARCH PATH UNTIL VIRTUAL NODES #4 AND #9 (DESTINATION NODE #8)

STEP 5: SELECT MINIMUM LINK COST PATH

STEP 6: NOTIFY MINIMUM LINK COST PATH

STEP 7: ESTABLISH LSP

STEP 8: ESTABLISH LSP

FIG. 54
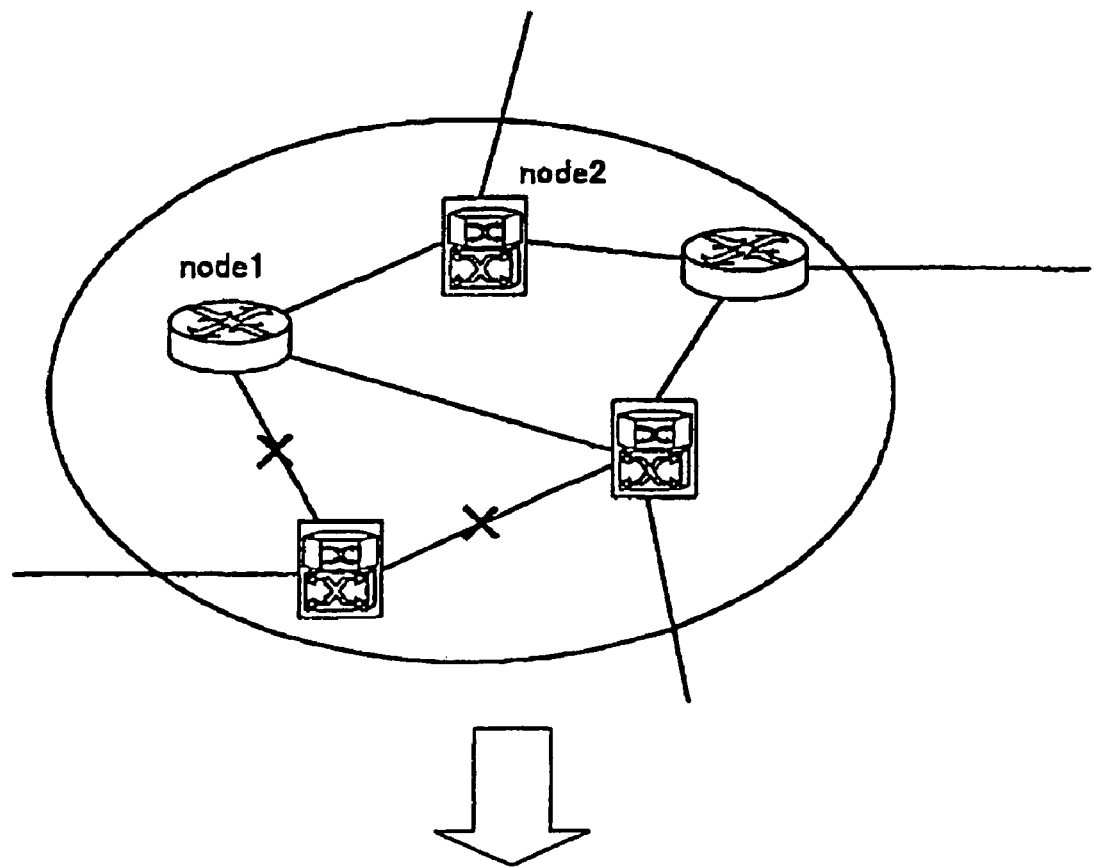
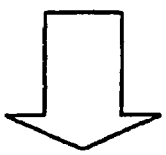
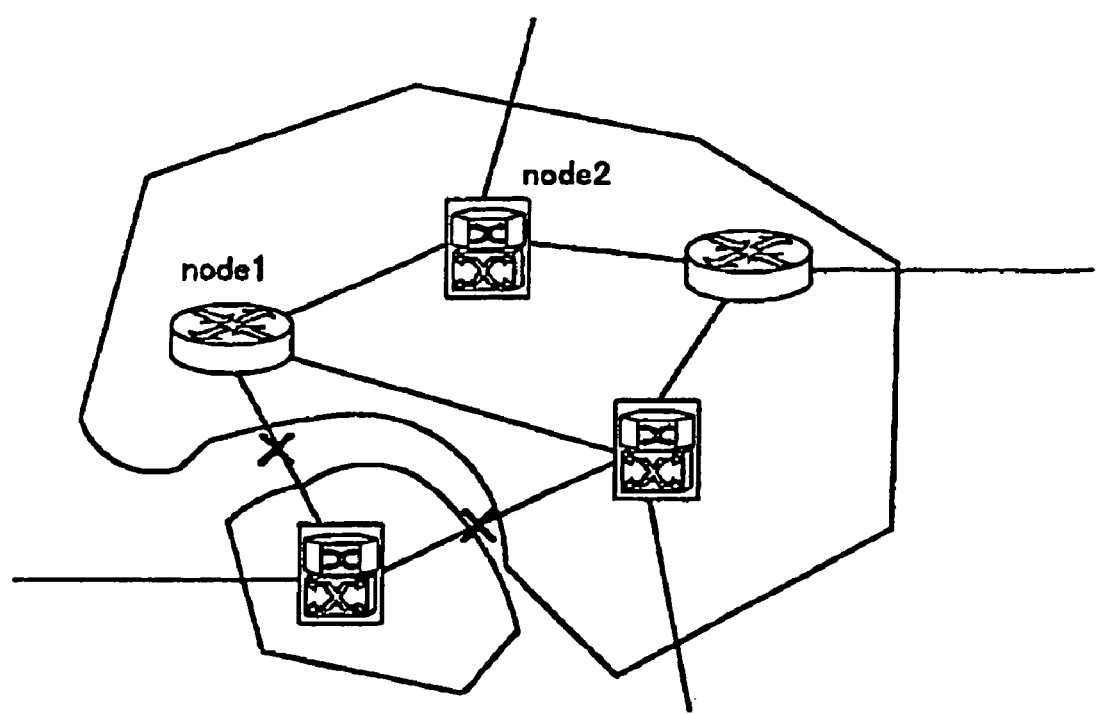

LAYERED NETWORK NODE, NETWORK INCORPORATING THE SAME, NODE, AND LAYERED NETWORK

BACKGROUND OF THE INVENTION

1. Field of the Invention

The present invention relates to construction technology for a path networks which conduct traffic engineering such as route selection and rearrangement of paths. In particular, the present invention relates to a layered network node, a network incorporating the same, a node, and a layered network.

Priority is claimed on Japanese Patent Application No. 2002-293679 filed on Oct. 7, 2002 and Japanese Patent Application No. 2003-036801 filed on Feb. 14, 2003, the contents of which are incorporated herein by reference.

2. Description of Related Art

In the case of networks in which plural layers are intermixed with each other, network management for each layer is often conducted in each layer individually. The network management differs depending on the layer, and there may be mentioned a central-control method in which one apparatus monitors all conditions of the network and controls, and a distributed-control method in which all nodes in the network share information by exchanging the link state. In addition to these, limiting only one layer control, there is a method which divides a network into plural areas, and manages the areas individually.

In the case of conducting distributed-control multi-layer traffic engineering under conditions in which networks of plural layers are intermixed with each other, conventionally, traffic engineering was conducted for the entire network (see, for example, the following documents No. 1 and No. 2). Therefore, there are problems in that a large scale network is enlarged because the information content which is generally treated using routing protocol is represented by OPSF (Open Shortest Path First), etc. Document No. 1

K. Sato, N. Yamanaka, et al., "GMPLS-based photonic multilayer router (Hikari router) architecture: an overview of traffic engineering and signaling technology," IEEE Commun. Mag., Vol. 40, Issue 3, March 2002 Document No. 2

E. Oki, N. Yamanaka, et al., "A heuristic multi-layer optimum topology design scheme based on traffic measurement for IP+ photonic networks," Optical Fiber Communication Conference and Exhibit, pp. 17-22, March 2002

This problem will be explained in more detail. FIG. 62 shows a network being comprised by plural network layers. In this example, the network is comprised by an IP layer and a TDM (Time Division Multiplex) layer and a wavelength layer. In this network, each node advertises a link state which is composed from a IP address, a maximum broad band, a band for use, and so on.

A node for setting paths sets paths by conducting calculation based on this link stage whether a TDM path and a Lambda path are to be newly set or not. Also, the node for setting paths sets paths by conducting calculations based on the link stage to find which path will provide minimum cost. In the case of conducting rearrangement of a route of some IP path, at the same time, a calculation is performed to find necessity of rearrangement of a Lambda path in a lower level. In this kind of network, along with enlargement of the network scale, process load such as advertisement volume of link states, calculation amount of route computation, etc., increases. Therefore, scale ability cannot be maintained at some constant scale. The same thing can be said concerning increment of layer to be treated generally.

SUMMARY OF THE INVENTION

The present invention is made in view of the above and an object thereof is to provide a layered network node, a network, layered route selection method, a program, and a recording medium which can realize enlargement to a large scaled network, and moreover, which can avoid ineffective calculation by identifying areas of layers which need route computation, and thus, route computation can be conducted effectively.

Also, the present invention has an object to provide a node, a layered network, a network control apparatus, and a construction method of a layered network which can realize enlargement to a large scale network even though the network requires complicated processes as multilayer network, and moreover, which can avoid ineffective calculation by identifying areas of layers which need route computation, and thus, route computation can be conducted effectively.

[Layered Network Node]

The layered network node according to the present invention and the network which incorporates it perform path computation from the source node to the destination node by dispersing it over the various layers in a stepwise manner. In this case, it is possible to implement expansion of the scale of a large scale network, since it is possible to keep the amount of computation upon each of the layers small, in comparison with a prior art example in which traffic engineering is performed for the network as a whole. Furthermore, since it is possible to perform the computation after having specified the range of layers over which path computation is to be required, it is possible to eliminate computation which would be inefficient, and it is possible to perform the path computation at high efficiency.

A first aspect of the present invention is a node which is provided in a network consisting of one or a plurality of layers, comprising: a means for mutually interchanging with other nodes information about the present node and links which are connected to the present node (hereinafter termed "link state information"); a means for storing link state information for one or for all of the nodes within said network which has been obtained by this interchanging means; a means for selecting a path for an LSP of one or a plurality of types of layer, based upon link state information which has been stored in said storing means according to an LSP establishment request; and a means for changing the path which has been selected and established by this selection means, according to an LSP change request, based upon link state information which has been stored in said storing means.

In the above, it is desirable for the present invention for the network to which said node belongs to be a layered network which is built up by: dividing up into cells which are constituted by a plurality of nodes; defining these cells as virtual nodes; if links exist which connect the interiors of the virtual nodes and the exterior, defining the contact points between these interiors of the virtual nodes and the exterior as interfaces of the virtual nodes; further dividing up the virtual network which has been constituted by the virtual nodes into cells; making them into virtual nodes; further dividing them up into cells; the virtual network which has been made into virtual nodes is defined as a network of a higher level with respect to the initial virtual network; and by performing the above described operation of division into cells and making into virtual nodes once or a plurality of times; and to comprise a link state database which accumulates link state information which is advertised from other nodes within the virtual node to which self node belongs or from other virtual nodes; with the nodes which fulfill a function of interfacing with nodes within the virtual node or with the exterior of the virtual node being defined as border nodes, and comprising: a link state abstraction section comprising a means for, when the present node is positioned at self border node, creating interface information for the exterior of the virtual node based upon link state information interior to the virtual node; and an advertisement section which advertises said interface information which has been created to the exterior of the virtual node. The node of the present invention will be termed a layered network node.

When this type of layered structure is defined, it becomes unnecessary to perform computation for the entire network all together, and it is possible to implement expansion of the scale of a large scale network, since it is possible to perform the computation for each of the hierarchical layers.

It is desirable for there to be further included a means for recognizing a link group, among a plurality of links which mutually connect virtual nodes together, which connects between the same virtual node; and a processing means for treating the links which are included within the link group which has been recognized by this recognition means as a single virtual link.

In this case, one of the virtual links can be constituted by a single optical LSP which is WDM (Wavelength Division Multiplexed).

Or alternatively, it is desirable for there to be further included: a means for recognizing a first link group, among a plurality of which mutually connect virtual nodes together, which connects between the same virtual node; a means for further classifying the first link group which has been recognized by said recognition means into second link groups which possess the same switching capability; and a processing means for treating the links which are included within the second link group which has been classified by said classification means as a single virtual link.

In this case, the virtual links with the same switching capability are defined in common, and it is possible to enhance the utilization efficiency of the hardware by allotting one of the optical LSPs which has, for example, been wavelength multiplexed (WDM) by units of switching capability.

The link state abstraction section may comprise a switching capability allotment means for performing allotment of the switching capability within the virtual node to which the present node belongs by a link which is connected to the present node to a link which corresponds to an interface which connects the virtual node and moreover to which the present node belongs and the exterior; and said interface information may be information about the switching capability which has been allotted to said interfaces by said switching capability allotment means.

In other words, by taking the information as to which switching capability is allotted to which link as interface information, in each virtual node, it is possible to ascertain the mutual connection relationships between the virtual nodes by units of switching capability.

Or, the link state abstraction section may comprise a switching capability allotment means for performing allotment of the switching capability within the virtual node to which the present node belongs by a link which is connected to the present node to a link which corresponds to an interface which connects the virtual node and moreover to which the present node belongs and the exterior; and a cost allotment means for allotting a transmission cost to each switching capability which has been allotted by said switching capability allotment means; and said interface information may be information about the switching capability which has been allotted to said interfaces by said switching capability allotment means, and information about the transmission costs which have been allocated to the switching capabilities of said interfaces by said cost allotment means.

In this case, along with the mutual connection relationships between the virtual nodes, it is also possible to ascertain the transmission cost when utilizing the link. Due to this, it is not the path for which the physical distance is the shortest which is simply taken as the shortest path; rather, it is possible to take the path for which the transmission cost is the least as the shortest path.

It is desirable for the information about the switching capability which has been allotted to said interfaces to be created in correspondence with each layer of an LSP which can be established between the present node as a border node or a virtual border node, and another border node or another virtual border node which belongs within the same virtual node.

In this case, it is possible to obtain information for each layer individually, and, since the path computation is performed for each layer individually, the utilization level is high.

The information about the switching capability which has been allotted to said interfaces may be information which is related to the switching capability of a border node or a virtual border node to which the link which constitutes said interface is directly connected.

It is desirable for said advertisement section to comprise a means for performing an advertisement to the exterior of the virtual node each time a change in switching capability of said border node occurs, or for said advertisement section to comprise a means for performing an advertisement to the exterior of the virtual node at a fixed interval. In this case, it is possible to obtain the newest information for each of the virtual nodes. It should be understood that, in the case of performing advertisement to the exterior of the virtual node at a fixed interval, it is often the case that the burden of advertisements is reduced, as compared with the case of performing advertisement to the exterior of the virtual node each time a change occurs in the switching capability.

The information about transmission cost may be generated as the reciprocal of the total number of interfaces which are not in use to which switching capability of said layer which is included in the virtual node is allotted.

In other words, the greater is the total number of interfaces which are not in use, the smaller is the transmission cost, since the greater does the available room for reception by the interfaces become.

Or, alternatively, the information about transmission cost may be generated, in relation to the number of interfaces to which switching capability of said layer which is included in the virtual node is allotted which are in use, and the total number of interfaces, as the number of interfaces in use divided by the total number of interfaces.

In other words, the smaller is the number of interfaces which are in use with respect to the total number of interfaces, the smaller is the transmission cost, since the greater does the available room for reception by the interfaces become.

It is desirable for said information about transmission cost, between a border node within the virtual node and another border node which belongs to the same border node as said border node, to be information which is determined for each layer of the LSP which is established as the cost when establishing a LSP of any layer.

In this case, it is possible to obtain information for each layer individually, and, since the path computation is performed for each layer individually, the utilization level is high.

It is desirable for said cost allotment means, for example, to comprise a means for calculating a cost value of the path for which the value, which is obtained by adding, along the path when establishing an LSP between a border node within the virtual node and another border node which belongs to the same border node as said border node, the link cost of the link and the node cost of the node or the virtual node, becomes minimum.

In this case, it is possible to select a path for which the cost is minimum by taking both the link cost and the node cost into account.

Or, it is desirable for said cost, for example, to be the value which is obtained by adding the link cost of the link and the node cost of the node or the virtual node along the path of the minimum number of hops which is established between a border node within the virtual node and another border node which belongs to the same border node as said border node; and for there to be comprised a means for, if there exists a plurality of said paths of the minimum number of hops, selecting from among cost value candidates which are aggregates of a plurality of values which are obtained by said addition, as the cost value, that one for which its value becomes minimum.

In this case, it is possible to select a path for which the cost is minimum by taking both the link cost and the node cost into account, and also according to the minimum number of hops.

The value which is obtained by said addition, for example, may be the reciprocal of the number of interfaces which are not in use to which switching capability of said layer which is included in the virtual nodes along said path is allotted.

In other words, the greater is the number of interfaces which are not in use, the smaller is the value which is obtained by said addition, since the greater does the available room for reception of said interfaces become. As has already been explained, the difference between the transmission cost and the value which is obtained by said addition is that, while the transmission cost is a value which has been determined in advance for each link, on the other hand, the value which is obtained by said addition is a value which is calculated according to the path.

Or, said value which is obtained by said addition may be given, for example, in relation to the number of interfaces to which switching capability of said layer which is included in the nodes along said path is allotted which are in use, and the total number of interfaces, by the number of interfaces used divided by the total number of interfaces.

In other words, the smaller is the number of interfaces which are in use with respect to the total number of interfaces, the smaller does the value which is obtained by said addition become, since the greater is the amount of room available for reception of the interfaces.

It is desirable for a node which corresponds to an interface of a virtual node to comprise a means for computing information about said transmission cost, or said cost, at a time interval which is fixed in advance, based upon said link state information; or for a node which corresponds to an interface of a virtual node to comprise a means for computing information about said transmission cost, or said cost, based upon said link state information, whenever change of the utilization state of the interface within the virtual node is notified by advertisement of link state information and the utilization state of the interface changes. In this case, each of the virtual nodes is able to obtain the newest information. It is often the case that the burden of computation when the computation is performed at a fixed time interval is lower, as compared with the case when the computation is performed each time a change in the utilization state of the interfaces takes place.

[Network Comprising a Layered Network Node]

A second aspect of the present invention is a network which comprises a layered network node according to the present invention.

[Layered Path Selection Method]

A third aspect of the present invention is a layered path selection method when establishing an LSP of any layer within a network which comprises a layered network node according to the present invention, in which procedures are executed of: when selecting a path from a source node to a destination node, deciding, by referring to said link state database of the lowest level 1, whether or not, among said virtual nodes of level 1, the destination node is present within a virtual node which includes the source node; if the source node and the destination node are not present within the same virtual node, deciding, by referring to said link state database of the next higher level 2, whether or not the destination node is present within a virtual node of said level 2 which includes the source node; by repeating this decision until the source node and the destination node are included within the same virtual node, selecting a virtual node of a level N (where N is a natural number) which includes both the source node and the destination node; when selecting a path of level N from the source node to the destination node within self virtual node of level N which has been selected, selecting the path selection of a virtual node group which is included within said virtual node of level N which has been selected by said selection means of said level N based upon said link state database of level N; when further selecting a path of the next lowest level (N−1) from the source node to the destination node from among the virtual nodes which are included in this path of level N which has been selected, selecting by said selection means of said level (N−1) based upon said link state database of the next lowest level (N−1) than said virtual node which has been selected; and by repeating this until the lowest level 1, selecting a path from the source node to the destination node.

In this case, a level which includes both the source node and the destination node is searched for, and an upper limit for the level is specified. Due to this, there is no object for path computation at levels higher than this one, and so it is possible to eliminate computation which will be useless. By doing this, the path computation is performed for each level individually by searching in order from the topmost level towards the lower levels. In this case, it is possible to implement increase of the scale of a large scale network, since the amount of computation is limited for each of the levels even if the scale of the network is increased.

Or alternatively, the third aspect of the present invention is a layered path selection method when establishing an LSP of any layer within a network which comprises a layered network node according to the present invention, in which procedures are executed of: when selecting a path from a source node to a destination node, in a network which is made up from virtual nodes of a topmost level N, deciding, by referring to said link state database of said level N, whether or not the source node and the destination node are present within the same virtual node; if the source node and the destination node are present within the same virtual node, deciding, by referring to said link state database of the next lower level (N−1) within self virtual node, whether or not the source node and the destination node are present within the same virtual node in the network of the next lower level (N−1) within self virtual node; selecting a virtual node of the level (N−k) which includes both the source node and the destination node, by repeating this decision until the source node and the destination node are included within different virtual nodes, and selecting the virtual node of the next highest level (N−k)

thereto (where k is a natural number); when selecting a path of level (N–k) from the source node to the destination node within self virtual node, selecting the path selection of a virtual node group which is included within said virtual node of level (N–k) which has been selected by said selection means of said level (N–k) based upon said link state database of said level (N–k); when further selecting a path of the next lowest level (N–k–1) from the source node to the destination node from among the virtual nodes which are included in this path of level (N–k) which has been selected, selecting by said selection means of said level (N–k–1) based upon said link state database of the next lowest level (N–k–1) than said virtual node which has been selected; and by repeating this until the lowest level 1, selecting a path from the source node to the destination node.

To compare the former method with the latter method, the procedures for searching for the level which includes both the source node and the destination node are different. With the former method, the search is performed in the direction from the lower levels in order towards the higher levels, while, with the latter method, the search is performed in the direction from the higher levels in order towards the lower levels.

For a virtual node of a lower level than the level which includes both said source node and said destination node, the computation for selecting the path within the present node may be performed by that border node, among the border nodes which are included within self virtual node, which is allotted as an input-output interface of said path.

Or, for a virtual node of a lower level than the level which includes both said source node and said destination node, the computation for selecting the path within the present node may be performed by that border node, among the border nodes which are included within self virtual node, which is determined in advance as a representative node.

As has been described above, it is possible to execute the computation procedure with high efficiency by determining the nodes for which the path computation is to be performed in advance. Furthermore, in the latter case, it is possible to reduce the tendency of the burden of the computation by shifting the node in order, each time one episode of computation of a representative node is completed.

[Program]

A fourth aspect of the present invention is a program which, by being installed upon an information processing device, causes said information processing device, when establishing an LSP of any layer within a network which comprises said layered network node, to execute procedures of: when selecting a path from a source node to a destination node, deciding, by referring to said link state database of the lowest level 1, whether or not, among said virtual nodes of level 1, the destination node is present within a virtual node which includes the source node; if the source node and the destination node are not present within the same virtual node, deciding, by referring to said link state database of the next higher level 2, whether or not the destination node is present within a virtual node of said level 2 which includes the source node; by repeating this decision until the source node and the destination node are included within the same virtual node, selecting a virtual node of a level N (where N is a natural number) which includes both the source node and the destination node; when selecting a path of level N from the source node to the destination node within self virtual node of level N which has been selected, selecting the path selection of a virtual node group which is included within said virtual node of level N which has been selected by said selection means of said level N based upon said link state database of level N; when further selecting a path of the next lowest level (N–1) from the source node to the destination node from among the virtual nodes which are included in this path of level N which has been selected, selecting by said selection means of said level (N–1) based upon said link state database of the next lowest level (N–1) than said virtual node which has been selected; and, by repeating this until the lowest level 1, selecting a path from the source node to the destination node.

Or, the fourth aspect of the present invention is a program which, by being installed upon an information processing device, causes said information processing device, when establishing an LSP of any layer within a network which comprises a layered network node according to Claim 1, to execute procedures of: when selecting a path from a source node to a destination node, in a network which is made up from virtual nodes of a topmost level N, deciding, by referring to said link state database of said level N, whether or not the source node and the destination node are present within the same virtual node; if the source node and the destination node are present within the same virtual node, deciding, by referring to said link state database of the next lower level (N–1) within self virtual node, whether or not the source node and the destination node are present within the same virtual node in the network of the next lower level (N–1) within self virtual node; selecting a virtual node of the level (N–k) which includes both the source node and the destination node, by repeating this decision until the source node and the destination node are included within different virtual nodes, and selecting the virtual node of the next highest level (N–k) thereto (where k is a natural number); when selecting a path of level (N–k) from the source node to the destination node within self virtual node, selecting the path selection of a virtual node group which is included within said virtual node of level (N–k) which has been selected by said selection means of said level (N–k) based upon said link state database of said level (N–k); when further selecting a path of the next lowest level (N–k–1) from the source node to the destination node from among the virtual nodes which are included in this path of level (N–k) which has been selected, selecting by said selection means of said level (N–k–1) based upon said link state database of the next lowest level (N–k–1) than said virtual node which has been selected; and by repeating this until the lowest level 1, selecting a path from the source node to the destination node.

[Recording Medium]

A fifth aspect of the present invention is a recording medium which can be read in by said information processing device, upon which is recorded a program according to the present invention. By recording the program of the present invention upon a recording medium, it is possible to install the program of the present invention upon said information processing device by using this recording medium. Or, it is possible to install the program of this preferred embodiment directly upon said information processing device via a network from a server upon which the program of the present invention is stored.

In this case, it is possible to implement extension of a large scale network by utilizing an information processing device such as a computer device, and, furthermore, since it is possible to perform the computation after having specified a range of layers upon which it is considered to be necessary to perform path computation, it is possible to eliminate computation which would be useless, and it is possible to implement a layered network node, a network, and a layered path selection method which can perform path computation at good efficiency.

As has been explained above, according to the layered network node and the network incorporating such a node according to the present invention, it is possible to implement increase of the scale of a large scale network. Furthermore, since it is possible to perform the computation after having specified a range of layers for which it is necessary to perform path computation, it is possible to eliminate computation which would become useless, and it is possible to perform path computation at high efficiency.

[Node, and Layered Network]

For a network in which the processing burden of the volume of link state advertisements, the amount of computation for the path computation, and so on is very great when the entire network is handled all together as a whole, with the node and the layered network according to the present invention, by introducing the general concept of a virtual node as explained below, dispersing processing of the processing burden of the network as a whole is performed by layering these virtual nodes, and by thus performing dispersal of the processing over the various virtual nodes.

In this case, it is possible to implement increase of the scale of the network even in the case of a network in which the processing burden of the network as a whole is very great. Since it is possible to perform the path computation after having specified the range over which said path computation is required, accordingly it is possible to perform the path computation with good efficiency.

[Node]

In other words, a sixth aspect of the present invention is a node which constitutes a virtual node of level 1 in a layered network which has been defined by dividing up the nodes which make up the network into cells each made up from one or a plurality of said nodes and defining these cells as virtual nodes of level 1, so that these virtual nodes of level 1 constitute a virtual network of level 1, further dividing up these virtual nodes of level 1 which constitute said virtual network of level 1 into cells which are constituted by one or a plurality of virtual nodes, so as to constitute virtual nodes of level 2, and constituting a layered network by virtual networks of levels 1 through N which have been built up by performing the process of dividing into cells and making into virtual nodes in this manner once or a plurality N of times, and by, if a link exists in said layered network which connects between different virtual nodes of the same level or of different levels, defining a node which corresponds to the point of contact between the interior of the virtual node upon this link and the exterior as an interface, so that, when the highest level virtual node to which said interface is related is of level M (where $M \leq N$), said interface serves as a plurality of hierarchical interfaces of level 1 through level M; and is a node which does not correspond to said interface.

In the above description, it is desirable for the present invention to include a means for advertising to an other node within self virtual node link information about a link which has been connected to self node and link cost information for said link; a means for receiving, from an other node within self virtual node, said advertisement of link information within self virtual node and link cost information for said link, and storing said information; and a means for receiving, from a node which corresponds to said interface within self virtual node, said advertisement of link information between said node and a node which corresponds to an interface with a virtual node of level 2 or greater, and link cost information for said link, and storing said information.

In this case, each node is able to store link information and link cost information for within self virtual node and also link information and link cost information between border nodes of other virtual nodes, so that it is possible to perform path computation based upon this information.

It is desirable for there to be further included a means for transmitting its own IP address to a node which corresponds to an interface of self virtual node; and a means for storing external IP address group information, which is information about an IP address of an other node which belongs to a virtual node other than self virtual node, and about the virtual node to which said IP address belongs, which have been transmitted from the node which corresponds to said interface. In this case, each node is able to be aware of the position of the node which it should take as its destination.

It is possible further to include a means for transmitting its own IP address to a node which corresponds to an interface of self virtual node; and a means for requesting and obtaining, from the node which corresponds to said interface, external IP address group information, which is information about an IP address of an other node which belongs to a virtual node other than self virtual node, and about the virtual node to which said IP address belongs.

In this case, each of the nodes is able, without storing the IP address group information, to receive offers of the IP address group information from the node which corresponds to the interface, according to requirements. Accordingly, it is possible to reduce the amount of data for each node.

It is possible further to include a means for transmitting its own IP address and link cost information between itself and a node which corresponds to an interface with self virtual node to the node which corresponds to said interface; and a means for storing external IP address group information, which is information about an IP address of an other node which belongs to a virtual node other than self virtual node, and about the virtual node to which said IP address belongs, which has been transmitted from the node which corresponds to said interface, and link cost information from the node which corresponds to said interface to said other node, in correspondence to the IP address of said other node. In this case, it is possible for each node to be aware of the position of the node which it should take as its destination, and of the link cost to said node.

It is also possible further to include a means for transmitting its own IP address and link cost information between itself and a node which corresponds to an interface with self virtual node to the node which corresponds to said interface; and a means for requesting and obtaining, from the node which corresponds to said interface, designates the IP address of said other node, external IP address group information, which is information about an IP address of an other node which belongs to a virtual node other than self virtual node, and about the virtual node to which said IP address belongs, and link cost information from the node which corresponds to said interface to said other node.

In this case, each node is able, without storing the IP address group information and the link cost information, to receive offers of the IP address group information from the node which corresponds to the interface, according to requirements. Accordingly, it is possible to reduce the amount of data for each node.

It is desirable to include a means for dispatching a packet for checking reachability to the node which corresponds to said interface of self virtual node. In this case, the node which corresponds to the interface is able to obtain information about reachability which is related to the other nodes.

It is also possible to include a means for computing respective link costs for nodes which correspond to a plurality of said interfaces of said virtual node, and for said dispatching means to include a means for dispatching a packet for checking reachability to the node which corresponds to said interface for which the link cost is the least, according to the results of computation by this computation means. In this case, the node which corresponds to the interface is able to obtain information about reachability which is related to the other nodes for which the link cost is the least.

It is also possible to include a means for computing respective link costs for nodes which correspond to a plurality of said interfaces of said virtual node, and for said dispatching means to include a means for dispatching packets for checking reachability to the nodes which correspond to said interfaces for which the link cost, according to the results of computation by this computation means, is the smallest in order until the nth, where n is a natural number. In this case, the node which corresponds to the interface is able to obtain information about reachability which is related to the other nodes for which the link cost is up to the n-th least.

It is possible to include a means for computing respective link costs for nodes which correspond to a plurality of said interfaces of said virtual node, and for said dispatching means to include a means for dispatching packets for checking reachability to the nodes which correspond to said interfaces for which the link cost, according to the results of computation by this computation means, is the smallest in order until the nth (where n is a natural number), said packets including information about said order.

In this case, the node which corresponds to the interface is able to obtain information which becomes a criterion of the reachability and the link cost which are related to the other node for which the link cost is the n-th least. This information which becomes a criterion can be implemented with an extremely small amount of data, as compared with the case of link cost information which has not been modified.

Or, it is possible to incorporate a means for advertising link information about a link which has been connected to self node to an other node within self virtual node and link cost information for said link; and a means for receiving said advertisement of link information within self virtual node and link cost information for said link from an other node within self virtual node, and storing said information.

In this case, the information which is stored by the node is limited to the information within self virtual node. Accordingly, it is possible to reduce the amount of data for the node. However, with only the information for within self virtual node, it is not possible to perform path computation which extends to other virtual nodes.

Here, it is desirable to incorporate a means for, ahead of path computation, requesting and obtaining, from said node which corresponds to said interface, link information between a node which corresponds to the interface with self virtual node and a node which corresponds to an interface with a virtual node of level 2 or higher, and link cost information for said link.

In this case it is possible for the node to store the minimum necessary amount of data, since it is possible to obtain information from the node which corresponds to the interface, according to the requirements for path computation.

A seventh aspect of the present invention is a node which corresponds to said interface, and which comprises a means for advertising to an other node within self virtual node link information about a link within self virtual node which has been connected to self node and link cost information for said link, and link information for a link with a node which corresponds to an interface of another virtual node which has been connected to self node, and link cost information for said link; a means for receiving said advertisement of link information within self virtual node and link cost information for said link from an other node within self virtual node, and storing said information; and a means for receiving, from a node which corresponds to said interface with another virtual node, advertisement of link information with a node which corresponds to said interface of a higher level, and link cost information for said link, and storing said information.

By the node which corresponds to the interface advertising to other nodes within self virtual node, it is possible for the nodes to obtain the link information and the link cost information.

It is desirable for there to be further included: a means for gathering together and storing IP address information from other nodes within self virtual node; a means for advertising the IP address information which has been gathered together by this gathering together and storing means to a node which corresponds to an interface of another virtual node; and a means for storing external IP address information, which is information about the IP address of another node which belongs to a virtual node other than self virtual node and about the virtual node to which said IP address belongs, and which has been advertised from the node which corresponds to the interface of the other virtual node, and transmitting it to another node within self virtual node.

It is possible for the nodes to obtain information about reachability by the node which corresponds to the interface advertising to the other nodes within self virtual node. There may be incorporated a means for gathering together and storing IP address information from other nodes within self virtual node; a means for advertising the IP address information which has been gathered together by this gathering together and storing means to a node which corresponds to an interface of another virtual node; a means for storing external IP address information, which is information about the IP address of another node which belongs to a virtual node other than self virtual node and about the virtual node to which said IP address belongs, and which has been advertised from the node which corresponds to the interface of the other virtual node; and a means for offering the external IP address group information which has been stored in said storing means to said other nodes, according to requests from said other nodes.

By the node which corresponds to the interface offering the external address group information according to requests from the other nodes, said other nodes need only to store the minimum amount of information which is required, since said other nodes are able to obtain external address group information according to requirements.

It is possible to incorporate a means for gathering together and storing IP address information from other nodes within self virtual node, and link cost information between said other nodes and self node; a means for advertising the IP address information and link cost information which have been gathered together by this gathering together and storing means to a node which corresponds to an interface of another virtual node; and a means for storing external IP address information, which is information about the IP address of another node which belongs to a virtual node other than self virtual node and about the virtual node to which said IP address belongs, and which has been advertised from the node which corresponds to the interface of the other virtual node, and link cost information from said node which corresponds to the interface of the other virtual node to said other node, in correspondence to the IP address of said other node, and transmitting it to another node within self virtual node.

By the node which corresponds to the interface transmitting the external address group information and the link cost information to other nodes within self virtual node, it is possible for the nodes to obtain the external address group information and the link cost information.

It is possible to incorporate a means for gathering together and storing IP address information from other nodes within self virtual node, and link cost information between said other nodes and self node; a means for advertising the IP address information and link cost information which have been gathered together by this gathering together and storing means to a node which corresponds to an interface of another virtual node; a means for storing external IP address information, which is information about the IP address of another node which belongs to a virtual node other than self virtual node and about the virtual node to which said IP address belongs, and which has been advertised from the node which corresponds to the interface of the other virtual node, and link cost information from said node which corresponds to the interface of the other virtual node to said other node, in correspondence to said IP address of said other node; and a means for offering the external IP address group information and the link cost information which have been stored in said storing means to said other nodes, according to requests from said other nodes.

By the node which corresponds to the interface offering the external address group information and the link cost information according to the requests from other nodes, it is possible for said other nodes to obtain the external address group information and the link cost information according to requirements, and accordingly it is possible for said other nodes to store the minimum amount of information which is required.

It is possible to incorporate: a means for receiving a packet for checking reachability from an other node within self virtual node; a means for summarizing the IP addresses of packets which have been received by said receiving means and generating internal address group information which is related to a node within self virtual node; a means for interchanging and harmonizing the internal IP address group information which has been generated by said generating means with other nodes which correspond to said interface within self virtual node and adjusting it appropriately, and synchronizing it as unified internal IP address group information for self virtual node; and a means for advertising self internal IP address group information which has been unified by said synchronizing means to a node which corresponds to an interface with an other virtual node.

In this case, it is possible to enhance the reliability of the information, since the node which corresponds to a plurality of interfaces advertises the same internal IP address group information to the other virtual nodes.

Furthermore, said advertisement means may include: a means for deciding whether or not an advertisement path is present from an other node which corresponds to said interface within self virtual node to a node which corresponds to an interface with the same other virtual node; and a means for, when the decision result from said decision means is "yes", performing advertisement via any advertisement path of self node or of said other node to the node which corresponds to said interface of said other virtual node. In this case, it is possible to utilize resources effectively without performing excessive advertisements.

It is possible to incorporate a means for receiving a packet for checking reachability from an other node within self virtual node; a means for summarizing the IP addresses of packets which have been received by said receiving means and generating internal address group information which is related to a node within self virtual node; and a means for advertising the internal IP address group information which has been generated by said generating means to the node which corresponds to the interface with the other virtual node.

In this case, if the internal address IP group information between different nodes which correspond to interfaces within the same virtual node is different, it is possible to obtain information for practical use in path computation by permitting this, since it is possible to be aware from the advertisements that the reachability is different, for nodes for which the interfaces to which they correspond are different even though they are in the same virtual node.

It is possible to incorporate a means for receiving from an other node within self virtual node a packet for checking reachability which includes information to the effect that self node is the one with the n-th cheapest link cost from the point of view of said other node; a means for summarizing the IP addresses of packets which have been received by said receiving means and generating internal IP address group information which is related to a node within self virtual node for each of said n values; and a means for advertising the internal IP address group information which has been generated by said generating means to the node which corresponds to the interface with the other virtual node.

In this case, it is possible to classify the reachability information according to the class of the link cost, and it is possible to obtain information which is rough but useful for the path computation. Furthermore, since it is rough information, there is the advantageous aspect that it is possible to reduce the amount of data.

Or, it is possible to incorporate a means for advertising to a node which corresponds to an interface on the same level as self node link information about a link on the same level as self node which has been connected to self node and link cost information for said link, and a means for receiving, from a node which corresponds to an interface on the same level with self node, advertisement of link information with a node which corresponds to said interface on the same level with self node, and link cost information for said link, and storing said information.

In this case, advertisement is only performed between self node and a node which corresponds to an interface upon the same level, and furthermore the information which is stored is only information between self node and the node which corresponds to an interface upon the same level. Due to this, it is possible to reduce the volume of advertisements and the amount of data which is to be stored by the node which corresponds to the interface. However, it is not possible to perform a path computation which affects a higher level, since there is only awareness of information between self node and a node which corresponds to an interface upon the same level.

It is desirable further to incorporate a means for, ahead of path computation, requesting and obtaining, from said node which corresponds to said interface, link information with a node which corresponds to an interface with the next highest level than self node, and link cost information for said link.

With the node which has been explained above being incorporated in a layered network, in the path search of nodes in this type of layered network, for example, it is desirable for the source node for path establishment to include: a means for specifying a virtual node to which said destination node belongs from the IP address of the destination node for path establishment, based upon the external IP address group information; and a means for searching for a path to the node which corresponds to the interface of the virtual node to which said destination node belongs which has been specified by said specifying means, based upon link information between a node which corresponds to an interface of self virtual node, and a node which corresponds to an interface of a virtual node on level 2 or higher, and link cost information for said link.

In this case, finally, the source node is able to perform path searching up to the node which corresponds to the interface of the virtual node to which the destination node belongs. In this case, as far as the path from the node which corresponds to said interface to the destination node is concerned, it will be acceptable to entrust this matter to said node which corresponds to said interface.

Or, it is possible to incorporate: a means for requesting and obtaining, from a node which corresponds to an interface of a virtual node to which said destination node belongs, link information for within said virtual node, and link cost information for said link; and a means for searching for, in addition to the path which has been searched out by said means for searching out a path to a node which corresponds to an interface of a virtual node to which said destination node belongs, a path to said destination node from said node which corresponds to said interface, based upon link information which has been obtained by said requesting and obtaining means, and link cost information for said link.

In this case, it is possible to take the entire path as being the path which the source node expects, since it is possible to perform searching for the path within the virtual node to which the destination node belongs on the side of the source node as well.

Or, it is possible to incorporate: a means for requesting and obtaining, from a node which corresponds to an interface of a virtual node which is included in a path from self node to said destination node, link information for within said virtual node, and link cost information for said link; and a means for searching out a path within said virtual node which is included in the path from self node to said destination node, based upon said link information and said link cost information for said link which have been obtained by said requesting and obtaining means.

In this case, it is possible for the source node to search for the entire path from the source node to the destination node in detail, and it is possible for the establishment of the detailed path to be performed by the source nodes.

Or, it is possible for the source node for path establishment to incorporate: a means for specifying a virtual node to which said destination node belongs from the IP address of the destination node for path establishment, based upon the external IP address group information; and a means for notifying to the destination node to which a path is to be established information which specifies on which level is the virtual node of the topmost level for which path computation from self node to the node which corresponds to the interface is possible based upon information about a link between a node which corresponds to an interface of self virtual node and a node which corresponds to an interface of a virtual node of level 2 or greater and link cost information for said link, and the result of searching for a path from self node to the node which corresponds to said interface for which the link cost is the lowest in order up to the n-th lowest; and for said destination node to incorporate a means for, along with searching out a path from self node to the node which corresponds to the interface with the virtual node of said topmost level for which path computation from said source node to the node which corresponds to the interface is possible based upon said information which has been notified, also combining said search results with the results of searching for a path up to said n-th lowest one, and notifying the path for which the link cost is the minimum to said source node as the final path which has been found.

In this case, the destination node acts more as the master in the path computation than does the source node. For example, if it is necessary to perform computation of paths from a single source node to a large number of destination nodes, then, if said system with the source node performing this large number of path computations all together is applied to a case in which the processing burden upon the source node has become extremely heavy, it is possible to alleviate the processing burden by dispersing this processing burden among the large number of destination nodes.

It is desirable further to incorporate: a means for referring to link information which has been stored in said storing means and deciding whether or not a link which connects self virtual node and an other virtual node is connected to self node; a means for when, according to the decision result of this decision means, a link which connects self virtual node and an other virtual node is connected to self node, deciding whether or not self node corresponds to a termination point for a layer of an LSP which has been established over said link; and a means for when, according to the decision result of this decision means, self node corresponds to said termination point, recognizing that self node is a node which corresponds to said interface, and exercising a function which corresponds to said interface.

The network which employs the present invention is a multi layer network. With a multi layer network, for example, LSPs of a plurality of layers are mixed together, such as a Lambda path upon the Lambda layer, a TDM-LSP upon the TDM layer, and a packet path upon the IP layer. Furthermore, nodes which have various types of function are mixed together, such as nodes which have a wavelength switching function, nodes which have a packet switching function, and nodes which have both of these functions. If the layered network of the present invention is applied to this type of multi layer network, Lambda paths, TDM-LSPs, and packet paths are also mixed together upon the LSPs which are connected between the virtual nodes.

With a virtual node in the above described type of environment, if a node which has the function of terminating an LSP between virtual nodes has terminated said LSP upon the layer of said LSP, said node is established as the node which corresponds to the interface. Accordingly, if this LSP is a Lambda path, an optical cross connect device or the like which is endowed with a wavelength switching function is taken as the node which corresponds to the interface. Or, if this LSP is a packet path, a router or the like which is endowed with a packet switching function is taken as the node which corresponds to the interface.

It is desirable further to incorporate a means for observing the resource utilization state related to self node; a means for, if, based upon the results of observation by this observation means, no room is available in the resources which are used for data transmission to another node within self virtual node and self node corresponds to said interface, along with exercising a function as a node which belongs to an other virtual node of level 1 to which self node is connected, also updating information about the virtual node to which self node belongs along with change of said associated virtual node; a means for advertising the change of contents of this updating means; and a means for, when a said advertisement has been received from an other node, updating the information about the virtual node to which self node belongs based upon said advertisement.

In other words, when generating a virtual node, it is inevitable to divide nodes for which from the beginning no link exists between different virtual nodes. With the present invention, in addition to this, even if the availability of resources upon a link which exists between nodes has disappeared so that the reachability has failed, it becomes an object of being divided up into virtual nodes. In this case, it is possible to enhance the efficiency and the accuracy of path computation and packet transmission, since it is possible to construct a layered network which reflects the presence or absence of reachability in real time.

It is desirable further to incorporate a means for observing the cost of a link which is related to self node; a means for, if, based upon the results of observation by this observation means, the link cost which is used for data transmission to an other node within self virtual node is greater than a threshold value, and self node corresponds to said interface, along with activating a function as a node which belongs to an other virtual node of level 1 to which self node is connected, updating the information about the virtual node to which self node belongs along with change of said associated virtual node; a means for advertising the updated contents which have been updated by this updating means; and a means for, when a said advertisement has been received from an other node, updating the information about the virtual node to which self node belongs based upon said advertisement.

In other words, when creating the virtual node, it is inevitable that nodes between which no link exists from the beginning will be divided up into different virtual nodes. With the present invention, in addition to this, even if a link exists between certain nodes, if the link cost of said link has exceeded the threshold value, it becomes an object of being divided up into virtual nodes. In this case, since it is possible to keep the link cost of passing via the virtual nodes below a fixed value, for example, it is possible to implement a layered network in which it is not necessary to advertise link cost information which is already known.

A sixth aspect of the present invention is a layered network which includes a node according to the present invention.

[Method for Building a Layered Network]

A ninth aspect of the present invention is a method for building a layered network, wherein when, corresponding to a layer of an LSP which has been established in a link between self virtual node and another virtual node, a node which is endowed with a function of terminating an LSP of said layer has terminated an LSP of said layer, said node is established as a node which corresponds to said interface.

Or, in the method for building a layered network according to the present invention, it is possible, when there is no capacity in resources which are used for data transmission over links which have been established between nodes, to separate said nodes into different virtual nodes.

Or, in the method for building a layered network according to the present invention, it is possible, when the link cost for data transmission over links which have been established between nodes has exceeded a threshold value, to separate said nodes into different virtual nodes.

[Network Control Device]

A tenth aspect of the present invention is a network control device which controls the nodes which make up a layered network of the present invention all together, comprising a means for, when, corresponding to a layer of an LSP which has been established in a link between self virtual node and another virtual node, a node which is endowed with a function of terminating an LSP of said layer has terminated an LSP of said layer, establishing said node as a node which corresponds to said interface.

Or, it is desirable for the network control device of the present invention to incorporate a means for, when there is no vacant capacity in resources which are used for data transmission over links which have been established between nodes, dividing up said nodes into different virtual nodes.

Or, it is desirable for the network control device of the present invention to incorporate a means for, when the link cost for data transmission over links which have been established between nodes has exceeded a threshold value, dividing up said nodes into different virtual nodes.

As has been explained above, according to the present invention, it is possible to implement enlargement of the scale of a large scale network, even if it is a network for which complicated processing is required, such as a multi layered network; and, furthermore, since it is possible to perform path computation after having specified the range over which the path computation is required, it is possible to eliminate computation which has become unnecessary, and accordingly it is possible to perform the path computation at high efficiency.

BRIEF DESCRIPTION OF THE DRAWINGS

FIG. 8 is a figure showing a method of allotting switching capability to an interface of a virtual node according to a fifth preferred embodiment of the present invention.

FIG. 15 is a figure showing a method of assigning a cost of passing through the virtual node according to a thirteenth preferred embodiment of the present invention.

FIG. 39 is a block structure diagram of an external advertisement section of this twenty-eighth preferred embodiment of the present invention.

FIG. 45 is a block structure diagram of an essential portion of a border node according to a thirty-fourth preferred embodiment of the present invention.

FIG. 50 is a sequence figure for explanation of another path search method according to this thirty-sixth preferred embodiment of the present invention.

FIG. 54 is a figure for explanation of a separation method of a virtual node according to thirty-eighth, thirty-ninth, forty-second, and forty-third preferred embodiments of the present invention.

DETAILED DESCRIPTION OF THE INVENTION

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

The First Preferred Embodiment

Figure 1:
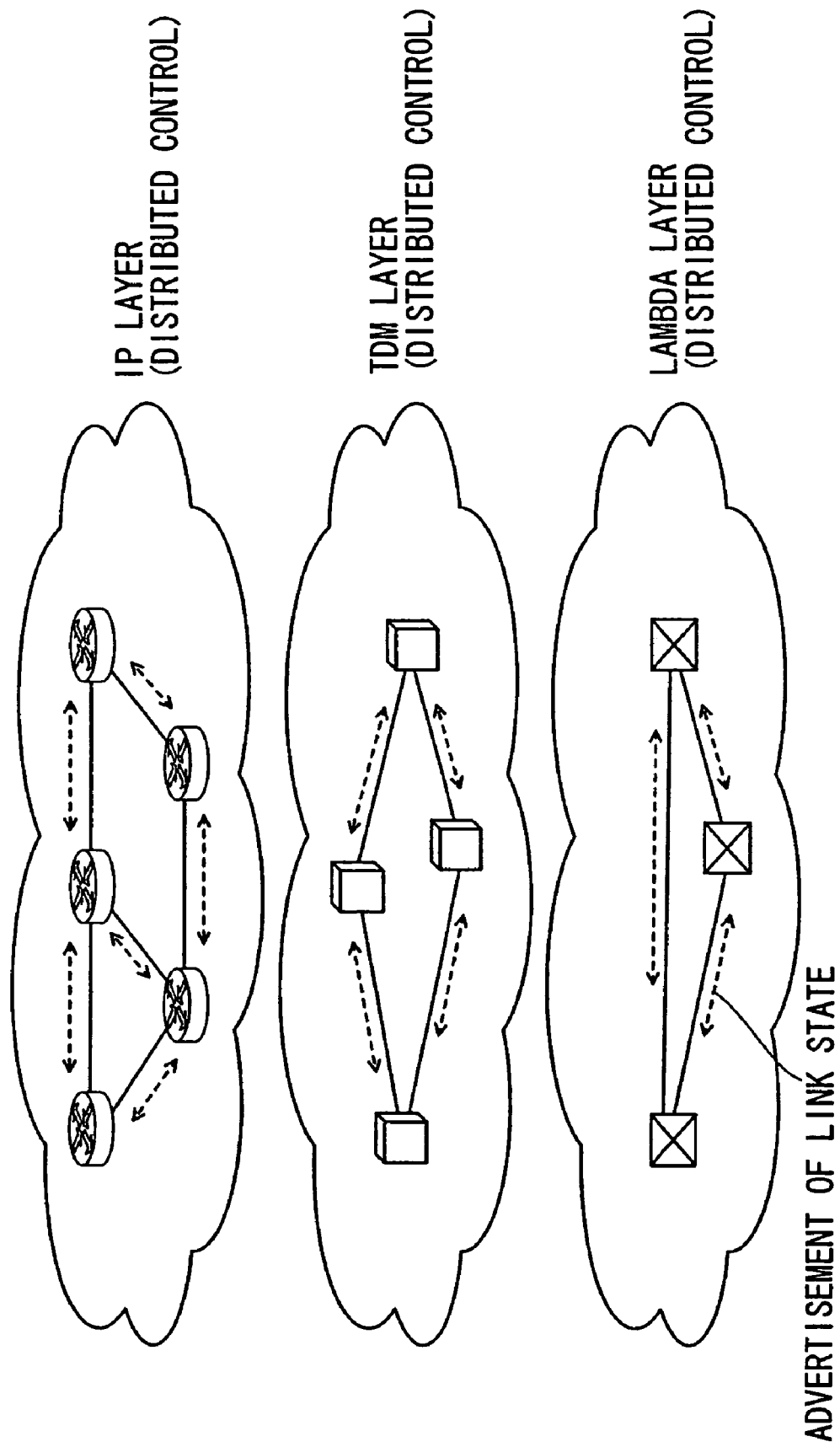
FIG. 1 is a schematic figure showing a multi layer network.

First, a network which includes layered network nodes will be explained. FIG. 1 is a schematic view of such a network. This network is made up from a plurality of network layers, and it will be assumed that it comprises an IP layer, a TDM layer, and a Lambda layer. Each of the nodes in this network advertises its link state, which is made up from information such as IP address, maximum link band, usage band, and the like.

Starting from this link state, a node which is to establish an LSP performs a computation for whether or not to establish a new TDM LSP or Lambda path for establishing an IP LSP, and, if such a TDM LSP or Lambda path is to be newly established, also performs a computation for determining upon which path the cost for establishing the LSP will be the least; and then it performs establishment of the LSP. Furthermore, when rearranging the path of some IP LSP, at the same time, computations are also made as to whether change of the path of the Lambda path of the layer below is necessary, and the like. With a network like the one described above, it becomes impossible to maintain scalability upon any fixed scale, since along with increase of the network scale, the volume of link state advertisements, the amount of computation which is required for path computation, and the like progressively increase. It is considered that the same thing will occur as the number of layers handled together increases.

Figure 2:
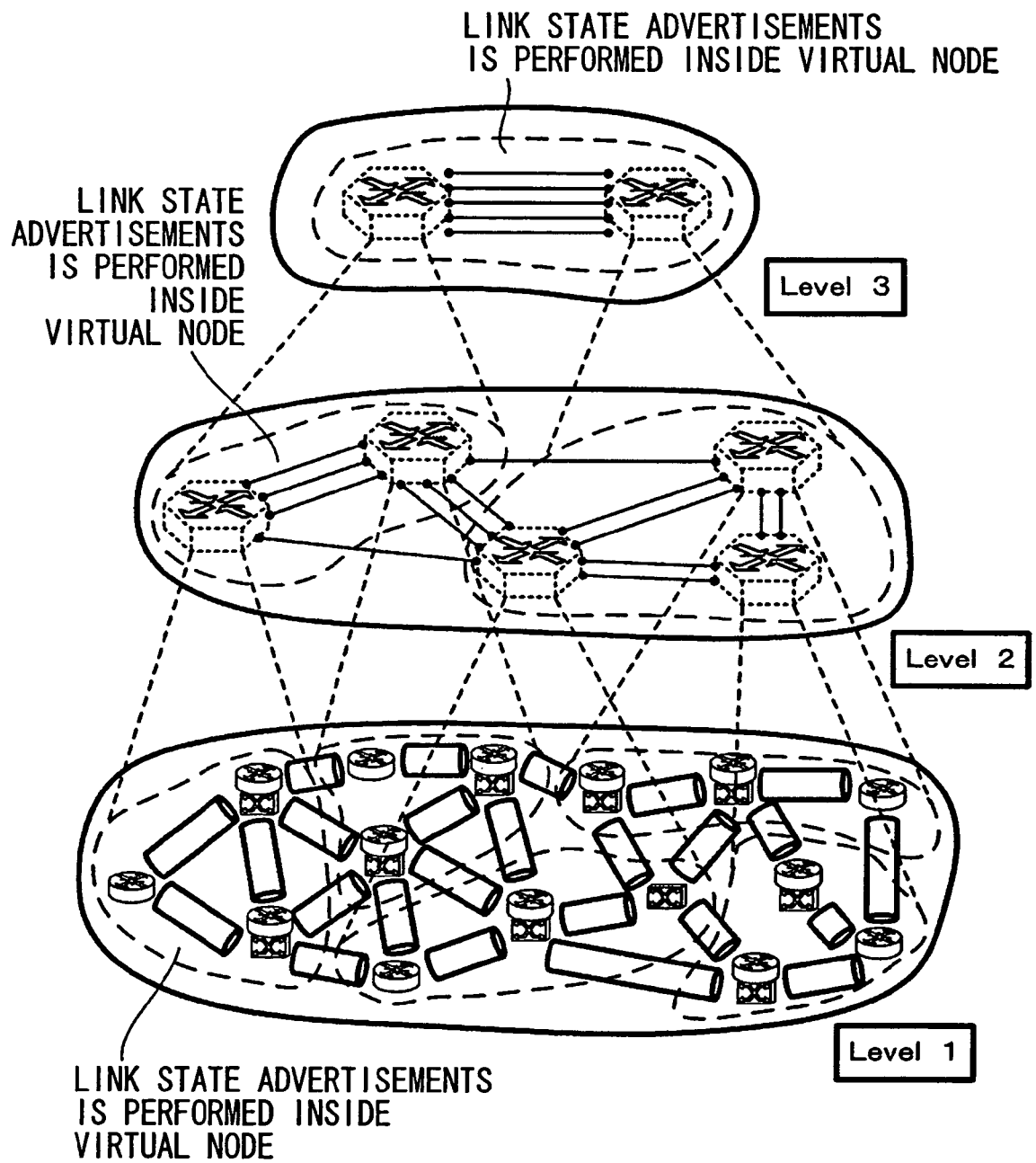
FIG. 2 is a figure showing the way in which a multi layered network of a first preferred embodiment of the present invention is divided up into cells, made into virtual nodes, and layered.
Figure 3:
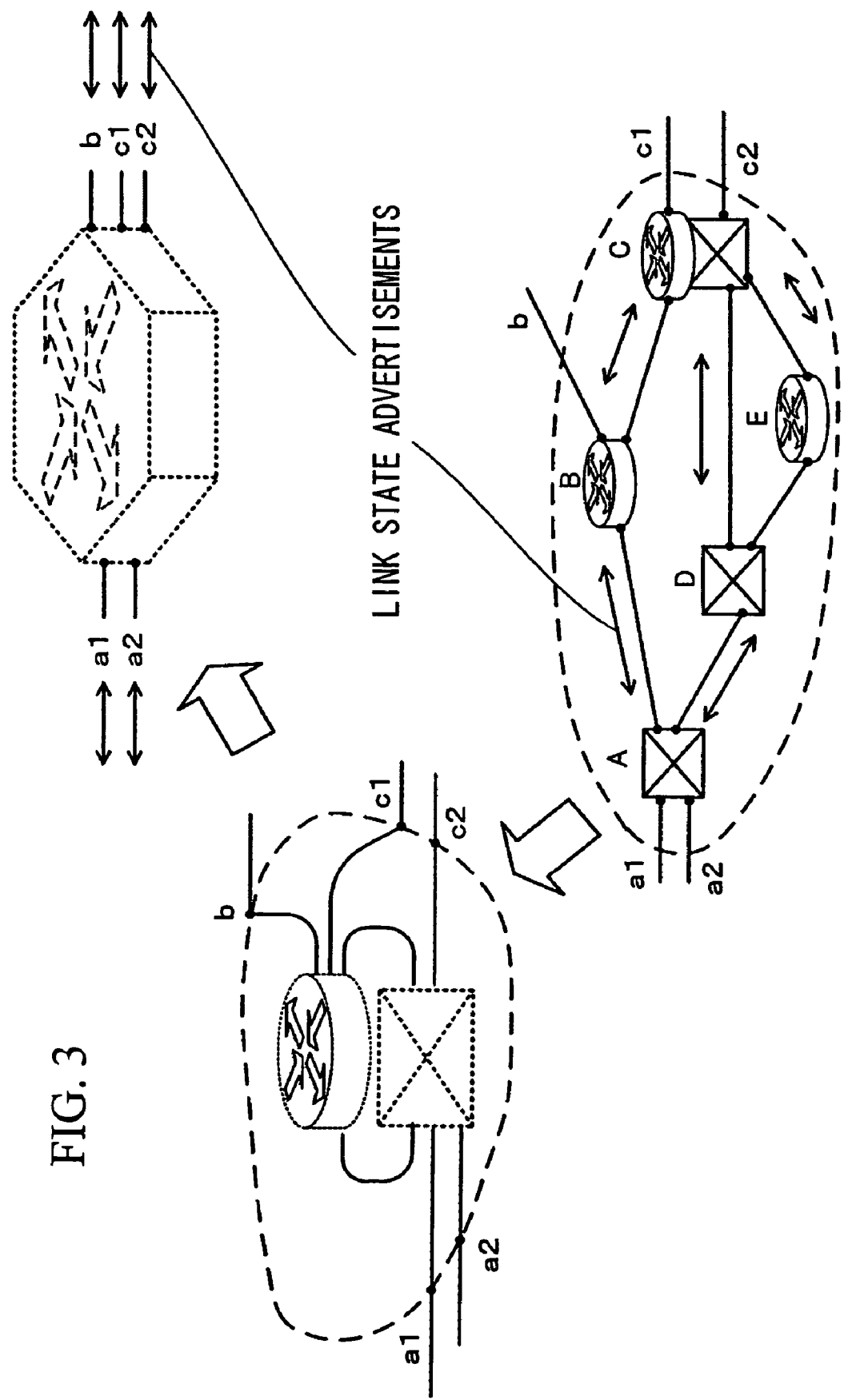
FIG. 3 is a figure showing the way in which the multi layer network of the first preferred embodiment is made into virtual nodes.

FIG. 2 shows the situation when a multi layer network like the one described above is layered by being separated into cells and by being made into virtual nodes. In this example, layering is performed down to the third level (Level 3). Furthermore, in FIG. 3, the situation is shown in which the entire network has been made into a virtual node.

Figure 4:
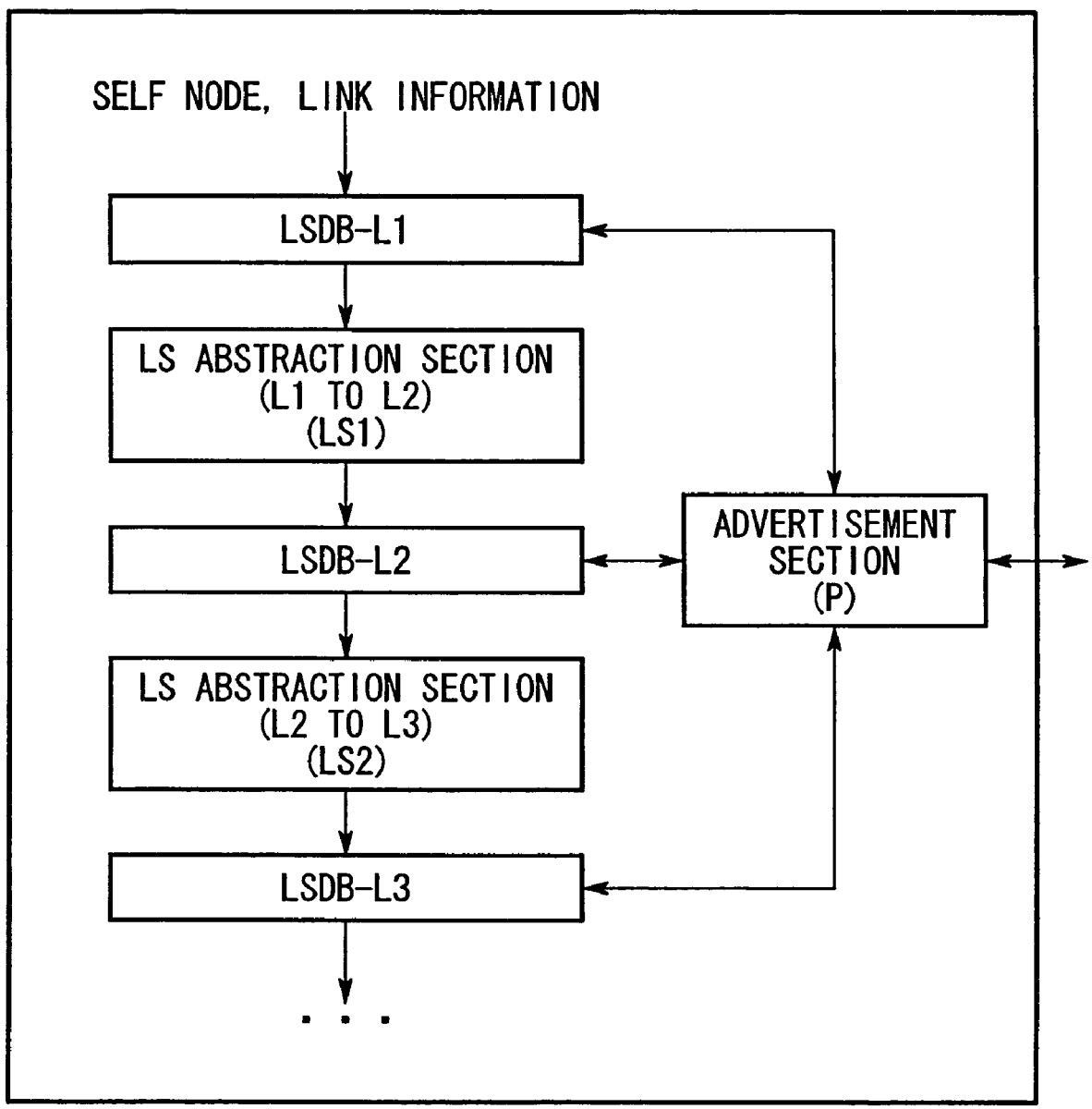
FIG. 4 is a schematic figure showing a node according to the first preferred embodiment of the present invention.

This type of network is implemented with the first preferred embodiment of the present invention. FIG. 4 is a schematic figure showing a node for this purpose. This node collects together link state information which gives the state of the present node and the states of links which are connected to the present node, and stores it in a link state database LSDB-L1. This link state information is advertised to other nodes via an advertisement section P. Furthermore, link state information both from the present node and also from other nodes which are included within the same virtual node is also advertised via the advertisement section P. From among the information which has arrived by advertisement at the advertisement section P, the Level 1 link state information is picked out and is stored in the link state database LSDB-L1. If self node is disposed at a location where an interface with a virtual node is present (the nodes A, B, and C in FIG. 3), then self node comes to serve the function of a border node. Using an LS abstraction section LS1, a node which has been chosen as a border node abstracts the link state information of the link state database LSDB-L1 to link state information for use at Level 2, and, along with storing this in a link state database LSDB-L2, also advertises it via the advertisement section P to the exterior of the virtual node as interface information for the virtual node.

In the same manner, an LS abstraction section LS2 repeats the operation of obtaining link state information to be stored in a link state database LSDB-L3 from the link state information in the link state database LSDB-L2, for its level of the network.

The Second Preferred Embodiment

Figure 5:
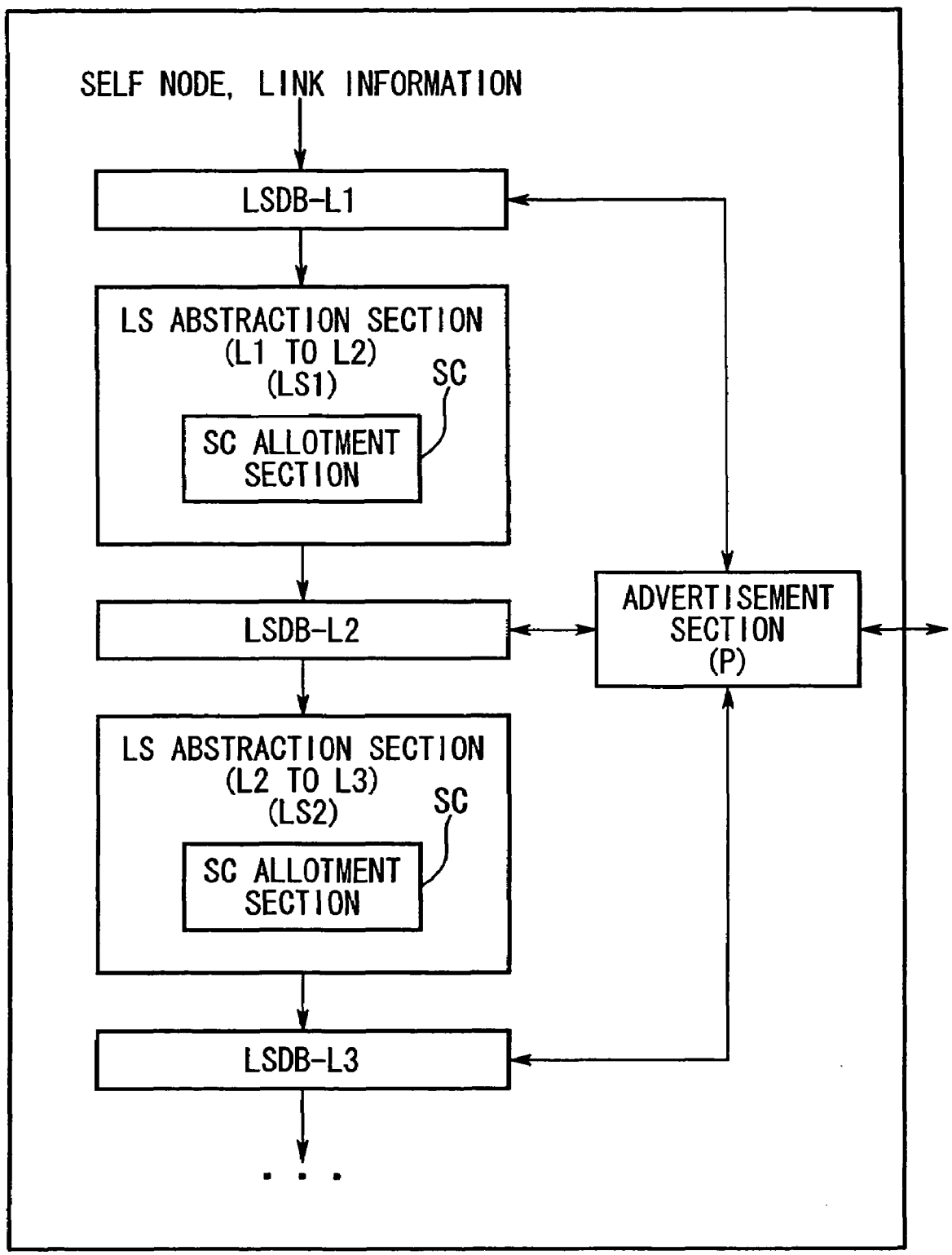
FIG. 5 is a functional block diagram showing a node according to a second preferred embodiment of the present invention.

With the second preferred embodiment of the present invention, as shown in FIG. 5, along with the link state information which is stored in the link state database LSDB-L1, a switching capability of the interface of the virtual node of Level 2 is obtained by a switching capability allotment section (shown in the figure as a SC allotment section) SC of the LS abstraction station LS1. And there is provided a function of, along with storing these results in the link state database LSDB-L2, also advertising them via the advertisement section P to the exterior of the virtual node.

In the same manner, the LS abstraction section LS2 repeats the operation of obtaining link state information to be stored in the link state database LSDB-L3 from the link state information in the link state database LSDB-L2, for its level of the network. FIG. 5 is a functional block diagram of the node at this time.

The Third Preferred Embodiment

Figure 6:
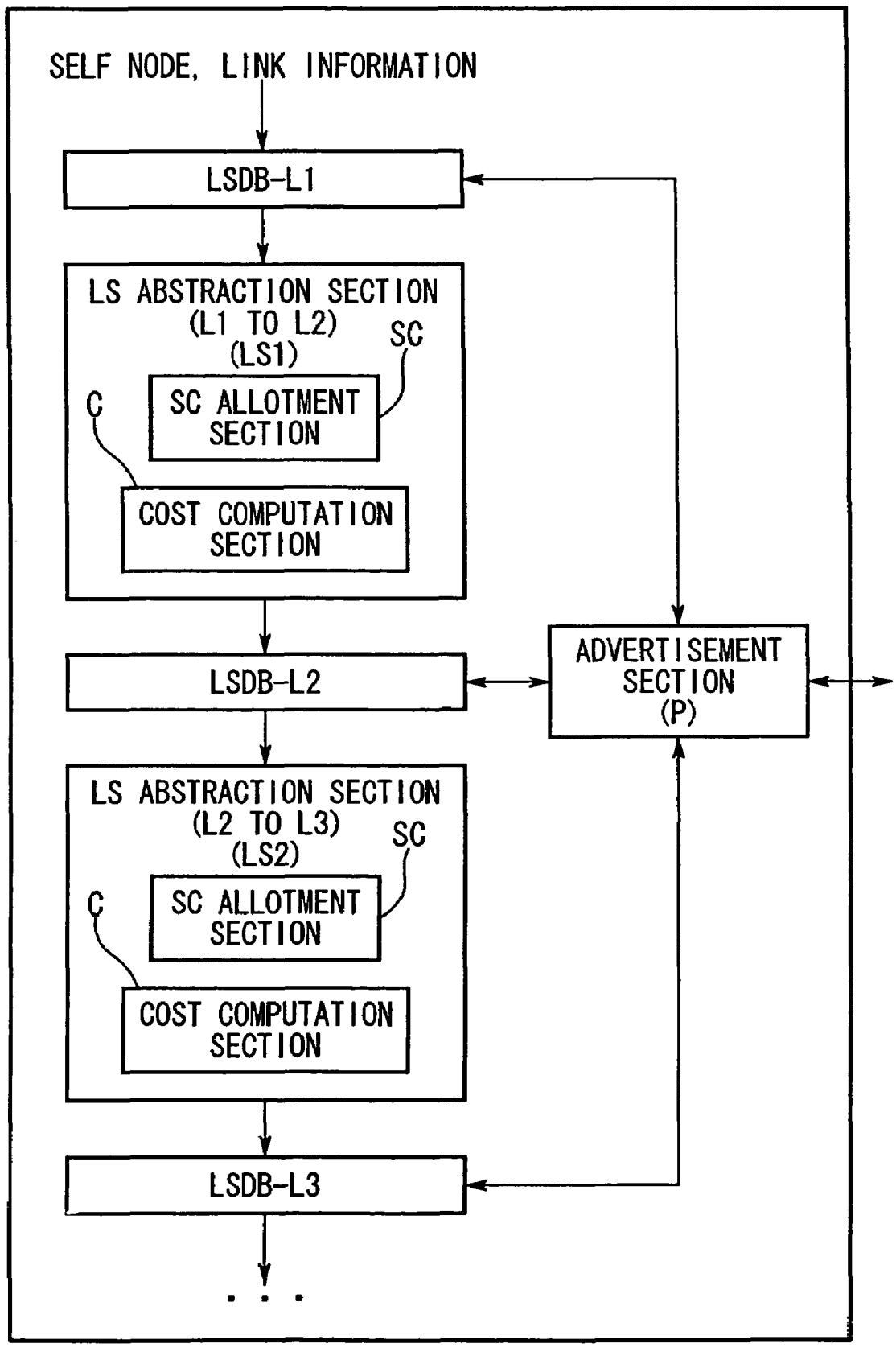
FIG. 6 is a functional block diagram showing a node according to a third preferred embodiment of the present invention.

With the third preferred embodiment of the present invention, as shown in FIG. 6, along with the link state information which is stored in the link state database LSDB-L1, a switching capability of the interface of the virtual node of Level 2 is obtained by a switching capability allotment section SC of the LS abstraction station LS1, and also the cost associated with going via self virtual node is computed by a cost computation section C. And there is provided a function of, along with storing these results in the link state database LSDB-L2, also advertising them via the advertisement section P to the exterior of the virtual node.

In the same manner, the LS abstraction section LS2 repeats the operation of obtaining link state information to be stored in the link state database LSDB-L3 from the link state information in the link state database LSDB-L2, for its level of the network. FIG. 6 is a functional block diagram of the node at this time.

The Fourth Preferred Embodiment

Figure 7:
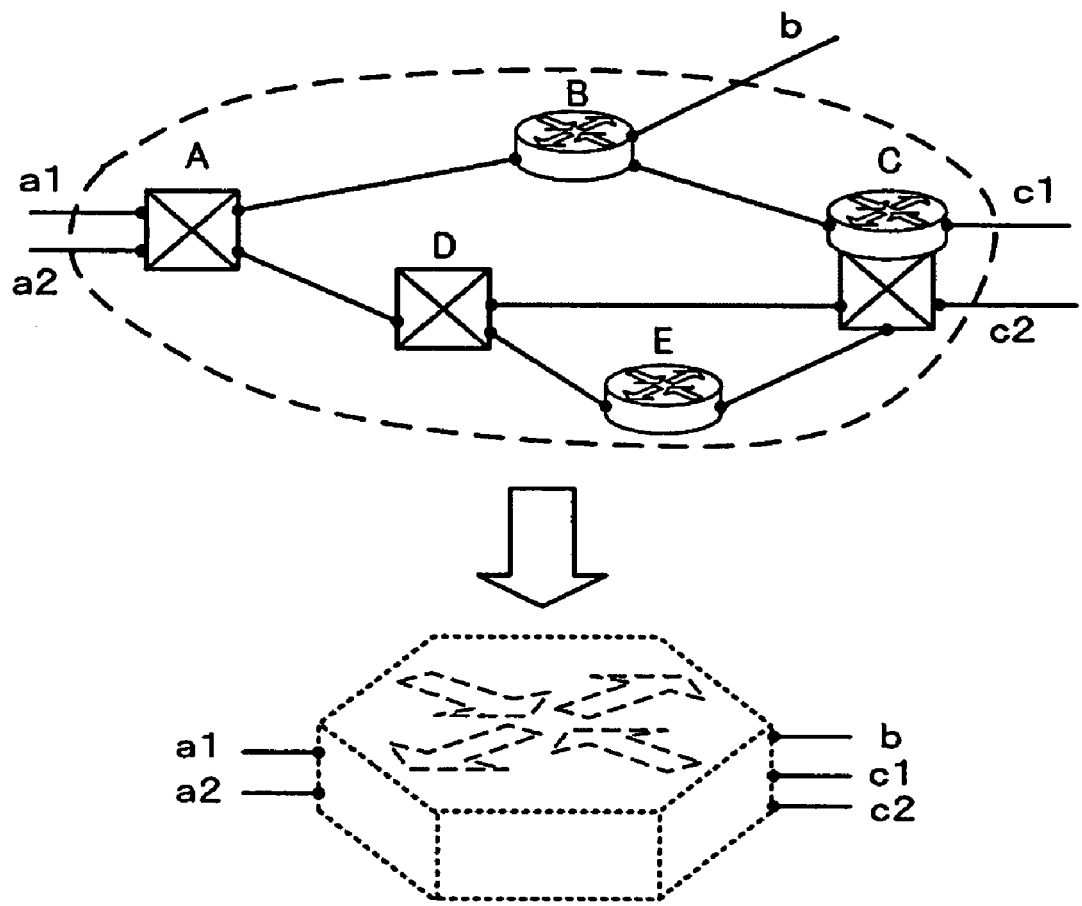
FIG. 7 is a figure showing a method of allotting switching capability to an interface of a virtual node according to a fourth preferred embodiment of the present invention.

With the fourth preferred embodiment of the present invention, the switching capability which is allocated in the second and the third preferred embodiments is regulated. FIG. 7 shows the method of allotting switching capability to the interfaces of a virtual node. Here, layers of the LSP which can be established between the interfaces via the interior of the virtual node are allotted to the interface as switching capability. Accordingly, switching capability is allocated dependent upon the output ports, as well as upon the input ports.

Accordingly, as for the switching capability of the interfaces of the virtual node of FIG. 7, while for the interfaces a1, a2, and c2 it is PSC (Packet Switching Capability)+LSC (Lambda Switching Capability), by contrast, for the interfaces b and c1 it becomes PSC. By performing allotment of switching capability planned as far as the output ports of the LSP in this manner, it becomes possible accurately to advertise to the exterior of the cell which interfaces can be used to establish LSPs of which layers.

The Fifth Preferred Embodiment

With the fifth preferred embodiment of the present invention, the switching capability which is allocated in the second and the third preferred embodiments is regulated. FIG. 8 shows a method of allotting switching capability to the interfaces of a virtual node. Here a system is implemented of allotting the switching capabilities of the border routers within the cells at the interfaces of the virtual node as switching capability of the interfaces of the virtual node.

In FIG. 8, the interfaces a1 and a2 have an LSC switching capability, the interfaces b and c1 have a PSC switching capability, and the interface c2 has both an LSC+a PSC switching capability. In this manner, it is possible to reduce the volume of advertisements of switching capability of the virtual routers.

The Sixth Preferred Embodiment

When establishing an LSP over a network, it has been contemplated to vary the switching capabilities which are possessed by the interfaces of the virtual nodes while utilizing the network resources. In the case of this sixth preferred embodiment of the present invention, by taking as a trigger the fact that the switching capability which is possessed by the interfaces of the virtual nodes which have been shown above in relation to the first through the fifth preferred embodiments has changed, and by advertising this fact to the other virtual nodes, it becomes possible for the path selection when establishing an LSP accurately to reflect the actual state of the network.

The Seventh Preferred Embodiment

When establishing an LSP over a network, it has been contemplated to vary the switching capabilities which are possessed by the interfaces of the virtual nodes while utilizing the network resources. In the case of this seventh preferred embodiment of the present invention, by periodically advertising to the other virtual nodes changes of the switching capability which is possessed by the interfaces of the virtual nodes which have been shown above in relation to the first through the fifth preferred embodiments, it becomes possible to alleviate the burden of the advertisements, while ensuring that the path selection when establishing an LSP accurately reflects the actual state of the network.

The Eighth Preferred Embodiment

Figure 9:
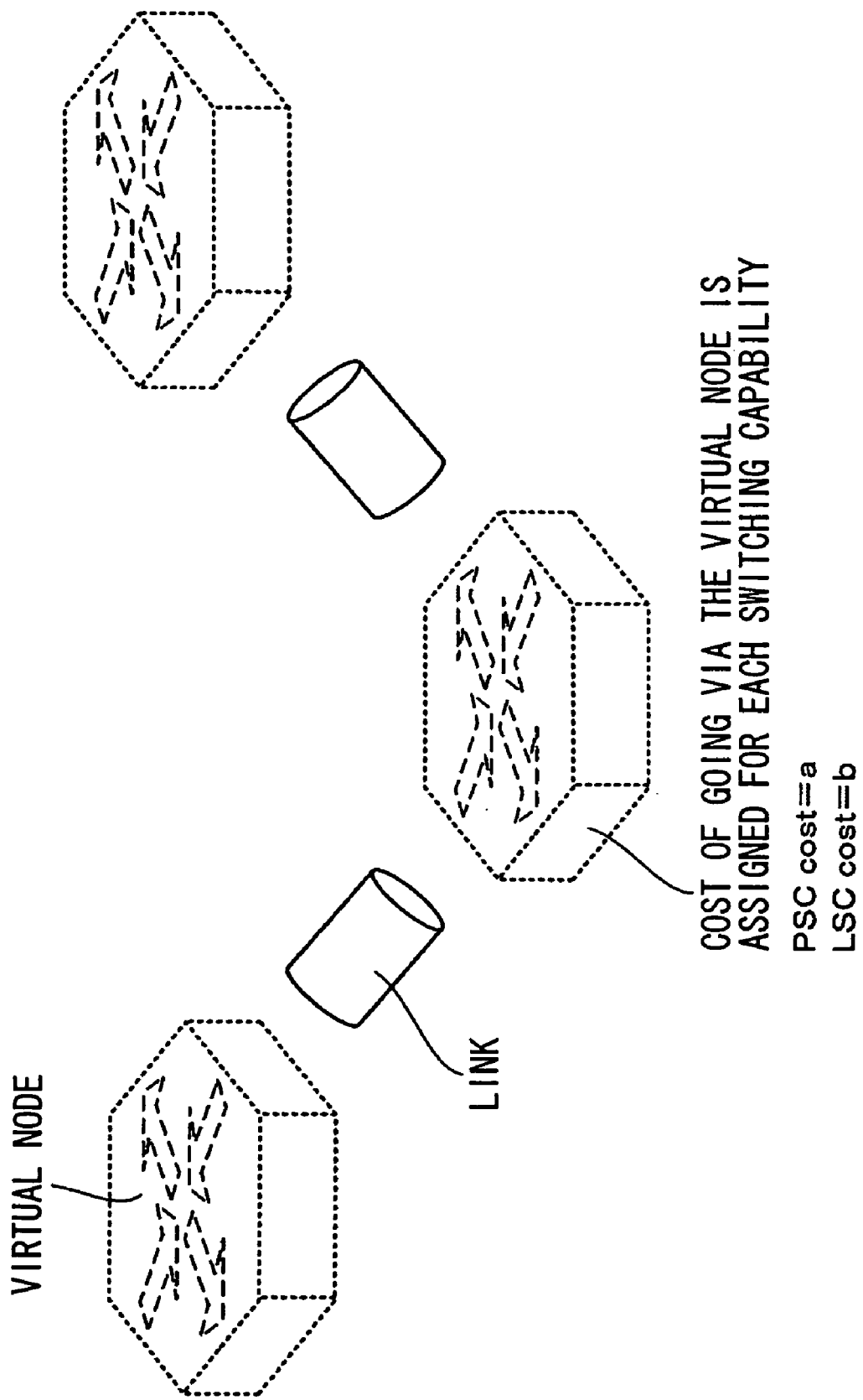
FIG. 9 is a figure showing an outline of LSP establishment cost in a virtual network according to a sixth preferred embodiment of the present invention.

FIG. 9 shows an outline of the LSP establishment cost in a virtual node network, in an eighth preferred embodiment of the present invention. The LSP establishment cost in a virtual node network is the cost of the links and the cost of going through the virtual nodes. In other words:

Cost of establishing an LSP over a virtual network=Sum of link costs+Sum of costs of passing via the virtual nodes.

In this case, the layers of the LSPs which the virtual node can handle are shown by switching capability. Switching capability attributes are assigned to the interfaces of the virtual nodes. In this case, a cost of going through a virtual node is assigned for each switching capability which is possessed by the interfaces of the virtual node. This is because sometimes the cost is different, when going through the virtual node, between the case of going via an LSP on the IP layer and the case of going via an LSP on the Lambda layer. It is possible to determine upon which layer it is best to establish an LSP by performing comparison of the cost values for each of these layers.

The Ninth Preferred Embodiment

Figure 10:
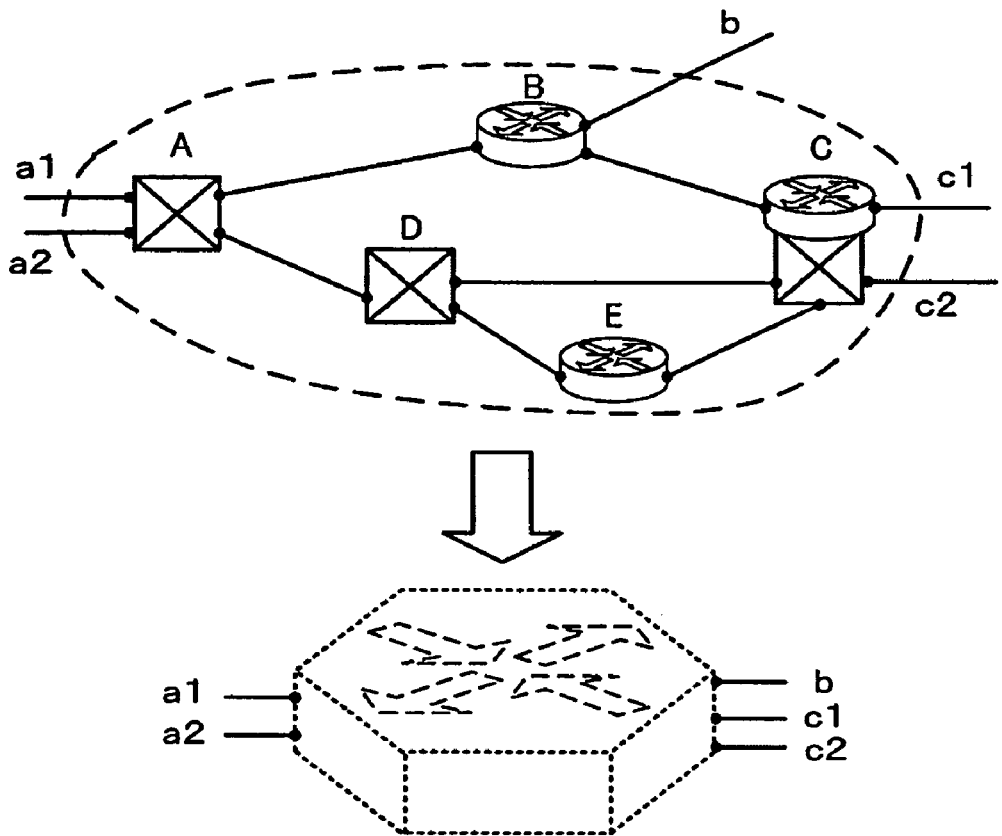
FIG. 10 is a figure showing a method of assigning a cost of passing through the virtual node according to a ninth preferred embodiment of the present invention.

FIG. 10 shows a method of assigning the cost of going via a virtual node, in a ninth preferred embodiment of the present invention. The interior of the virtual node is constituted by a network, and the links which connect it to the exterior of the cell are taken as interfaces. In this case, the layers for which an LSP can be established between an input interface and an output interface of the virtual node are different for different ones of the interfaces. An example of this is shown in FIG. 10, displayed as a matrix set up between the input and output interfaces. Here, if the input and output interfaces are different, the path within the cell is also different, so that the corresponding cost incurred is also different. Accordingly, it is assumed that costs are allocated to the individual switching capabilities in the matrix between the input and output interfaces of the virtual node.

Figure 11:
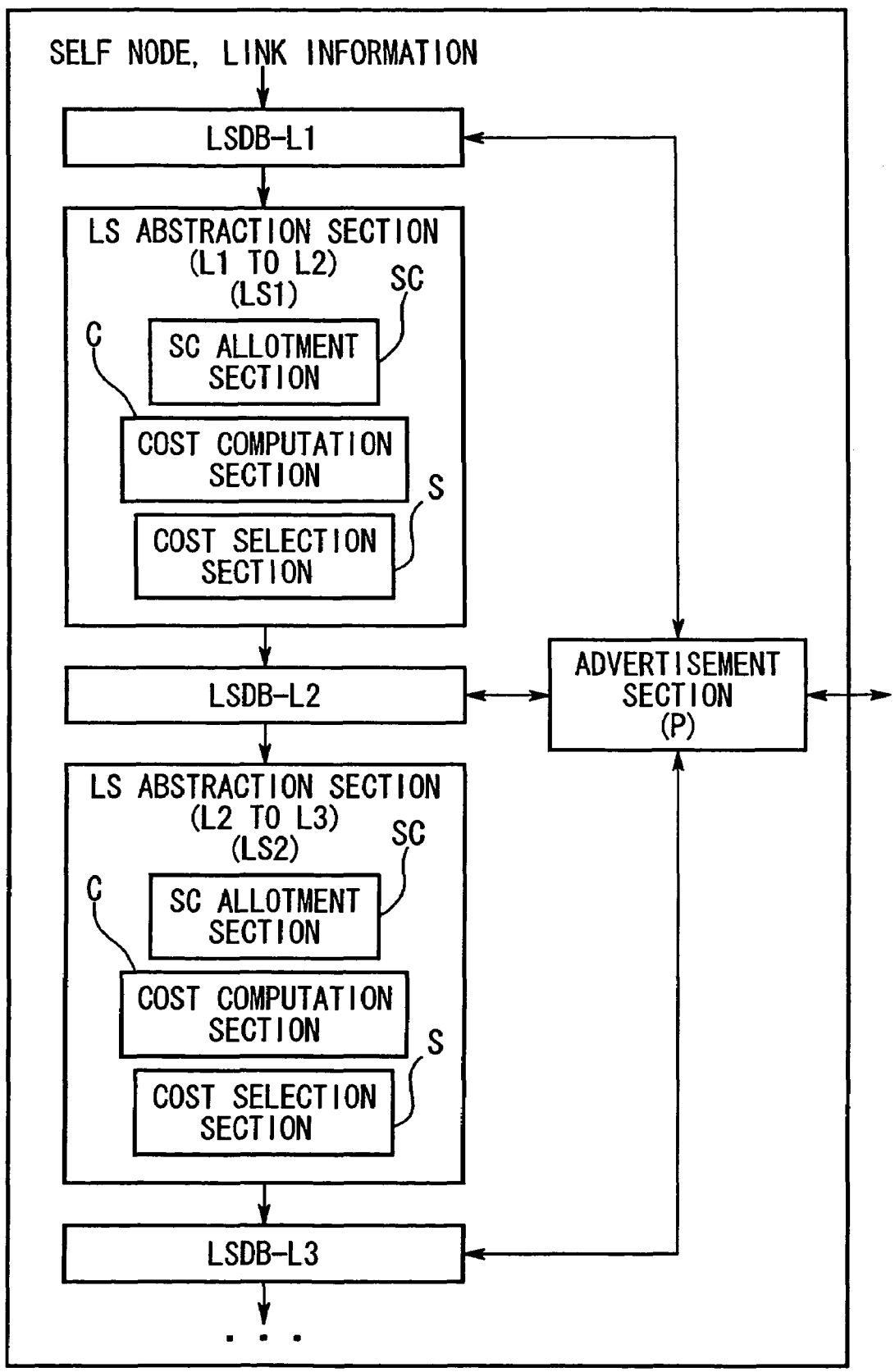
FIG. 11 is a functional block diagram showing a layered network node according to the ninth preferred embodiment of the present invention.

In this case, the cost which is allotted to the individual switching capability in the matrix between the input and output interfaces of the virtual node is the cost of the path for which it is possible to establish an LSP at the minimum cost, as selected by a cost selection section from among the path candidates for which an LSP on the said switching capability layer can be established between these input and output interfaces. FIG. 11 shows the functional blocks of the layered network node at this time. The functional blocks of FIG. 11 are set up by further adding a cost selection section C to the functional blocks of FIG. 6, and, herein, switching capability is allotted by a switching capability allotment section SC, computation and allotment of costs is added by the cost computation section C, and selection of the path over which an LSP can be established at the minimum cost is performed by a cost selection section S. The cost of establishing an LSP which has been set up in this manner is allotted as a cost of the interface of the virtual node.

As has been explained above, this is linked to reduction of the volume of advertisements, since advertisement is performed to externally, not for the candidates of all costs via the virtual node, but only for those of the minimum cost.

The Tenth Preferred Embodiment

Figure 12:
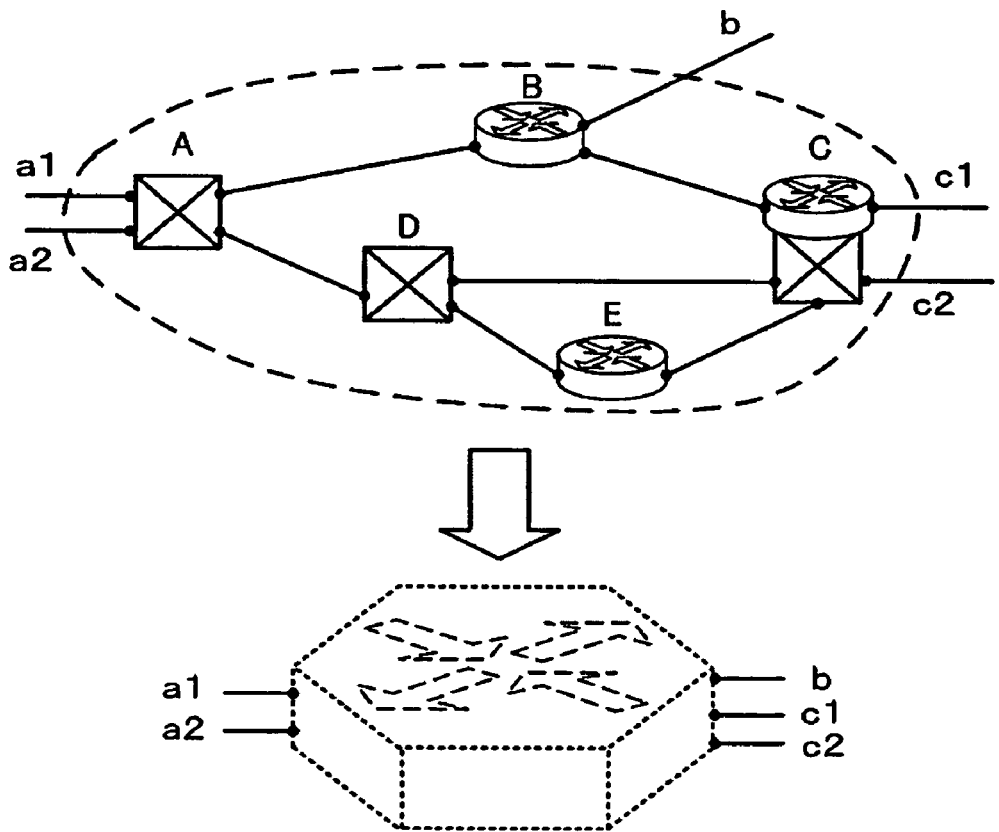
FIG. 12 is a figure showing a method of assigning a cost of passing through the virtual node according to a tenth preferred embodiment of the present invention.

FIG. 12 shows a method of assigning the cost via a virtual node, in a tenth preferred embodiment of the present invention. The interior of the virtual node is constituted by a network, and the links which connect it to the exterior of the cell are taken as interfaces. In this case, the layers for which an LSP can be established between an input interface and an output interface of the virtual node are different for different ones of the interfaces. An example of this is shown in FIG. 10, displayed as a matrix set up between the input and output interfaces. Here, if the input and output interfaces are different, the path within the cell is also different, so that the corresponding cost incurred is also different. Accordingly, costs are individually allocated to the switching capabilities in the matrix between the input and output interfaces of the virtual node.

In this case, the cost which is allotted to the individual switching capability in the matrix between the input and output interfaces of the virtual node is the cost of establishing the LSP whose path has the minimum number of hops upon the said layer which can be established between the said combination of input interface and output interface, and, if a plurality of such paths of the minimum number of hops exist, is the minimum cost from among the candidates.

Although, in this manner, a system is used which, after in a first stage performing limitation to the paths for which an LSP can be established in the minimum number of hops, selects one from among the limited candidates in a second stage, it is possible to omit the search which is performed in the first stage after having performed it just once, since, provided that no change occurs in the network topology, the results of this first stage search for a path in the minimum number of hops in the first stage do not change.

According to this method, it becomes possible to determine the costs which are allocated to the interfaces of the virtual node more easily.

The Eleventh Preferred Embodiment

Figure 13:
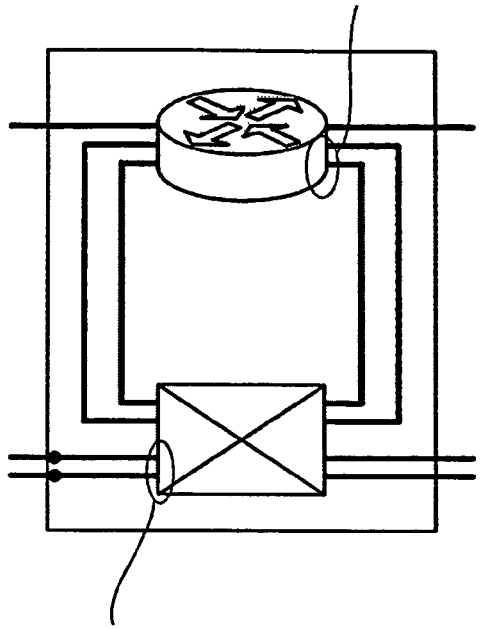
FIG. 13 is a figure showing a method of assigning a cost of the virtual node according to an eleventh preferred embodiment of the present invention.

FIG. 13 shows a method of assigning costs to a node in an eleventh preferred embodiment of the present invention. The cost of a path is obtained by adding a node cost to a link cost. The cost of going through the node is determined by the number of interfaces which are possessed by that node. The cost of passing through the node upon any layer is taken as the reciprocal of the number, among the interfaces which are endowed with the switching capability of that layer, of the ones which are currently unused.

The Twelfth Preferred Embodiment

Figure 14:
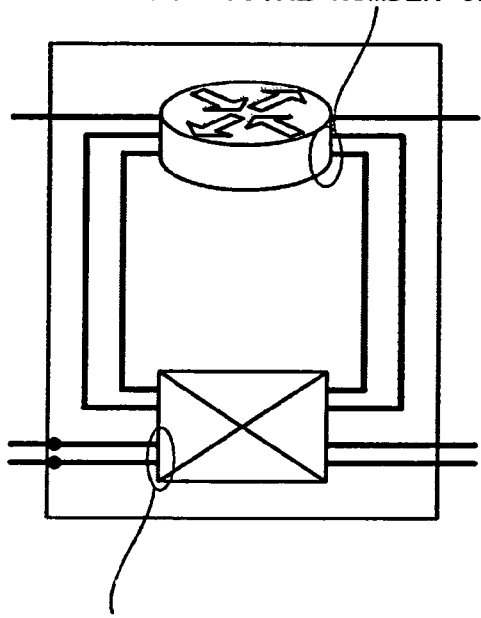
FIG. 14 is a figure showing a method of assigning a cost of the virtual node according to a twelfth preferred embodiment of the present invention.

FIG. 14 shows a method of assigning costs to a node in a twelfth preferred embodiment of the present invention. The cost of a path is obtained by adding a node cost to a link cost. The cost of going through the node is determined by the number of interfaces which are possessed by that node. The cost of passing through the node upon any layer is taken as being the number, among the interfaces which are endowed with the switching capability of that layer, of the ones which are currently being used, divided by the total number thereof.

The Thirteenth Preferred Embodiment

FIG. 15 shows a method of assigning a cost to passing through a virtual node in a thirteenth preferred embodiment of the present invention. A cost of passing through the virtual node is not allocated to each interface which is possessed by the virtual node; rather, it is allocated as a single cost for them all. The method of performing this allotment is to take this single cost as being the reciprocal of the total number of unused ones among the interfaces which are endowed with the switching capability of this layer and which the nodes which are included in self virtual node are endowed with.

The Fourteenth Preferred Embodiment

Figure 16:
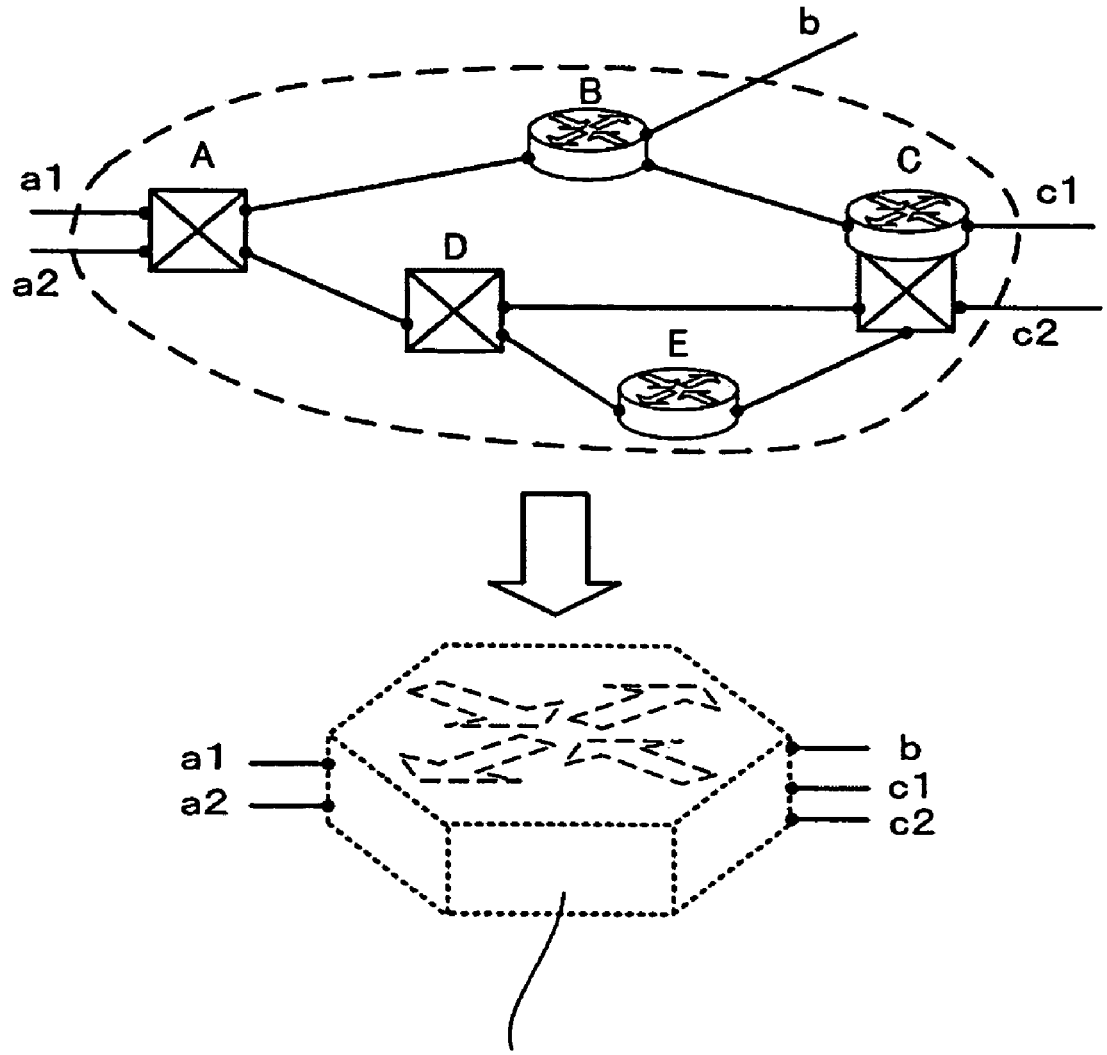
FIG. 16 is a figure showing a method of assigning a cost of passing through the virtual node according to a fourteenth preferred embodiment of the present invention.

FIG. 16 shows a method of assigning a cost to passing through a virtual node. Again, a cost of passing through the virtual node is not allocated to each interface which is possessed by the virtual node; rather, it is allocated as a single cost for them all. The method of performing this allotment is to take this single cost as being the number, among the interfaces which are endowed with the switching capability of that layer and which the nodes which are included in self virtual node are endowed with, of the ones which are currently being used, divided by the total number thereof.

The Fifteenth Preferred Embodiment

In this fifteenth preferred embodiment of the present invention, since the cost of passing through a virtual node varies according to the open or closed states of the interfaces for each switching capability which exists in its interior, accordingly the nodes which correspond to the interfaces of the virtual node periodically perform recomputation of the cost.

The Sixteenth Preferred Embodiment

In this sixteenth preferred embodiment of the present invention, since the cost of passing through a virtual node varies according to the open or closed states of the interfaces for each switching capability which exists in its interior, accordingly the nodes which correspond to the interfaces of the virtual node and which have received communication that a change has occurred immediately perform recomputation of the cost.

The Seventeenth Preferred Embodiment

Figure 17:
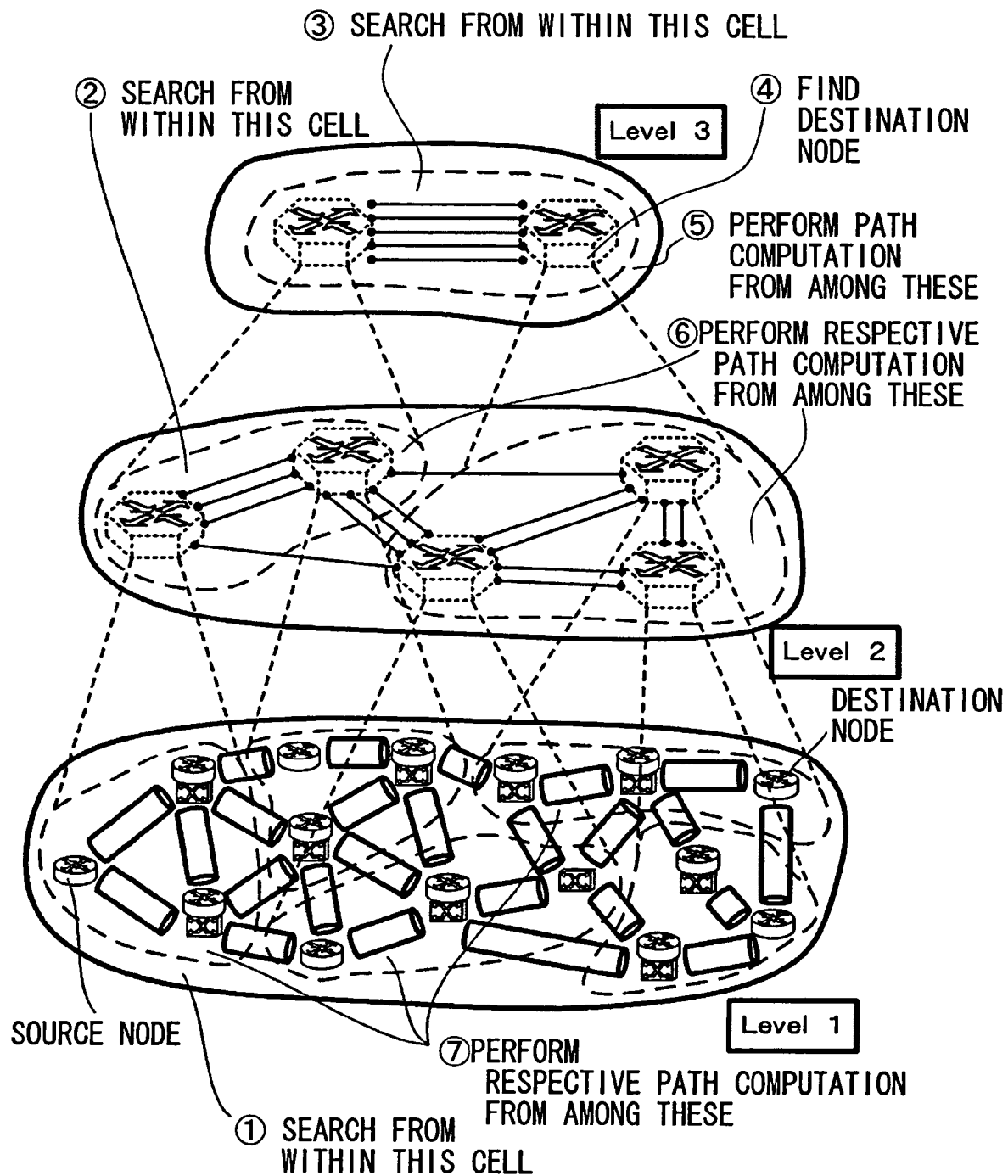
FIG. 17 is a figure showing a path selection sequence of a seventeenth preferred embodiment of the present invention.

FIG. 17 shows a path selection sequence of a seventeenth preferred embodiment of the present invention. First, the network range for performing path selection is determined. If, among the cells on the lowest level, destination nodes are present among the cells to which the source nodes belong, the path selection is performed from among these cells. If no destination node is present among these cells, the cells which include a source node are picked out from the cells of the next higher level, and an investigation is performed as to whether or not a destination node is present among these cells. If a destination node is present among these cells, then path selection is performed from among these cells; but if no destination node is present among these cells, then, in the same manner as before, an investigation is performed with the cells on the next higher level. This series of investigations is repeated until a destination node comes to light.

Figure 18:
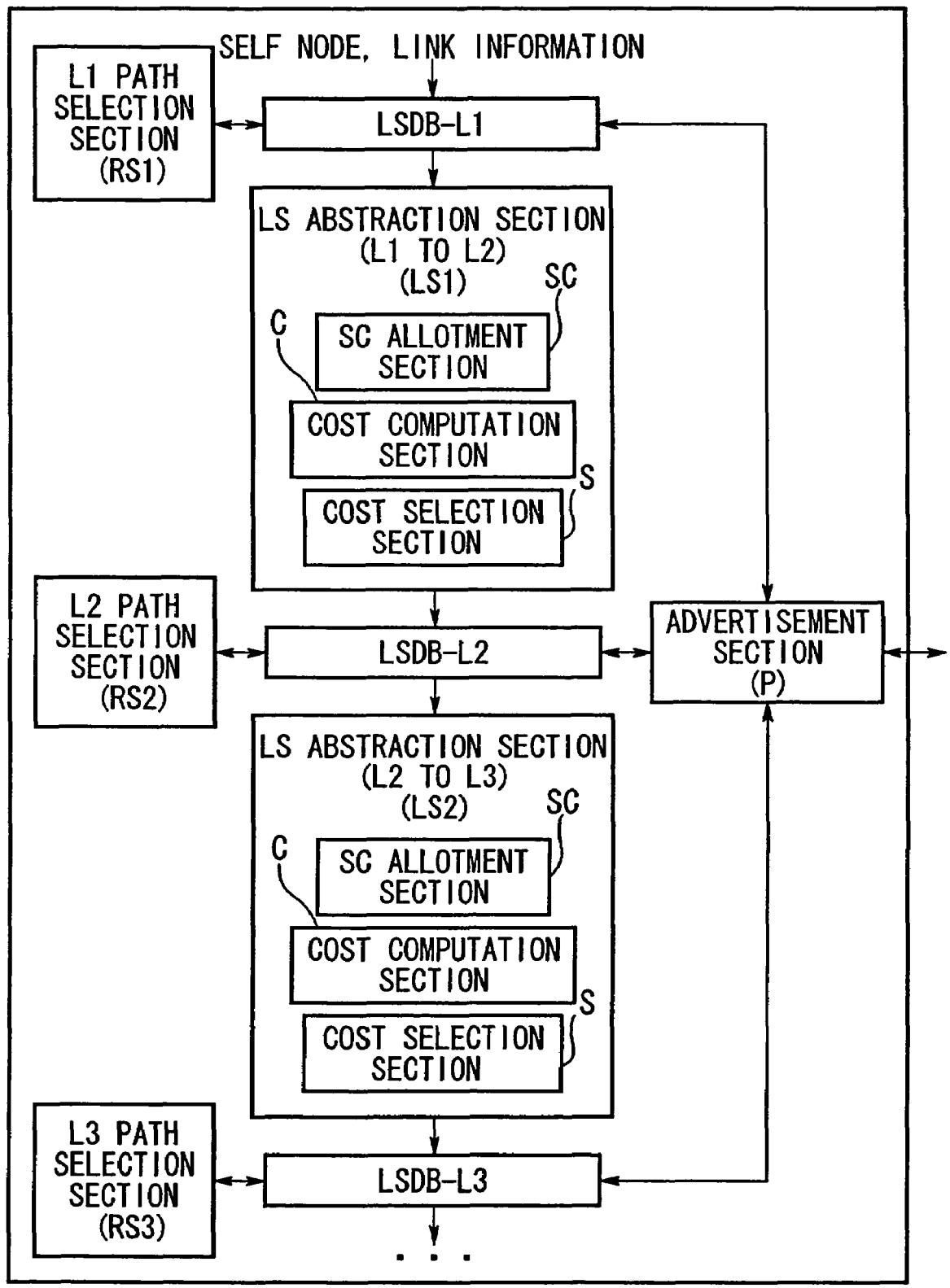
FIG. 18 is a functional block diagram showing a layered network node according to the seventeenth preferred embodiment of the present invention.

In the network range over which the path selection which has been determined upon is performed in this manner, the path selection of the virtual node network is performed by the path selection section of the said level. Here, for a virtual node which has been chosen as a relay node, the path selection of the virtual node network is performed within this cell by the path selection section of the said level in the same manner. It becomes possible to determine upon a path from the source node to the destination node by repeating this path selection until the lowest level. FIG. 18 shows the functional blocks of the layered network node in this case. The functional blocks of FIG. 18 result from the addition of an L1 path selection section RS1, an L2 path selection section RS2, and an L3 path selection section RS3 to the functional blocks which were shown in FIG. 11.

In this manner, by adopting a method of progressively enlarging the range for investigation in order from the lowest level until a destination node is brought to light, it becomes possible to discover a destination node very quickly in a network in which many LSPs are established between close nodes.

The Eighteenth Preferred Embodiment

Figure 19:
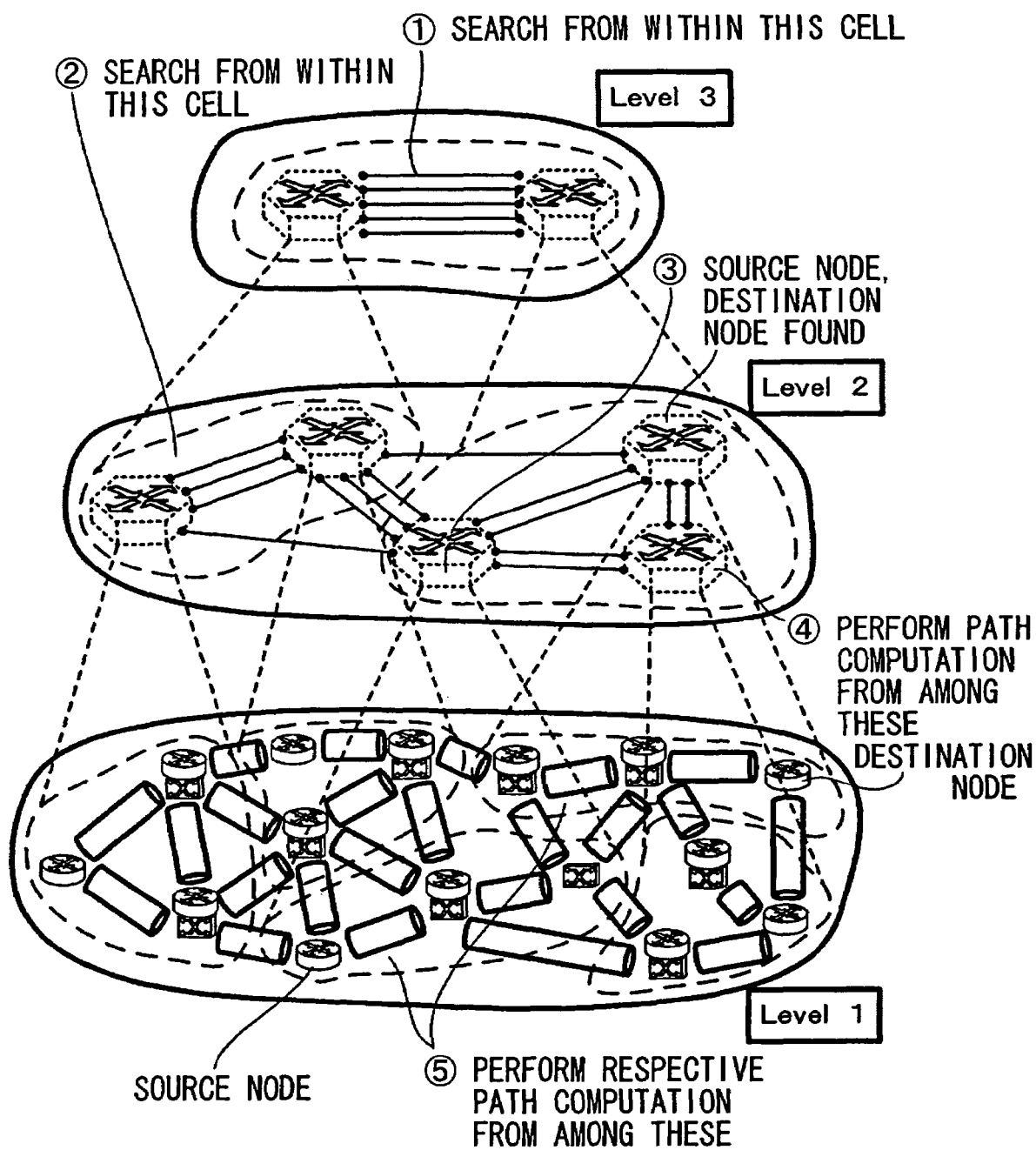
FIG. 19 is a figure showing a path selection sequence of an eighteenth preferred embodiment of the present invention.

FIG. 19 shows the sequence of the eighteenth preferred embodiment of the present invention.

First, the network range for performing path selection is determined.

A check is made to determine whether or not, among the cells at the topmost level, there exists a cell which includes both a source node and a destination node. If one such cell exists, then, in the same manner, a check is made to determine whether or not, for the network within this cell, there exists a cell which includes both a source node and a destination node, and this series of checks is repeated until the source node and the destination node come to be included within different cells. When it has been checked that the source node and the destination node are included within different cells, the network which includes these cells is set as the range for performing path selection.

In the network range for performing path selection which has been determined upon in the above manner, path selection of the virtual node network is performed by the path selection section of the said level. Here, with a virtual node which has been chosen as a relay node, path selection of the virtual node network is performed by the path selection section of the said level in the same manner as within this cell. It becomes possible to determine upon the path from the source node to the destination node by repeating this path selection down to the lowest level. The functional blocks of the layered network node at this time are shown in FIG. 18.

By employing this method in which the network range for performing path selection is taken in order from the topmost level in this manner for a network in which many LSPs are established between distant nodes, it becomes possible to discover the destination node quickly.

The Nineteenth Preferred Embodiment

Figure 20:
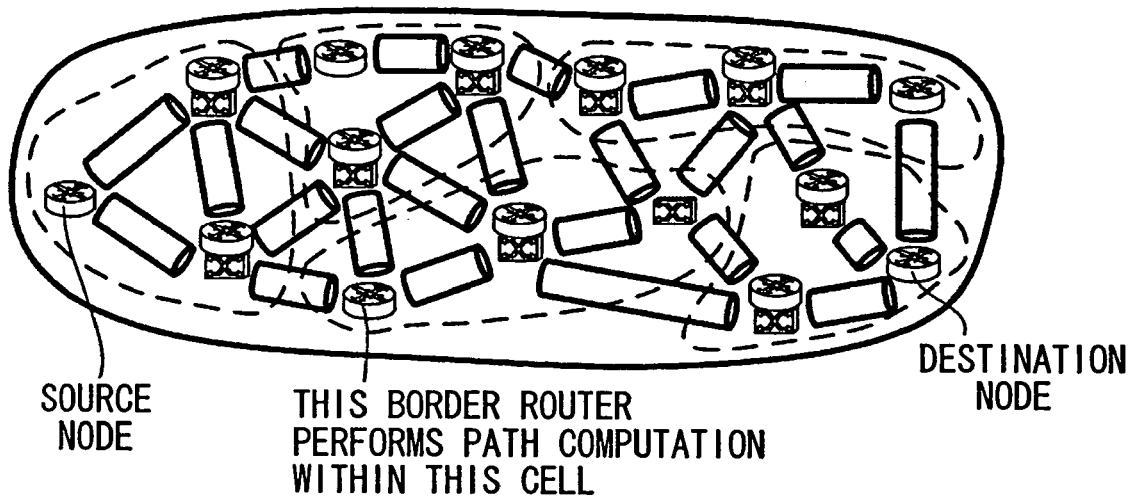
FIG. 20 is a figure showing a network management system of an nineteenth preferred embodiment of the present invention.

FIG. 20 shows a network management system according to a nineteenth preferred embodiment of the present invention.

When performing path selection as is done in the seventeenth and the eighteenth preferred embodiments, in the state in which only the input-output interfaces of the virtual node have been determined upon, it then becomes necessary to perform path selection for the network within self virtual node.

In this case, a method has been conceived of undertaking the path selection computation for the internal network by a node, or by a virtual node, which corresponds to the input-output interfaces of the virtual node which are already decided upon.

The Twentieth Preferred Embodiment

Figure 21:
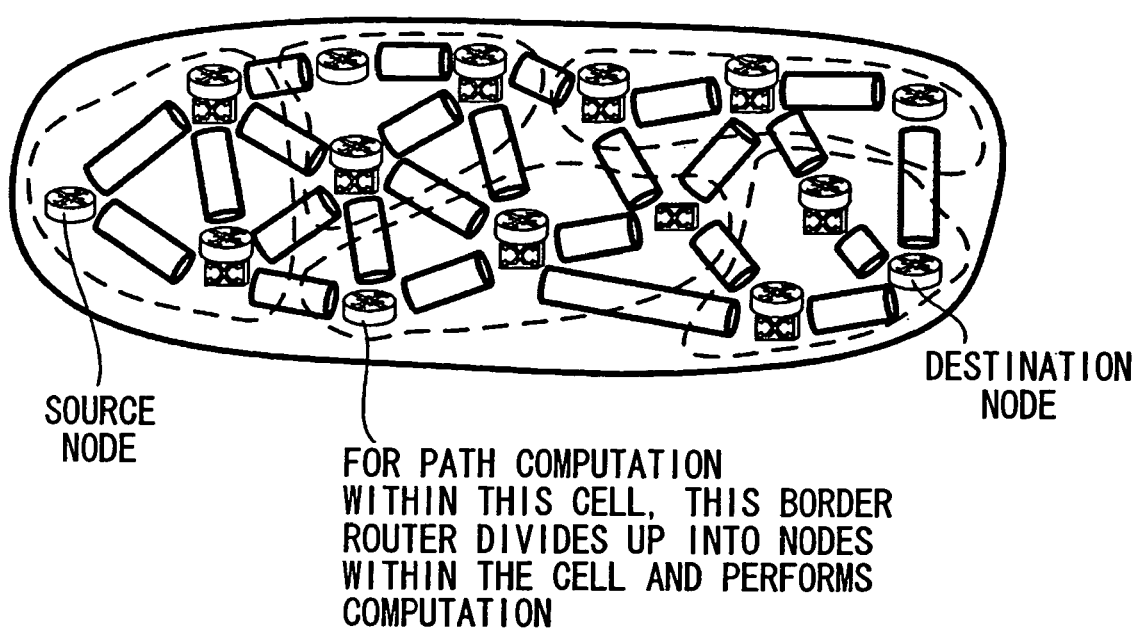
FIG. 21 is a figure showing a network management system of a twentieth preferred embodiment of the present invention.

FIG. 21 shows a network management system according to a twentieth preferred embodiment of the present invention. When performing path selection as is done in the seventeenth and the eighteenth preferred embodiments, in the state in which only the input-output interfaces of the virtual node have been determined upon, it then becomes necessary to perform path selection for the network within self virtual node.

In this case, it is possible to conceive of the path selection computation for the internal network being undertaken by a node, or by a virtual node, which has been chosen from within the virtual node. By the adoption of this procedure, it becomes possible to prevent the path selection computation procedure from being concentrated only upon the border nodes.

The Twenty-First Preferred Embodiment

Figure 22:
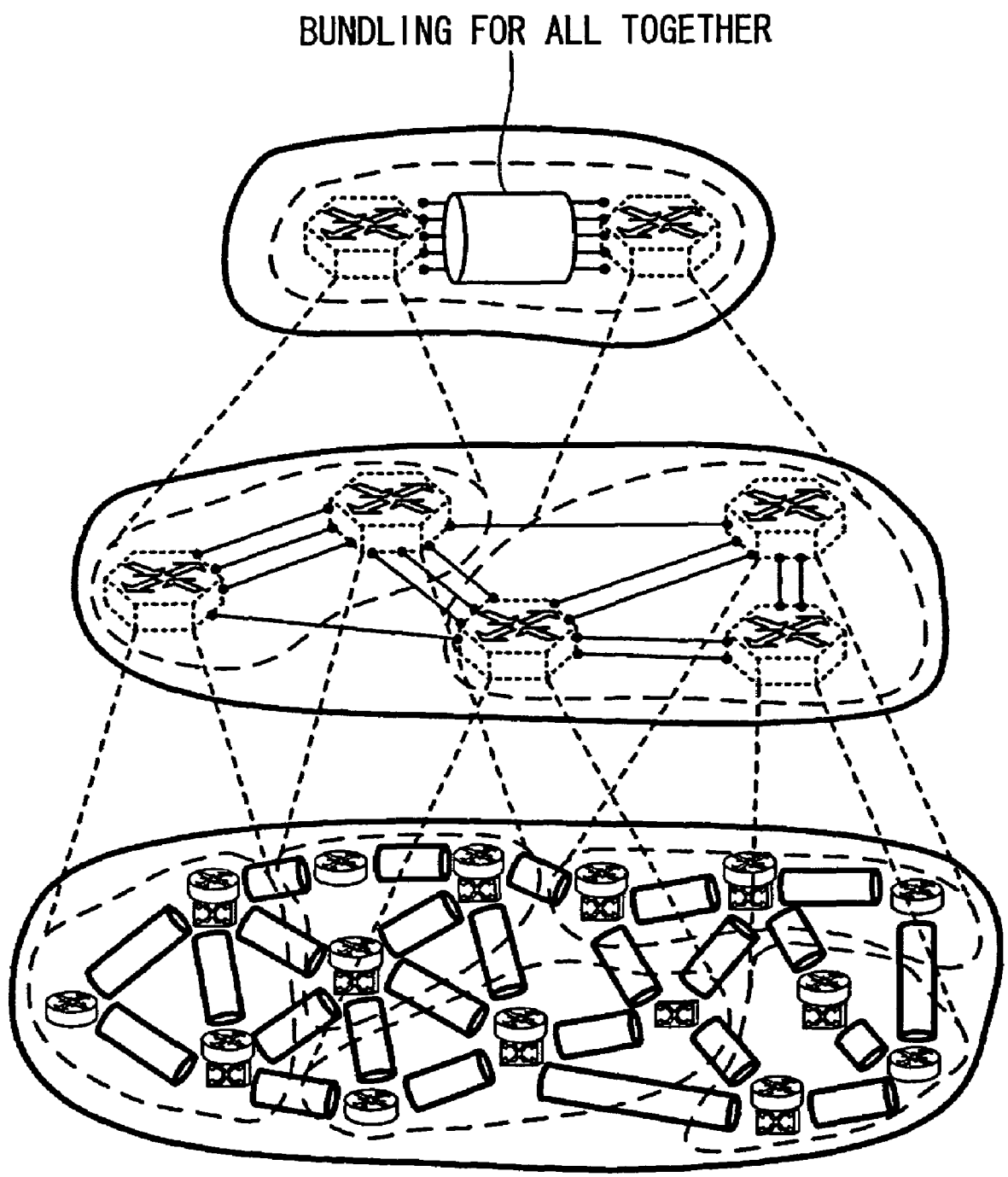
FIG. 22 is a figure showing a link bundling system of a twenty-first preferred embodiment of the present invention.

FIG. 22 shows a link bundling system according to a twenty-first preferred embodiment of the present invention. The network is divided up into a plurality of cells, and, when these are defined as virtual nodes, the virtual nodes come to be connected together by the same number of links as the number of links by which the nodes themselves are connected within the cells. When the virtualization of this network is performed by a hierarchical structure, a large number of links come to connect between these virtual nodes. In this case, when advertisement of the link states between the virtual nodes is considered, increase of the number of links is believed to entail increase of the number of link state advertisements.

Due to this, if a plurality of links are present between the bases of the virtual nodes, it becomes possible to prevent increase of the number of link states by bundling together this plurality of links and considering them all together as a single virtual link. In this case, the cost which is allotted to the interfaces is considered as a method of advertising the interfaces which are connected together by self virtual link.

The Twenty-Second Preferred Embodiment

Figure 23:
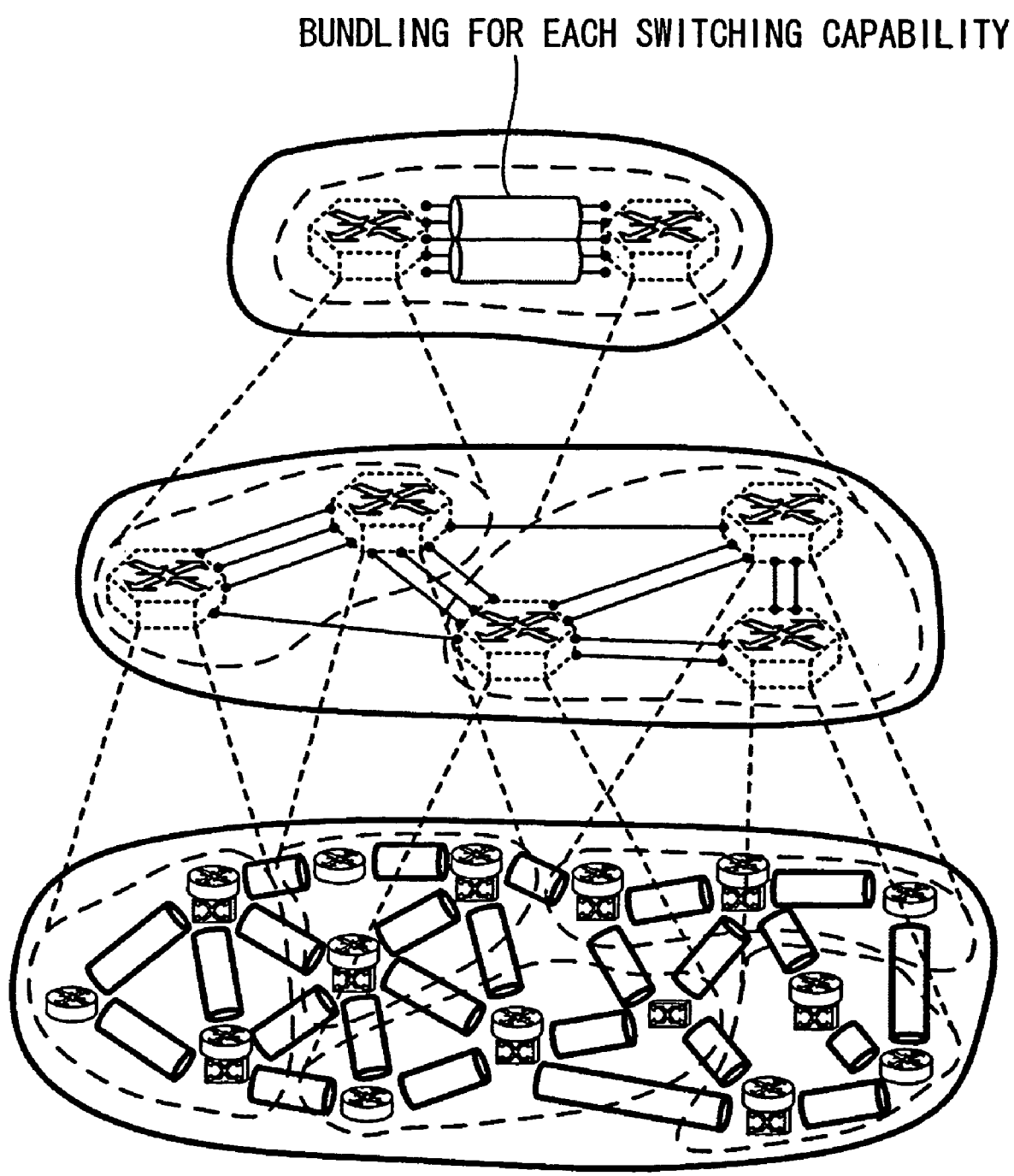
FIG. 23 is a figure showing a link bundling system of a twenty-second preferred embodiment of the present invention.

FIG. 23 shows a link bundling system according to a twenty-second preferred embodiment of the present invention. The network is divided up into a plurality of cells, and, when these are defined as virtual nodes, the virtual nodes come to be connected together by the same number of links as the number of links by which the nodes themselves are connected within the cells. When the virtualization of this network is performed by a hierarchical structure, a large number of links come to connect between these virtual nodes. In this case, when advertisement of the link states between the virtual nodes is considered, increase of the number of links is believed to entail increase of the number of link state advertisements.

Due to this, if a plurality of links are present between the bases of the virtual nodes, it becomes possible to prevent increase of the number of link states by bundling together this plurality of links and considering them all together as a single virtual link. At this time, the method is considered of bundling together the links which are endowed with the same switching capability. The cost of advertisement at this time is considered to be the minimum one among the advertisement costs which are possessed by the interfaces of the links which have been bundled together. According to this method, along with reducing the number of the links, it becomes possible to advertise the minimum cost when taking this path, for each switching capability. Therefore traffic engineering at higher accuracy becomes possible.

The Twenty-Third Preferred Embodiment

It is possible to implement the layered network node, network, and layered path selection method of this preferred embodiment by utilizing a computer device, which is an information processing device. In other words, this twenty-third preferred embodiment of the present invention is a program which is distinguished in that, by being installed upon a computer device, it causes that computer device to execute procedures of, when establishing a LSP on any layer of the network which includes the layered network node of this preferred embodiment of the present invention, when selecting a path from a source node to a destination node: making a decision, by referring to said link state database of the lowest level 1, as to whether or not, among the said virtual nodes of level 1, the destination node is present within the same virtual node which includes the source node; and, if the destination node is not present within any same virtual node as the source node, making a decision, by referring to said link state database of the next higher level 2, as to whether or not the destination node is present in any of the virtual nodes of level 2 which include the said source node; and, by repeating this decision until the source node and the destination node are included within the same virtual node, selecting the virtual node of a Nth level (where N is a natural number) which includes both the source node and the destination node; and, when selecting a path of level N from the source node to the destination node within self virtual node of level N which has been selected: performing path selection of the virtual node group which is included in said virtual node of level N which has been selected with said selection means of said level N based upon said link state database of said level N; furthermore, when selecting a path of the next lower level (N−1) from the source node to the destination node among the virtual nodes which are included in this path of level N which has been selected, performing path selection with said selection means of said level (N−1) based upon said link state database of the next lowest level (N−1) than said virtual node which has been selected; and, by repeating this until the lowest level 1, selecting a path from the source node to the destination node.

Or, this twenty-third preferred embodiment of the present invention is a program which is distinguished in that, by being installed upon a computer device, it causes that computer device to execute procedures of, when establishing a LSP on any layer of the network which includes the layered network node of this preferred embodiment of the present invention, when selecting a path from a source node to a destination node: making a decision, for a network which incorporates virtual nodes of a topmost level N, by referring to said link state database of said level N, as to whether or not the destination node is present within the same virtual node which includes the source node; and, if the destination node is indeed present within the same virtual node as the source node, making a decision, by referring to said link state database of the next lower level (N−1) than self virtual node, as to whether or not the source node and the destination node are present in the same virtual node in the network of the next lower level (N−1) within self virtual node; and, by repeating this decision until the source node and the destination node are included within different virtual nodes, and selecting the virtual node of the next upward level (N−k) (where k is a natural number), selecting the virtual node of the level (N−k) which includes both the source node and the destination node; and, when selecting a path of level (N−k) from the source node to the destination node within self virtual node: performing path selection of the virtual node group which is included in said virtual node of level (N−k) which has been selected based upon said link state database of said level (N−k); furthermore, when selecting a path of the next lower level (N−k−1) from the source node to the destination node with said selection means of said level (N−k) among the virtual nodes which are included in this path of level (N−k) which has been selected, performing path selection with said selection means of said level (N−k−1) based upon said link state database of the next lowest level (N−k−1) than said virtual node which has been selected; and, by repeating this until the lowest level 1, selecting a path from the source node to the destination node.

By recording the program of this preferred embodiment upon a recording medium of this preferred embodiment, it is possible to install the program of this preferred embodiment upon a computer device by using this recording medium. Or it is possible to install the program of this preferred embodiment directly upon a computer device via a network from a server upon which the program of this preferred embodiment is stored.

In this case, it is possible to implement extension to a large scale network by utilizing a computer device, and, furthermore, since it is possible to perform the computation after having specified a range of layers upon which it is considered to be necessary to perform path computation, it is possible to eliminate computation which would become inefficient, and it is possible to implement a layered network node, network, and layered path selection method which can perform path computation at good efficiency.

Figure 24:
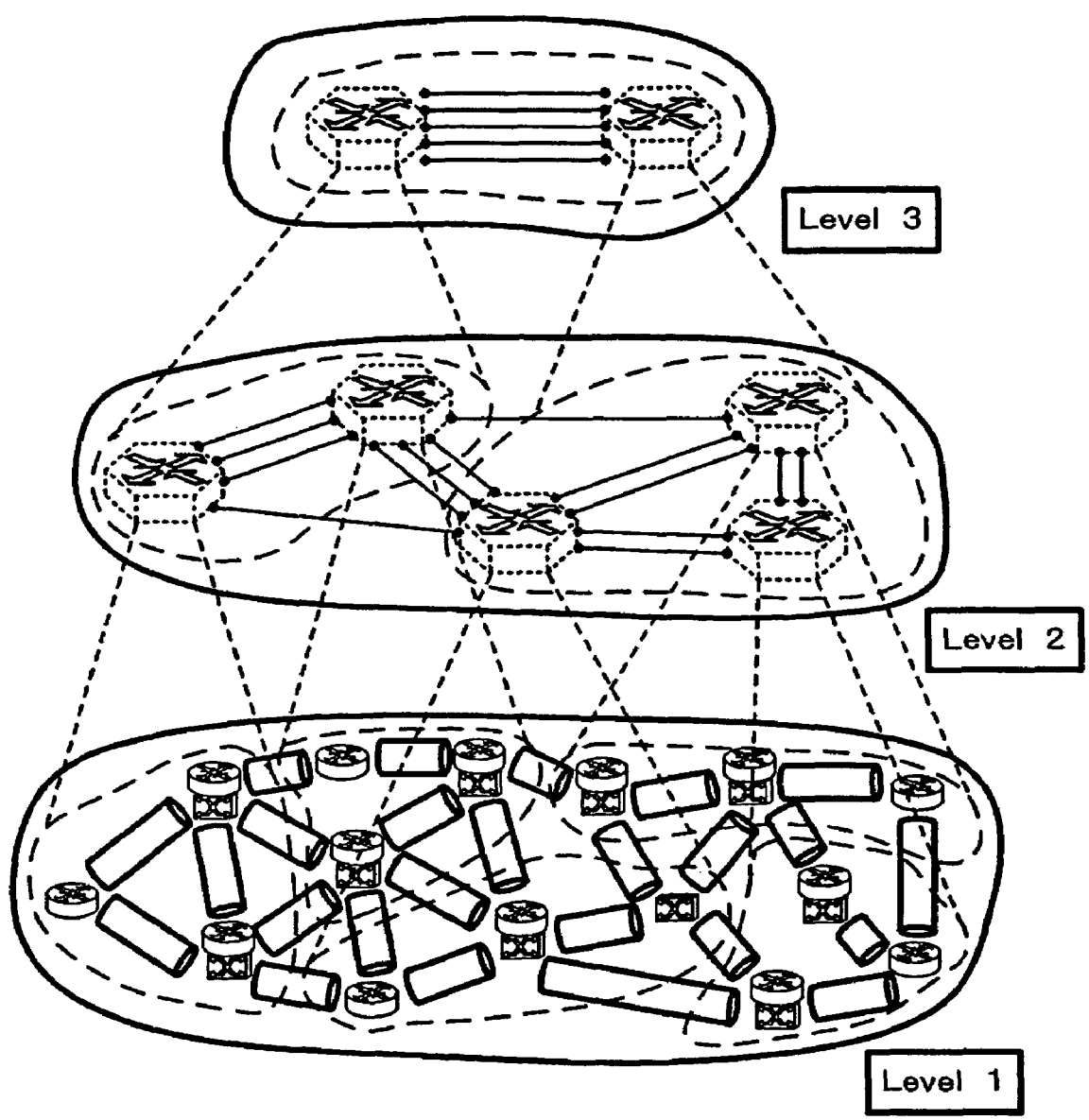
FIG. 24 is a figure showing the way in which a network is divided up into cells, is made into virtual nodes, and is layered.

The layered network of this preferred embodiment of the present invention will now be explained with reference to FIGS. 24 and 25. FIG. 24 is a figure showing how the network is divided up into cells, is made into virtual nodes, and is layered. And FIG. 25 is a figure showing the topology of the layered network.

As shown in Level 1 of FIG. 24, the layered network of this preferred embodiment of the present invention is a layered network in which the nodes which make up the network are divided up into cells (the portions surrounded by the broken lines) which consist of one or a plurality of nodes, and these cells are defined as virtual nodes of level 1, so that these virtual nodes of level 1 constitute the virtual network of level 1; and, as shown in Level 2 of FIG. 24, the said virtual nodes of level 1 which constitute the virtual network of level 1 are furthermore divided into cells which are made up from one or a plurality of said virtual nodes and constitute virtual nodes of level 2, so that the layered network such as that shown in FIG. 24 is constituted by building up a 1 to N level virtual network by repeating this type of operation of dividing into cells and making into virtual nodes once or a plurality N of times, and if, in the said layered network, a link exists which connects between different virtual nodes of the same level or of different levels, then, when the node which corresponds to the point of contact between the interior of the virtual node upon this link and the exterior is defined as an interface, and the virtual node to which said interface is related on the highest level is at the level M($\leqq$N), said interface is defined as serving as a plurality of layered interfaces from level 1 to M. In the example shown in FIG. 24, the layering continues down to Level 3.

To classify the nodes which make up the layered network of this preferred embodiment of the present invention on the large scale, they may be divided up into nodes which correspond to said interfaces, and nodes which do not correspond to said interfaces. Herein, in this description of the preferred embodiment of the present invention, the nodes which correspond to said interfaces will be termed border nodes, while the nodes which do not correspond to said interfaces will be termed non border nodes. Although In practice the border nodes are also capable of fulfilling the functions of the non border nodes, the following explanation of the border nodes will be made with emphasis upon their functions which are different from those of the non border nodes, in order to make the explanation easier to understand.

Figure 25:
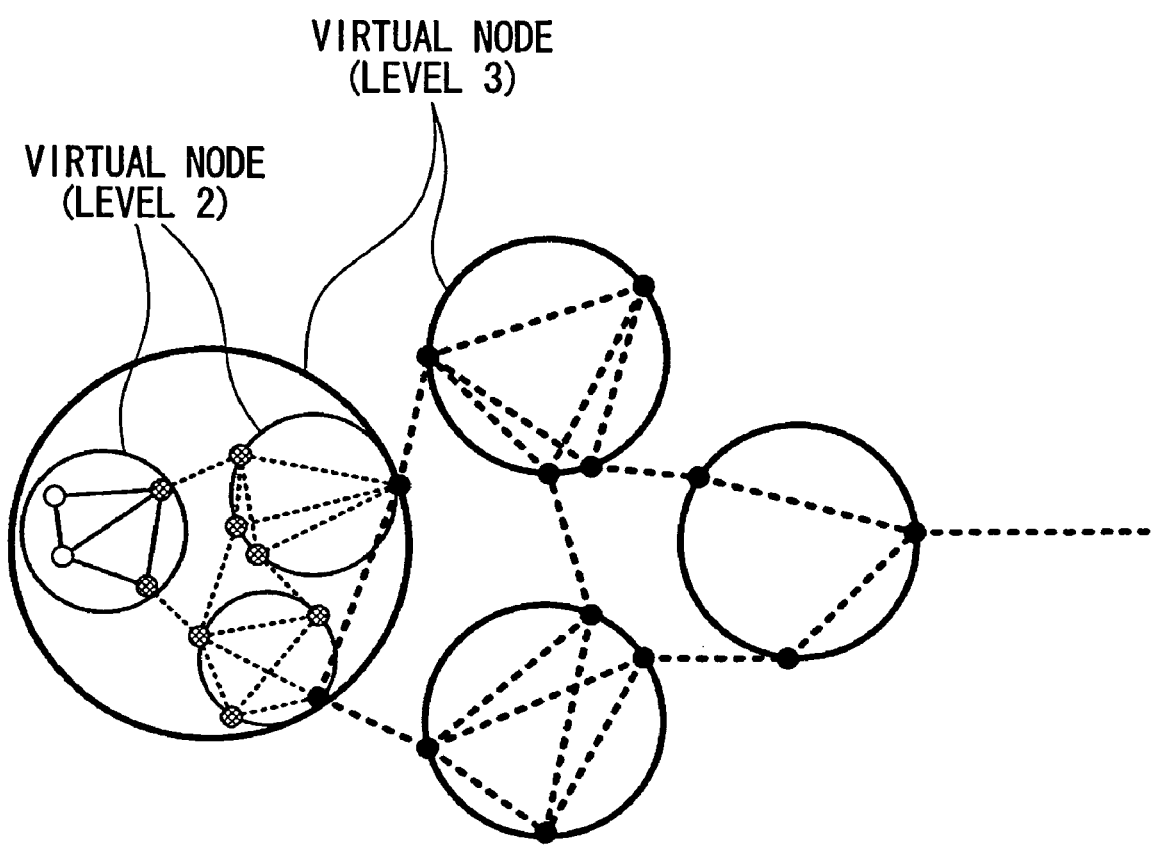
FIG. 25 is a figure showing the topology of a layered network.

FIG. 25 shows a topology of this type of layered network. The white circles in FIG. 25 are non border nodes upon level 1. The hatched circles in FIG. 25 are border nodes of level 1, and these correspond to interfaces. Although these interfaces are border nodes of level 1, they also belong to level 2. The solid black circles in FIG. 25 are border nodes of level 1, and these also correspond to interfaces. Although these interfaces are border nodes of level 1, they also belong to level 2 and to level 3. The circles shown by thin solid lines in FIG. 25 are virtual nodes of level 2, while the circles shown by thick solid lines are virtual nodes of level 3. The straight fine solid lines are links of level 1, while the straight fine broken lines are links of level 2. Furthermore, the thick broken lines are links of level 3.

The Twenty-Fourth Preferred Embodiment

Figure 26:
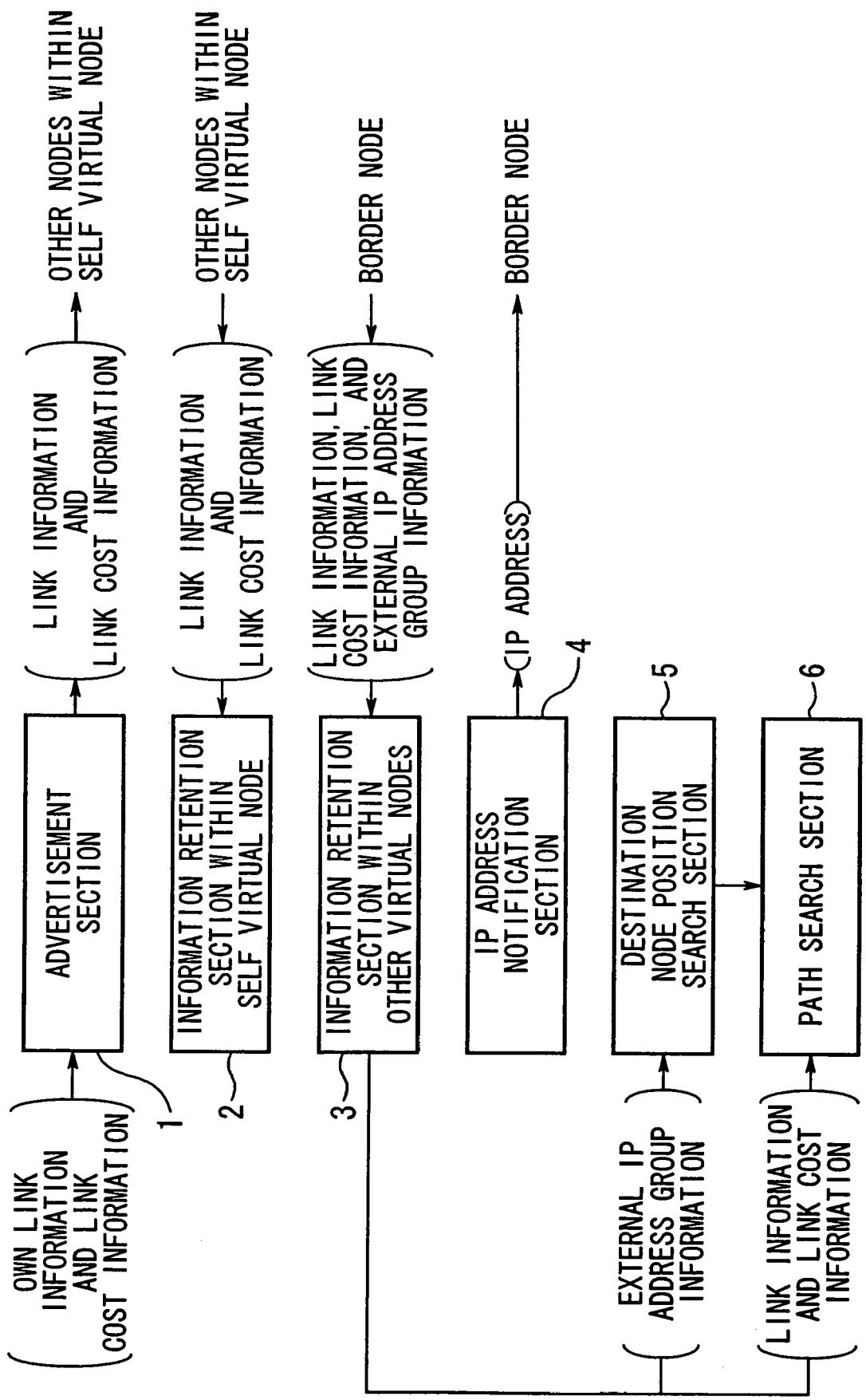
FIG. 26 is a block structure diagram of a non border node according to a twenty-fourth preferred embodiment of the present invention.

The twenty-fourth preferred embodiment of the present invention is a preferred embodiment which is related to a non border node (shown as a white circle). The structure of such a non border node is shown in FIG. 26. This non border node according to the twenty-fourth preferred embodiment of the present invention is characterized by comprising: an advertisement section 1 which advertises information about the links which are connected to self node and link cost information about said links to the other nodes within self virtual node; a retention section for information within self virtual node which receives advertisements of link information about links within self virtual node and link cost information about said links from other nodes within self virtual node, and stores said information; and a retention section 3 for information within other virtual nodes, which receives advertisements of link information about links between the border nodes which correspond to interfaces of self virtual node and the border nodes which correspond to interfaces of a virtual node on a higher level than self virtual node, and link cost information about said links, from the border nodes which correspond to the interfaces, and stores said information.

Since this border node is a node which has both the function of an interface and also the same function as a non border node, it performs advertisements just like said two elements together.

Furthermore, this non border node comprises an IP address notification section 4 which transmits its own IP address to a border node which corresponds to an interface of self virtual node, and the retention section 3 for information within other virtual nodes 3 stores external IP address group information, which is information about the IP addresses of other nodes which belong to virtual nodes other than self virtual node and information about the virtual nodes to which said IP addresses belong, which has been transmitted from the border nodes which correspond to said interfaces.

Figure 27:
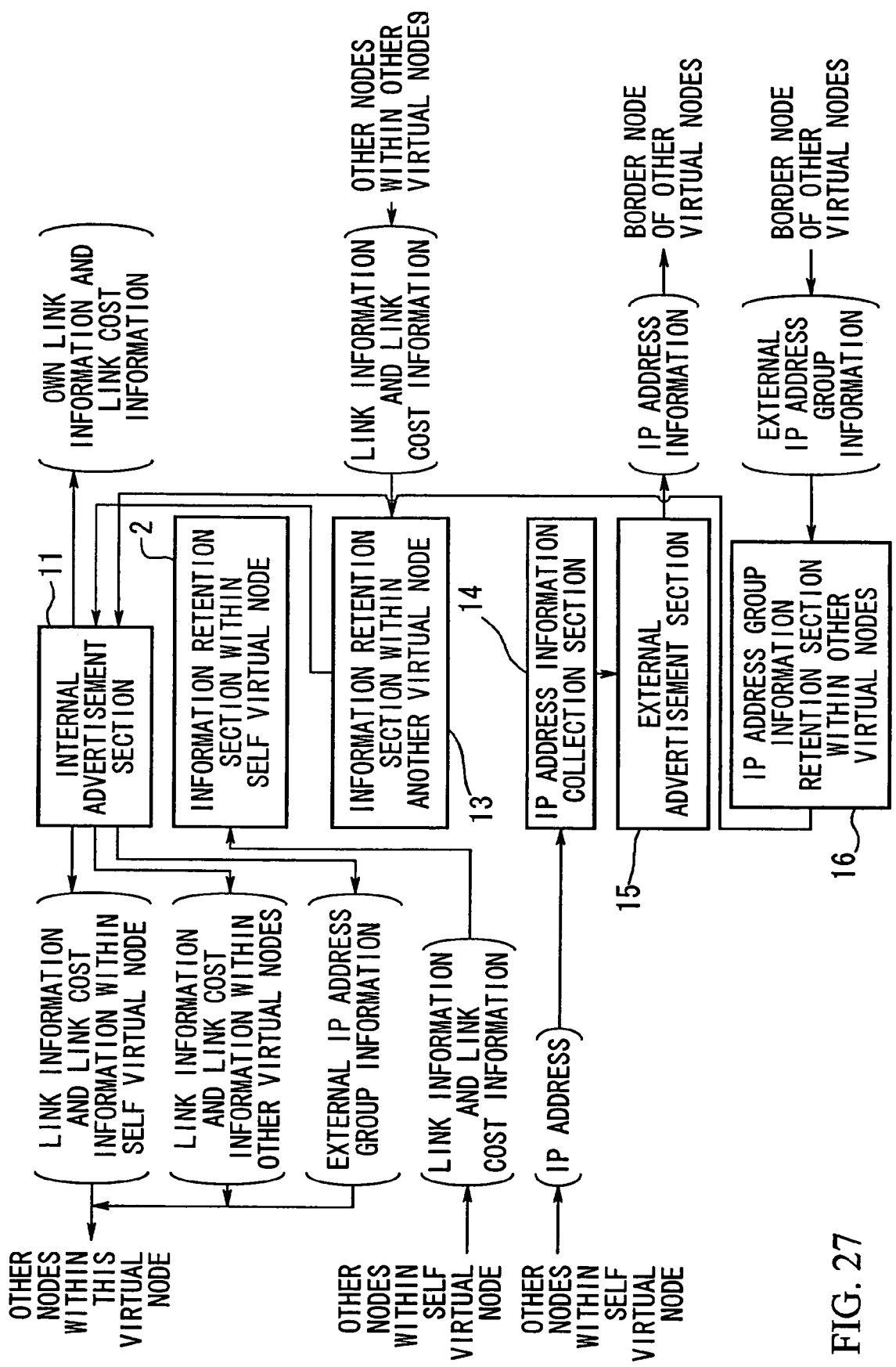
FIG. 27 is a block structure diagram of a border node according to this twenty-fourth preferred embodiment of the present invention.

Next, a border node according to this twenty-fourth preferred embodiment of the present invention will be explained with reference to FIG. 27. FIG. 27 is a block structure diagram of this border node according to the twenty-fourth preferred embodiment of the present invention. The border node according to the twenty-fourth preferred embodiment of the present invention comprises: an internal advertisement section 21 which advertises information about links within self virtual node to which self node has been connected and link cost information about the cost of said links, and information about links with a border node which corresponds to an interface with an other border node which has been connected to self node and link cost information about the cost of said links, to other nodes within self virtual node; a retention section 2 for information within self virtual node which receives information about links within self virtual node and link information about the cost of said links from other nodes within self virtual node, and stores said information; and a retention section 12 for information within other virtual nodes which receives information about links on higher levels and link information about the cost of said links from a border node which corresponds to said interface with an other virtual node, and stores said information.

Furthermore, it comprises: an IP address information collection section 14 which gathers together and stores IP address information from other nodes within self virtual node, an external advertisement section 15 which advertises to an other node which corresponds with an interface with an other virtual node IP address information which has been gathered together by this IP address information collection section 14, and a retention section 16 for IP address groups within other virtual nodes which stores the IP addresses of other nodes which belong to virtual nodes other than self virtual node and external IP address group information, which is information about the virtual nodes to which said IP addresses belong, which has been advertised from border nodes which correspond to interfaces with other virtual nodes, and transmits it to other nodes within self virtual node.

Figure 28:
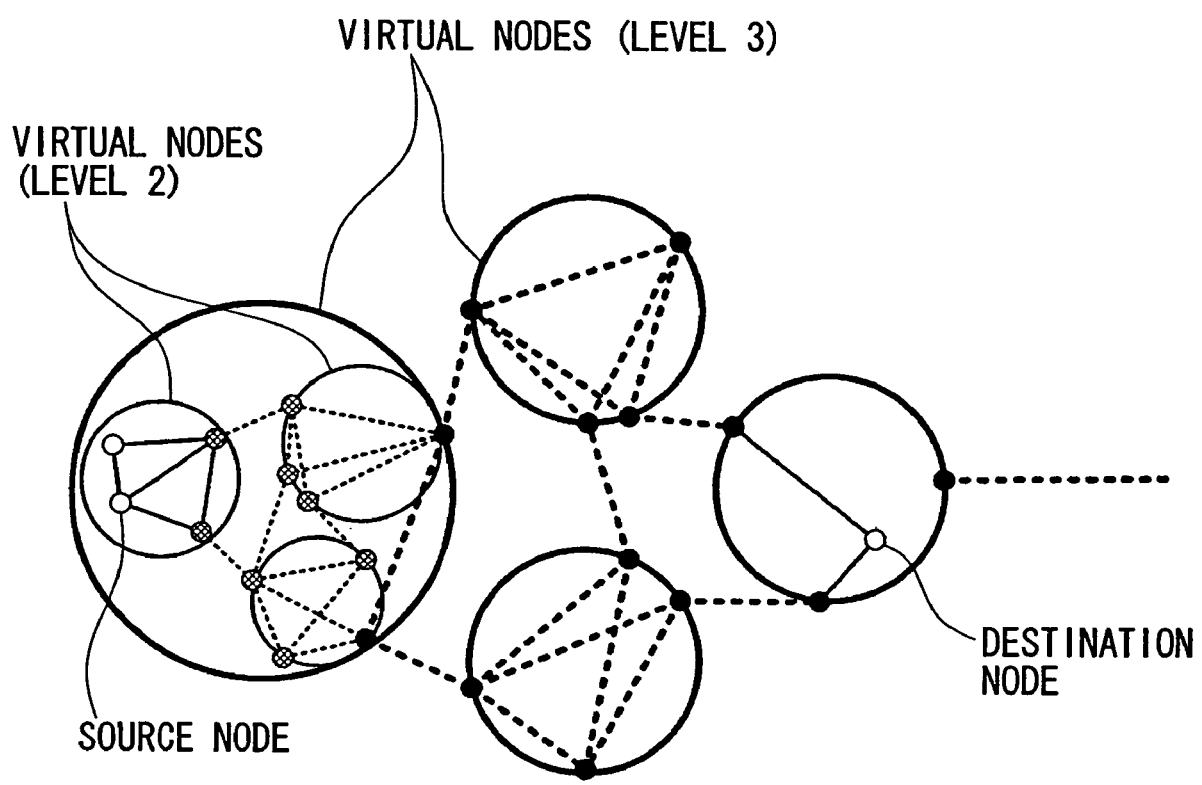
FIG. 28 is a figure for explanation of a path search method according to this twenty-fourth preferred embodiment of the present invention.

Next, the path searching method according to the twenty-fourth preferred embodiment of the present invention which utilizes the information which self node has stored will be explained with reference to FIG. 28. FIG. 28 is a figure for explaining this path searching method according to the twenty-fourth preferred embodiment. The source node for path establishment shown in FIG. 28, as shown in FIG. 26, comprises: a destination node position search section 5 which specifies, from the IP address of the destination node for path establishment, a virtual node to which said destination node belongs, based upon the external IP address group information; and a path search section 6 which searches out a path to a border node which corresponds with the interface to the virtual node to which said destination node which has been specified by the destination node position search section 5 belongs, based upon information about links between the border node which corresponds to the interface of self virtual node and the border node which corresponds with the interface of the virtual node of a higher level than self virtual node, and link cost information about said links.

In other words, the destination node position search section 5 searches out the virtual node to which the destination node belongs, based upon the external IP address group information which has been stored in the retention section 3 for information within other virtual nodes. And the path search section 6 searches out a path to the border node with said virtual node, based upon the link information and the link cost information which has been stored in the retention section 3 for information within other virtual nodes.

With this path searching method according to the twenty-fourth preferred embodiment of the present invention, although the source node does not perform a search as far as a detailed path within the virtual node to which the destination node belongs, provided that it does search out a path to the border node of the virtual node to which the destination node belongs, no evil effect will occur and cause a problem in practice, even if path searching to the destination node from said border node is delegated to said border node.

The Twenty-Fifth Preferred Embodiment

Figure 29:
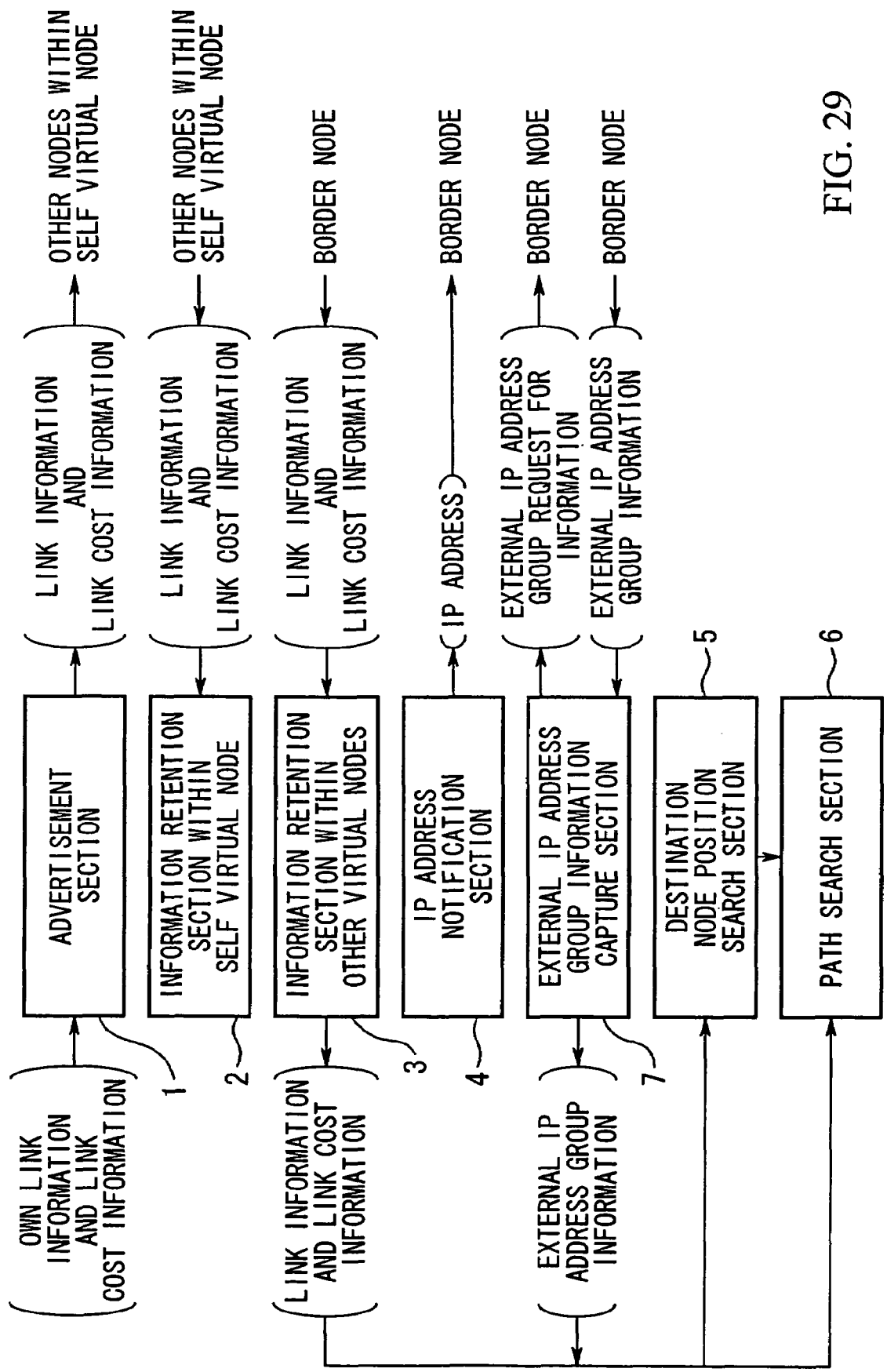
FIG. 29 is a block structure diagram of a non border node according to a twenty-fifth preferred embodiment of the present invention.

A non border node according to a twenty-fifth preferred embodiment of the present invention will now be explained with reference to FIG. 29. FIG. 29 is a block structure diagram of this non border node according to the twenty-fifth preferred embodiment. This non border node according to the twenty-fifth preferred embodiment of the present invention is basically the same in structure as the non border node of the twenty-fourth preferred embodiment of the present invention shown in FIG. 26. The features by which it differs are that an external IP address group information capture section 7 is additionally provided, and that the retention section 3 for information within other virtual nodes does not store the external IP address group information.

The external IP address group information capture section 7 requests and obtains the IP addresses of other nodes which belong to virtual nodes other than self virtual node, and external IP address group information, which is information about the virtual nodes to which said IP addresses belong, from border nodes which correspond to said interface.

Figure 30:
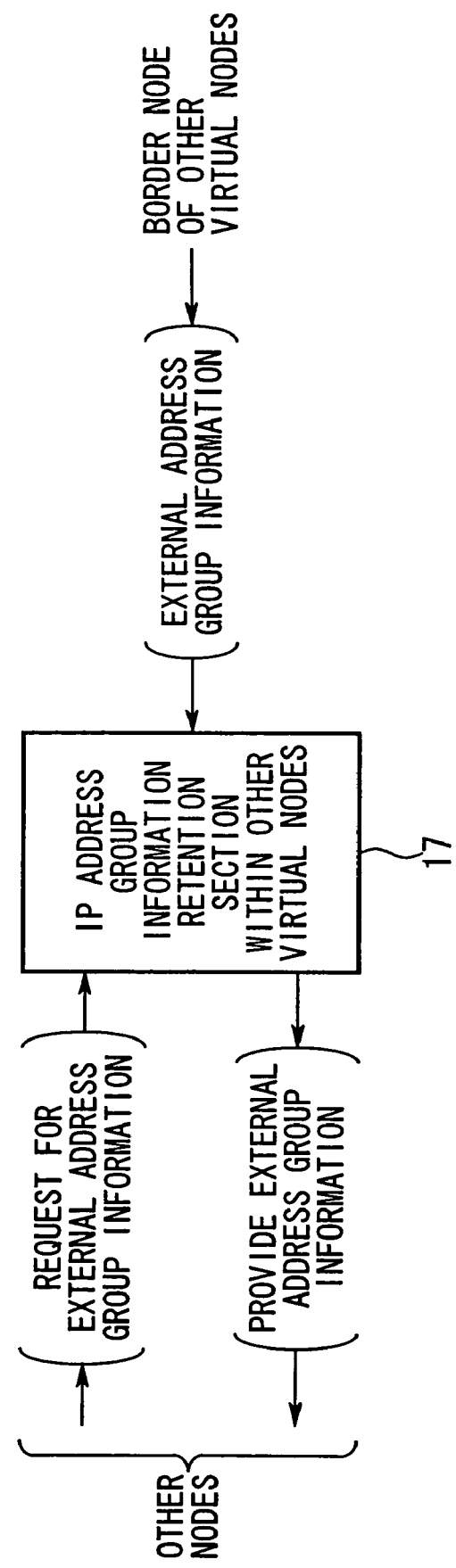
FIG. 30 is a block structure diagram of a border node according to this twenty-fifth preferred embodiment of the present invention.

Next, a border node according to this twenty-fifth preferred embodiment of the present invention will be explained with reference to FIG. 30. FIG. 30 is a block structure diagram of an essential portion of this border node according to the twenty-fifth preferred embodiment. An IP address group information retention section 17 within an other virtual node of this border node according to the twenty-fifth preferred embodiment of the present invention stores the IP addresses of other nodes which belong to virtual nodes other than self virtual node, and external IP address group information, which is information about the virtual nodes to which said IP addresses belong, which has been advertised from a border node which corresponds to an interface with an other virtual node, and offers this external IP address group information which has been stored to said other nodes, according to requests from said other nodes. Apart from this, it is the same as the border node of the twenty-fourth preferred embodiment of the present invention as shown in FIG. 27. It should be understood that external IP address group information is not required in the advertisement contents of the internal advertisement section 11, in this twenty-fifth preferred embodiment of the present invention.

This twenty-fifth preferred embodiment of the present invention is applied in the case of using a network environment in which the destination node shifts frequently. In other words although, with this twenty-fifth preferred embodiment of the present invention, a necessity arises for the border node to perform transmission of update information to the source node each time the destination node shifts, since, with this twenty-fifth preferred embodiment, an offer of information is requested from the source node to the border node only when the source node performs path searching, the border node does not need to perform transmission of update information to the source node each time the destination node shifts, so that it is possible to reduce the amount of processing which is required, by comparison with the twenty-fourth preferred embodiment of the present invention described above.

The Twenty-Sixth Preferred Embodiment

Figure 31:
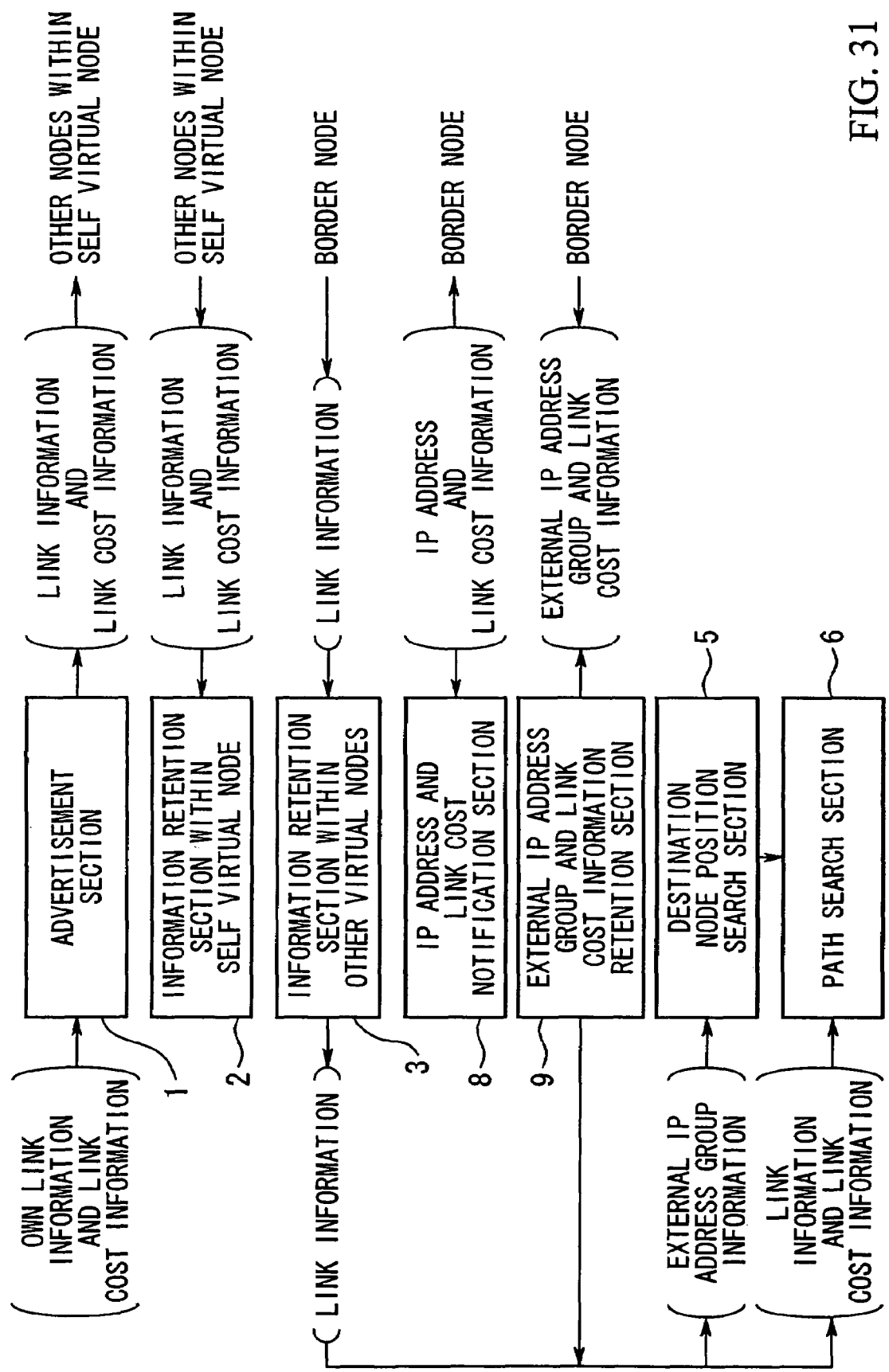
FIG. 31 is a block structure diagram of a non border node according to a twenty-sixth preferred embodiment of the present invention.

A non border node according to a twenty-sixth preferred embodiment of the present invention will now be explained with reference to FIG. 31. FIG. 31 is a block structure diagram of this non border node according to the twenty-sixth preferred embodiment. This non border node according to the twenty-sixth preferred embodiment of the present invention comprises: an IP address and link cost notification section 8 which transmits the IP address of self node and link cost information between self node and the border node which corresponds to the interface of self virtual node, and link cost information, to said border node which corresponds to said interface;

and an external IP address group and link cost information retention section 9 which stores the IP addresses of other nodes which belong to virtual nodes other than self virtual node and external IP address group information, which is information about the virtual nodes to which said IP addresses belong, which has been transmitted from border nodes which correspond to said interface, and link cost information from the border node which corresponds to said interface to said other node, in correspondence with the IP addresses of said other nodes.

With this non border node according to the twenty-sixth preferred embodiment of the present invention, the link cost information is transmitted to the border node by the IP address and link cost notification section, along with the IP address of self node 8, as far as said border node.

The link information and the external IP address group and link cost information for within other virtual nodes are transmitted from the border node, and they are respectively stored in the retention section 3 for information within other virtual nodes and in the external address group and link cost information retention section 9.

The destination node position search section 5 searches out the virtual node to 5 which the destination node belongs, based upon the external IP address group information which has been stored in the external address group and link cost information retention section 9. And the path search section 6 searches out a path to the border node with said virtual node, based upon the link cost information which is stored in the external address group and link cost information retention section 9.

Figure 32:
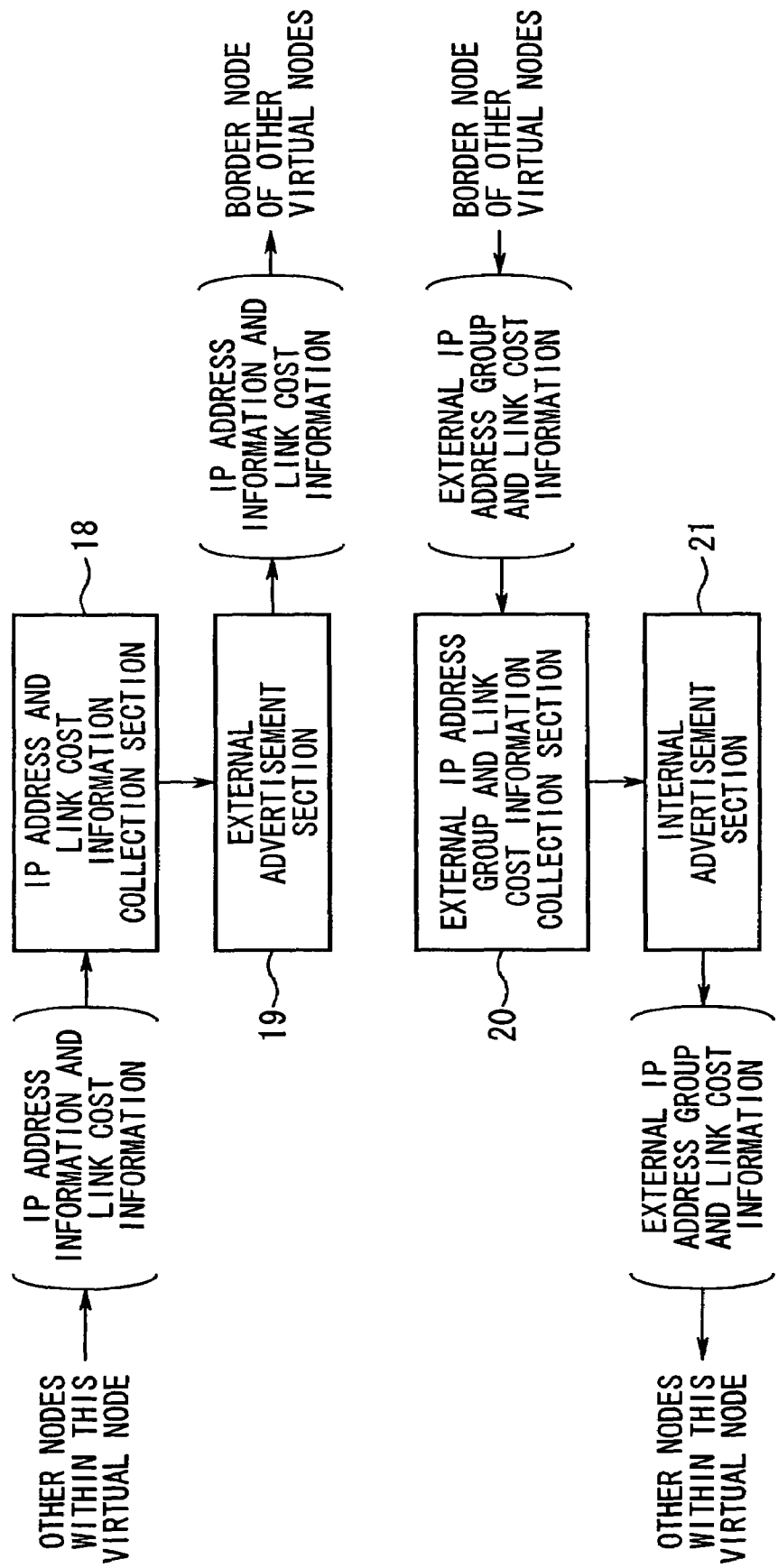
FIG. 32 is a block structure diagram of an essential portion of a border node according to this twenty-sixth preferred embodiment of the present invention.

Next, a border node according to this twenty-sixth preferred embodiment of the present invention will be explained with reference to FIG. 32. FIG. 32 is a block structure diagram of this border node according to the twenty-sixth preferred embodiment of the present invention. As shown in FIG. 32, the border node according to the twenty-sixth preferred embodiment of the present invention comprises: an IP address and link cost information collection section 18 which gathers together and stores IP address information from other nodes within self virtual node and link cost information between said other node and self node; an external advertisement section 19 which advertises to a border node which corresponds to an interface with an other virtual node the IP address information and link cost information which have been gathered together by this IP address and link cost information collection section 18; and an external IP address group and link cost information collection section 20 and an internal advertisement section 21 which stores external IP address group information, which is information about the IP addresses of other nodes which belong to virtual nodes other than self virtual node and information about the virtual nodes to which said IP addresses belong, which has been advertised from the border nodes which correspond to said interface of the other virtual node, and link cost information from the border node which corresponds with said interface with said other virtual node to said other node, in correspondence with the IP addresses of said other nodes, and transmits it to other nodes within self virtual node.

Although, with this twenty-sixth preferred embodiment of the present invention, the source node cannot perform its searching as far as a detailed path within the virtual node to which the destination node belongs, nevertheless the source node is able to search out the path up to the destination node for which the link cost is the least, provided that it can search out a path as far as the border node of the virtual node to which the destination node belongs, since the link cost from said border node up to the destination node is known.

The Twenty-Seventh Preferred Embodiment

Figure 33:
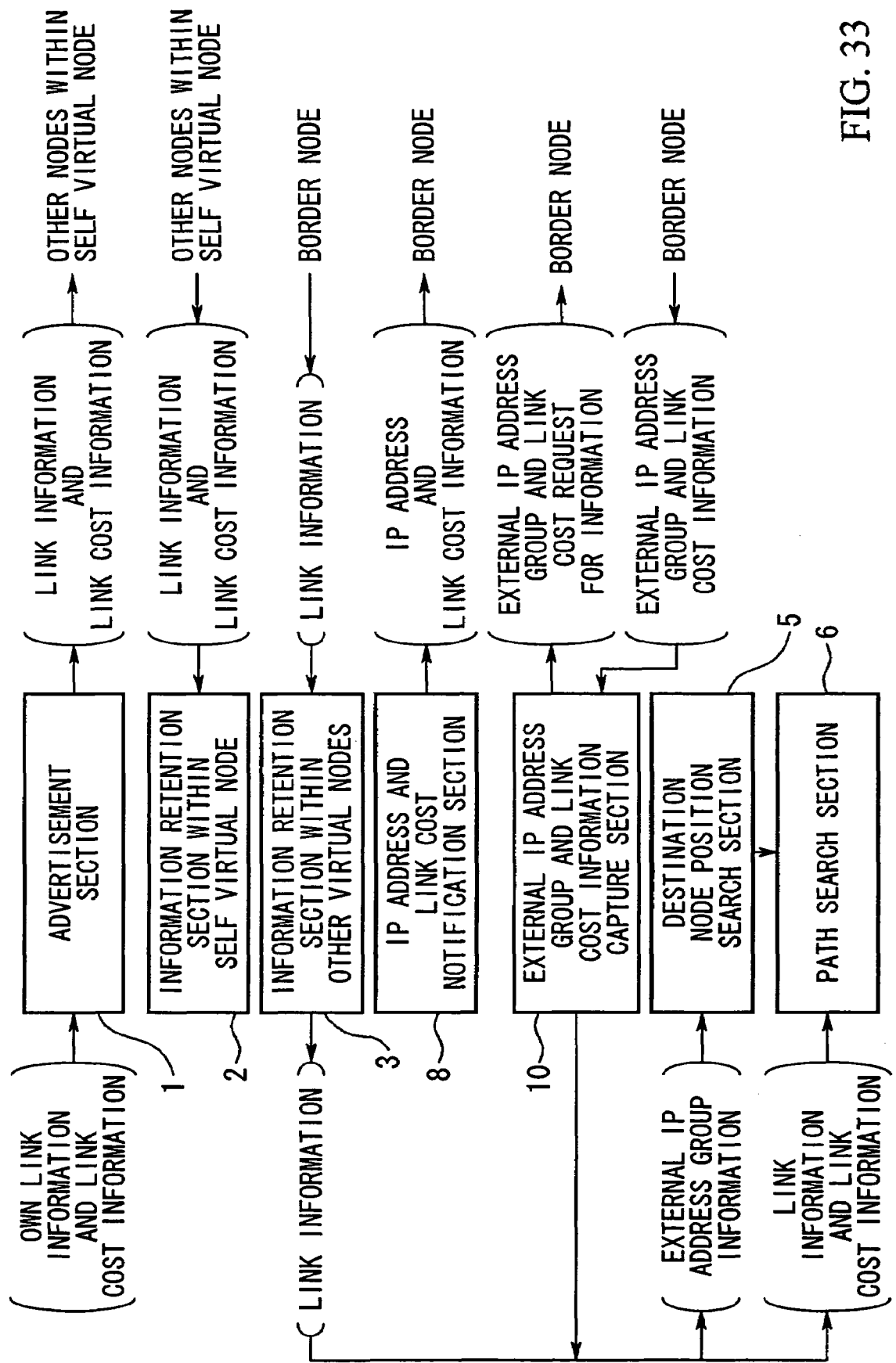
FIG. 33 is a block structure diagram of a non border node according to a twenty-seventh preferred embodiment of the present invention.

A non border node according to a twenty-seventh preferred embodiment of the present invention will now be explained with reference to FIG. 33. FIG. 33 is a block structure diagram of this non border node according to the twenty-seventh preferred embodiment. By contrast with the twenty-sixth preferred embodiment of the present invention described above, this non border node according to the twenty-seventh preferred embodiment of the present invention does not store external IP address group and link cost information, but differs in that, when performing path computation, an external IP address group and link cost information capture section 10 requests and obtains that information from the border node.

Figure 34:
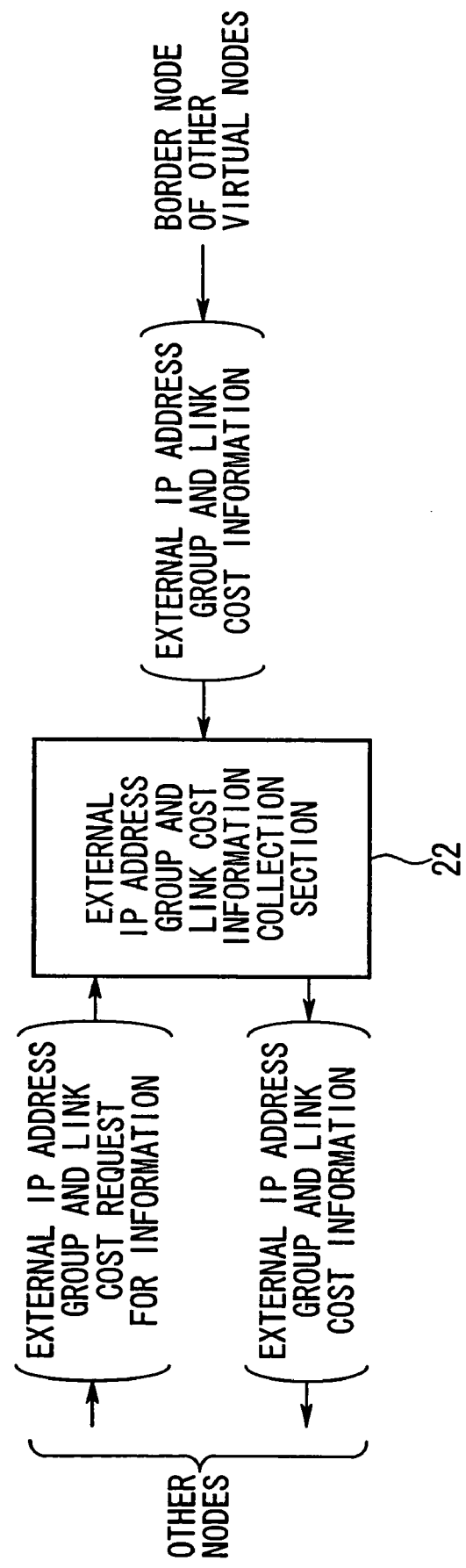
FIG. 34 is a block structure diagram of an essential portion of a border node according to this twenty-seventh preferred embodiment of the present invention.

Next, a border node according to this twenty-seventh preferred embodiment of the present invention will be explained with reference to FIG. 34. FIG. 34 is a block structure diagram of an essential portion of this border node according to the twenty-seventh preferred embodiment. By contrast with the twenty-sixth preferred embodiment of the present invention shown in FIG. 32, this border node according to the twenty-seventh preferred embodiment of the present invention differs in that an external IP address group and link cost information collection section 22, along with storing external IP address group information, which is information about the IP addresses of other nodes which belong to virtual nodes other than self virtual node and information about the virtual nodes to which said IP addresses belong, which has been advertised from the border nodes which correspond to said interface of the other virtual node, and link cost information from the border node which corresponds with said interface with said other virtual node to said other node, in correspondence with the IP addresses of said other nodes, also, upon a request from an other node, offers to said other node said external IP address group information and link cost information which has been stored.

Since, when the source node requests an offer of information from a border node, it is possible to obtain information about the virtual node to which said destination belongs and the link cost information from said border node up to said destination node by performing designation of the IP address of the destination node, it is possible to obtain the minimum amount of information which is required, and accordingly it is possible to alleviate the amount of processing upon the border node and upon the non border node which becomes the source node.

In the same manner as in the twenty-fifth preferred embodiment of the present invention, this twenty-seventh preferred embodiment of the present invention is applied in the case of utilizing a network environment in which the destination node changes frequently. In other words although, with the twenty-sixth preferred embodiment of the present invention, the necessity arises for the border node to perform transmission of information which has been updated to the source node each time the destination node shifts, by contrast, in this twenty-seventh preferred embodiment of the present invention, since an offer of information is only requested from the source node to the border node when the source node perform path searching, therefore it is not necessary for the border node to perform transmission of update information to the source node every time the destination node shifts, so that it is possible to reduce the amount of processing, as compared with the twenty-sixth preferred embodiment of the present invention.

The Twenty-Eighth Preferred Embodiment

Figure 35:
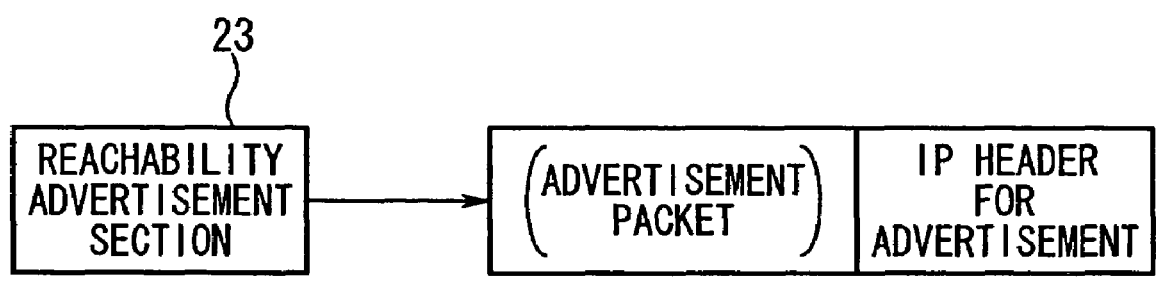
FIG. 35 is a block structure diagram of an essential portion of a non border node according to a twenty-eighth preferred embodiment of the present invention.

A non border node according to a twenty-eighth preferred embodiment according to the present invention will now be explained with reference to FIG. 35. FIG. 35 is a block structure diagram of an essential portion of a non border node according to this twenty-eighth preferred embodiment of the present invention. This non border node according to this twenty-eighth preferred embodiment of the present invention, as shown in FIG. 35, comprises a reachability advertisement section 23 which dispatches a packet for checking reachability to a border node which corresponds to an interface of self virtual node. In other words, while with the twenty-fourth through the twenty-eighth preferred embodiments of the present invention it was possible for the non border nodes to perform transmission of reachability to specified border nodes, by contrast, in this twenty-eighth preferred embodiment of the present invention, the non border nodes perform advertisement of reachability to non specified border nodes within self virtual node. By doing this, in the processing by the non border nodes, it is sufficient for them simply to dispatch reachability advertisement packets, so that it is possible to alleviate the processing burden.

IP headers for advertisement are assigned to the reachability advertisement packets, and these are set up so as to be destined for non specified border nodes. Furthermore, by writing the IP addresses of the non border nodes which are the sources of dispatch into said IP headers, it is possible to check the reachability corresponding to the IP addresses in the border nodes which receive said IP packets for advertisement, since it is possible to specify their sources of dispatch.

Figure 36:
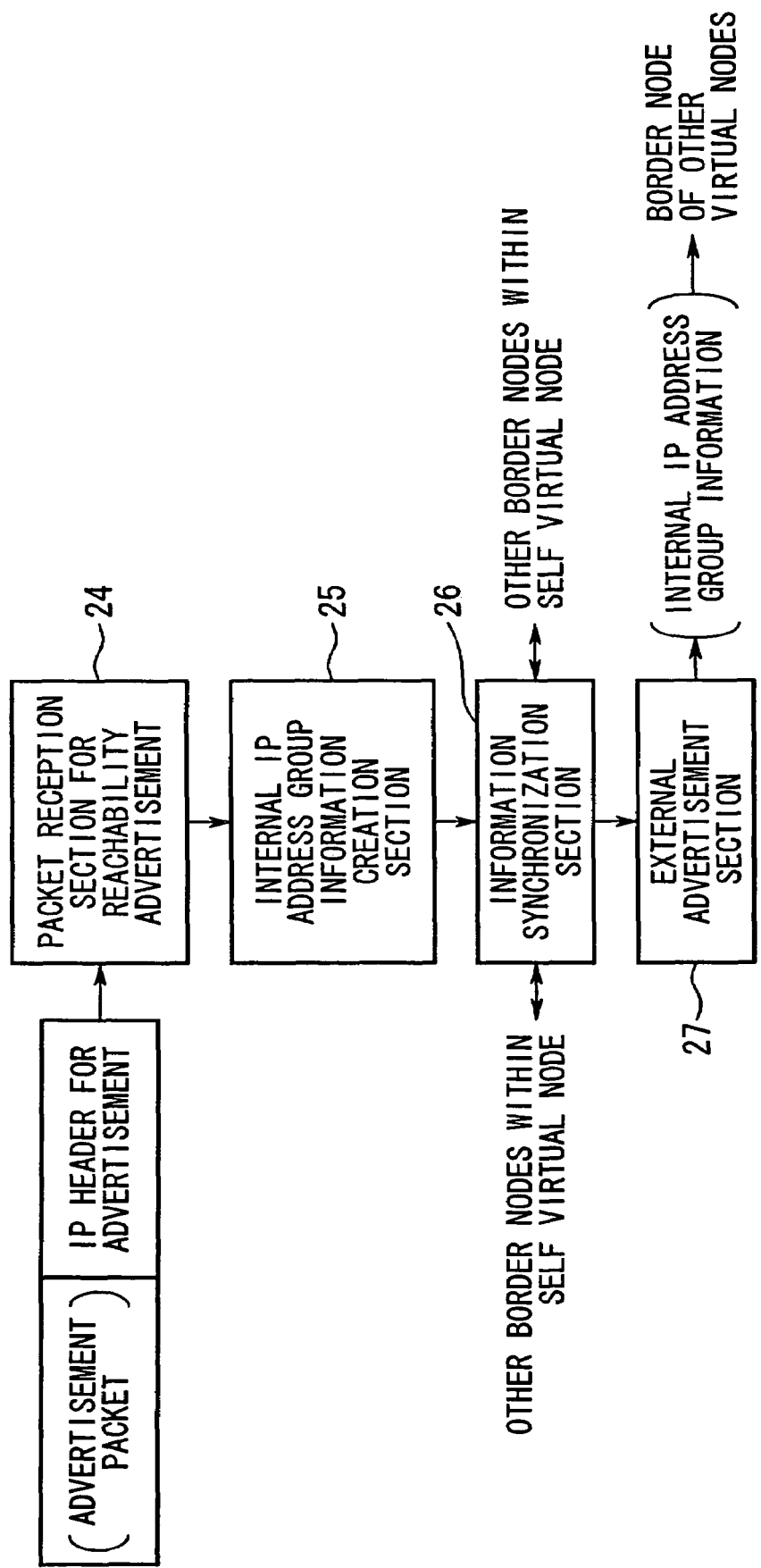
FIG. 36 is a block structure diagram of an essential portion of a border node according to this twenty-eighth preferred embodiment of the present invention.

Next, a border node according to this twenty-eighth preferred embodiment of the present invention will be explained with reference to FIG. 36. FIG. 36 is a block structure diagram of an essential portion of this border node according to the twenty-eighth preferred embodiment. This border node according to the twenty-eighth preferred embodiment of the present invention comprises a reception section 24 for reachability advertisement packets which receives packets for checking reachability from other nodes within self virtual node, an internal IP address group information creation section 25 which summarizes the IP addresses of said packets which have been received and creates internal IP address group information which is related to nodes within self virtual node, an information synchronization section 26 which converts said internal IP address group information which has thus been created with other border nodes within self virtual node, compensates them so that they are neither too great nor too small, and synchronizes them as internal IP address group information which has been unified for self virtual node, and an external advertisement section 27 which advertises this internal IP address group information which has thus been unified by said information synchronization section 26 to the border node which corresponds to the interface with the other virtual node.

Figure 37:
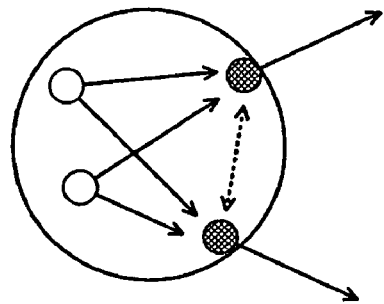
FIG. 37 is a figure showing the general concept of the operation of this twenty-eighth preferred embodiment of the present invention.

FIG. 37 shows the general concept of operation of this twenty-eighth preferred embodiment of the present invention. A non border node (shown by the white circle) emits a packet for advertising reachability. A border node (shown by hatching) which has received this packet establishes synchronization of the internal IP address group information between border nodes (as shown by the broken line), and, after having created unified internal IP address group information, advertises said internal IP address group information to the border node of the other virtual node.

Figure 38:
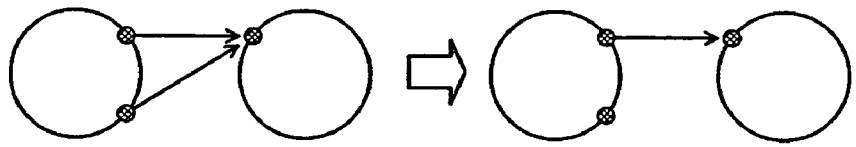
FIG. 38 is a figure showing the case when advertisement is performed from a plurality of border nodes within self virtual node to the same border node within an other virtual node.

Furthermore, as shown in FIG. 38, when advertisements are being performed from a plurality of border nodes within self virtual node to the same border node within an other virtual node, since the contents of the advertisements are the same, there will be no problem whichever of the border nodes within self virtual node perform the advertisement, and, due to this, it is possible to eliminate unnecessary advertisements. In order to implement this concept, as shown in FIG. 39, the external advertisement section 27 comprises an advertisement implementation node determination section 28 which decides whether or not an advertisement path is available from an other border node within self virtual node to the border node which corresponds to the interface of the other virtual node, and, when the result of this decision is "yes", performs advertisement by one or another advertisement path of self node or of said other border node to the border node which corresponds to the interface of said other virtual node.

The Twenty-Ninth Preferred Embodiment

Figure 40:
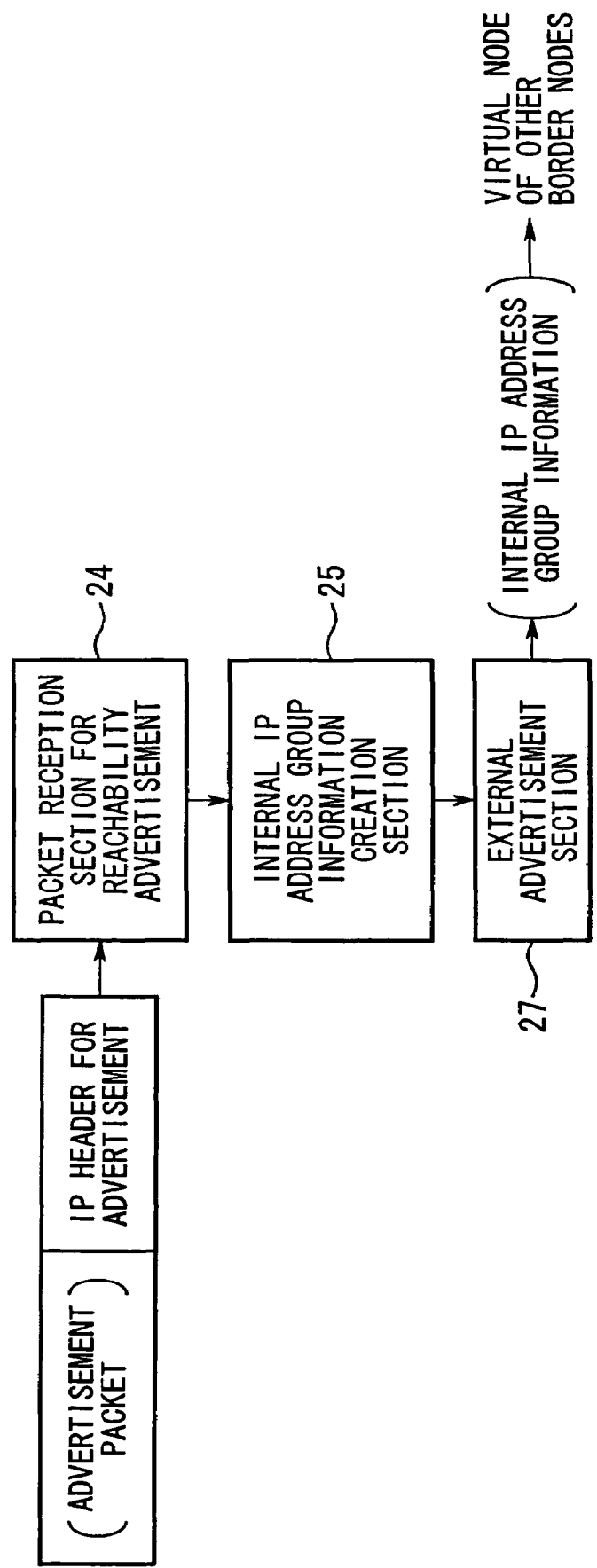
FIG. 40 is a block structure diagram of an essential portion of a border node according to a twenty-ninth preferred embodiment of the present invention.

A border node according to a twenty-ninth preferred embodiment of the present invention will now be explained with reference to FIG. 40. FIG. 40 is a block structure diagram of an essential portion of a border node according to this twenty-ninth preferred embodiment of the present invention. This border node comprises: a reception section 24 for reachability advertisement packets which receives packets for checking reachability from other nodes within self virtual node, an internal IP address group information creation section 25 which summarizes the IP addresses of said packets which have been received and creates internal IP address group information which is related to nodes within self virtual node, and an external advertisement section 27 which advertises this internal IP address group information which has thus been created to the border node which corresponds to the interface with the other virtual node.

Thus, in this border node according to the twenty-ninth preferred embodiment of the present invention, the information synchronization section 26 of the twenty-eighth preferred embodiment of the present invention has been eliminated. By doing this, it is ventured to permit disagreement of the internal IP address group information between border nodes within the same virtual node. In other words, since it may happen that the reachability with respect to some border node may differ even for border nodes within the same virtual node, by performing advertisement of this kind of distinction, it becomes possible to recognize the border nodes through which it is not possible to establish a path by path computation.

The Thirtieth Preferred Embodiment

Figure 41:
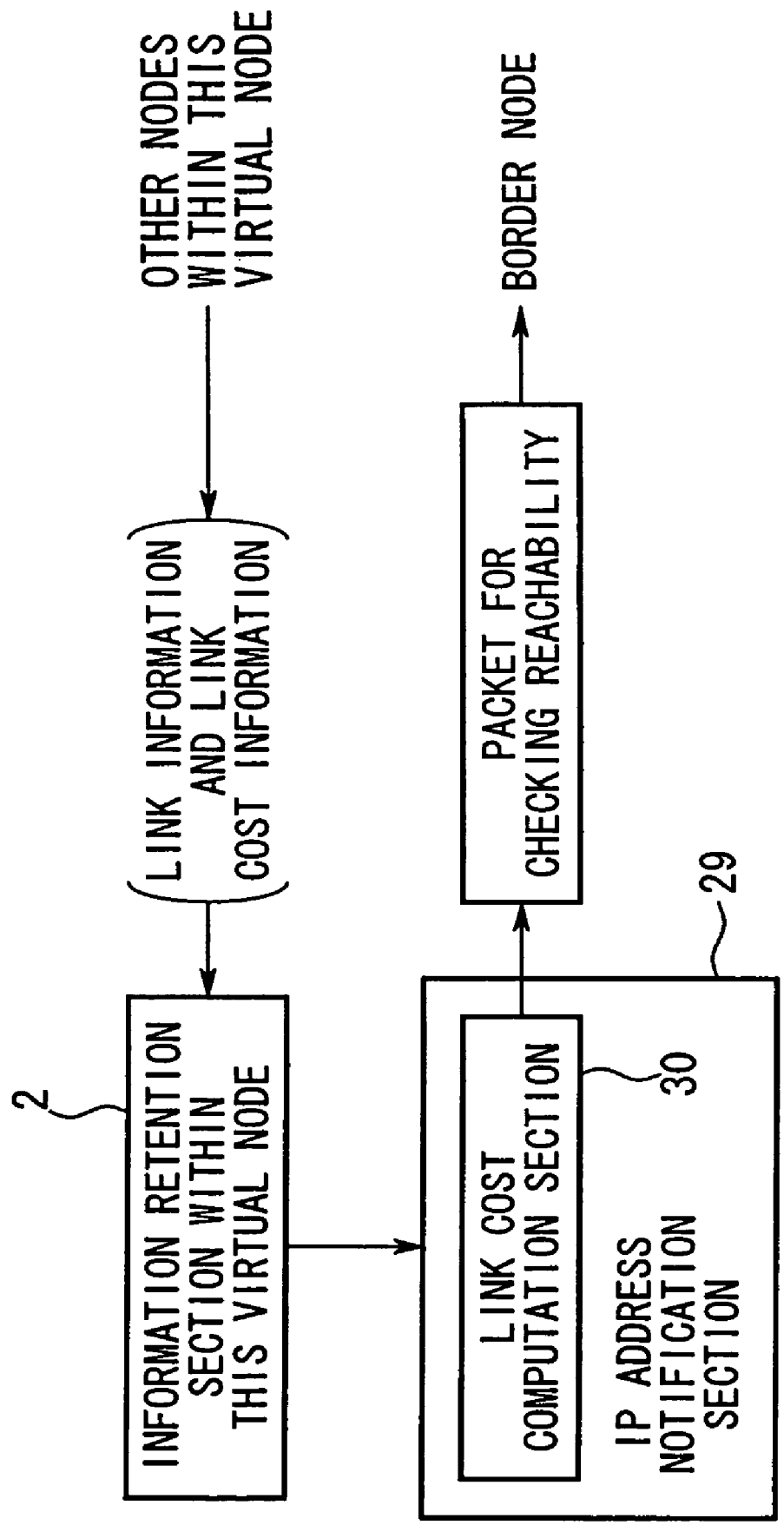
FIG. 41 is a block structure diagram of essential portions of a non border node according to thirtieth, thirty-first, and thirty-second preferred embodiments of the present invention.

A non border node according to a thirtieth preferred embodiment of the present invention will now be explained with reference to FIG. 41. FIG. 41 is a block structure diagram of an essential portion of a non border node according to this thirtieth preferred embodiment of the present invention. This non border node according to the thirtieth preferred embodiment of the present invention comprises a link cost computation section 30 which computes individual link costs for a plurality of border nodes which correspond to said interface of self virtual node. In other words, it computes a link cost to each border node within self virtual node, based upon the information which has been stored in the retention section 2 for information within self virtual node.

The IP address notification section 29 transmits its own IP address by emitting a packet for checking reachability to the border node which corresponds to said interface for which, according to the computation results of this link cost computation section 30, the link cost is the least.

By doing this, the border node is able to ascertain only the IP address of the non border node for which the link cost is the least, and accordingly it is possible to reduce the amount of information which needs to be summarized and advertised.

The Thirty-First Preferred Embodiment

A non border node according to a thirty-first preferred embodiment of the present invention will now be explained with reference to FIG. 41. FIG. 41 is a block structure diagram of an essential portion of a non border node according to this thirty-first preferred embodiment of the present invention, and is common with the thirtieth preferred embodiment. This non border node according to the thirty-first preferred embodiment of the present invention comprises a link cost computation section 30 which computes individual link costs for a plurality of border nodes which correspond to said interface of self virtual node. In other words, it computes a link cost to each border node within self virtual node, based upon the information which has been stored in the retention section 2 for information within self virtual node.

The IP address notification section 29 transmits its own IP address by emitting a packet for checking reachability to the border node which corresponds to said interface for which, according to the computation results of this link cost computation section 30, the link cost is the n-th least in order (where n is a natural number).

By doing this, the border node is able to ascertain only the IP addresses of the minority of non border nodes for which the link costs are the least in order, and accordingly it is possible to reduce the amount of information which needs to be summarized and advertised. To compare this thirty-first preferred embodiment of the present invention with the thirtieth preferred embodiment of the present invention described above, although it may happen that the amount of information which needs to be summarized and advertised becomes greater, by appropriately varying the value of the natural number n, it is easily possible to adjust the amount of information to an amount which the border nodes can most easily deal with in every possible set of circumstances.

The Thirty-Second Preferred Embodiment

A non border node according to a thirty-second preferred embodiment of the present invention will now be explained with reference to FIG. 41. FIG. 41 is a block structure diagram of an essential portion of a non border node according to this thirty-second preferred embodiment of the present invention, and is common with the thirtieth and the thirty-first preferred embodiments. This non border node according to the thirty-second preferred embodiment of the present invention, as shown in FIG. 41, comprises a link cost computation section 30 which computes individual link costs for a plurality of border nodes which correspond to said interface of self virtual node. In other words, it computes a link cost to each border node within self virtual node, based upon the information which has been stored in the retention section 2 for information within self virtual node.

The IP address notification section 29 transmits its own IP address and summarized link cost information to the border node which corresponds to said interface for which, according to the computation results of this link cost computation section 30, the link cost is the n-th least in order (where n is a natural number), by emitting a packet for checking reachability which includes information about said number in order.

By doing this, the border node is able to ascertain only the IP addresses of the minority of non border nodes for which the link costs are the least in order, and accordingly it is possible to reduce the amount of information which needs to be summarized and advertised. To compare this thirty-second preferred embodiment of the present invention with the thirtieth-first preferred embodiment of the present invention described above, it is possible to recognize the summary information about link cost by the information about the number in order of the link cost. With summary information and the like, it is possible to alleviate the amount of information which must be handled, as compared with the case of dealing with complete link cost information.

Figure 42:
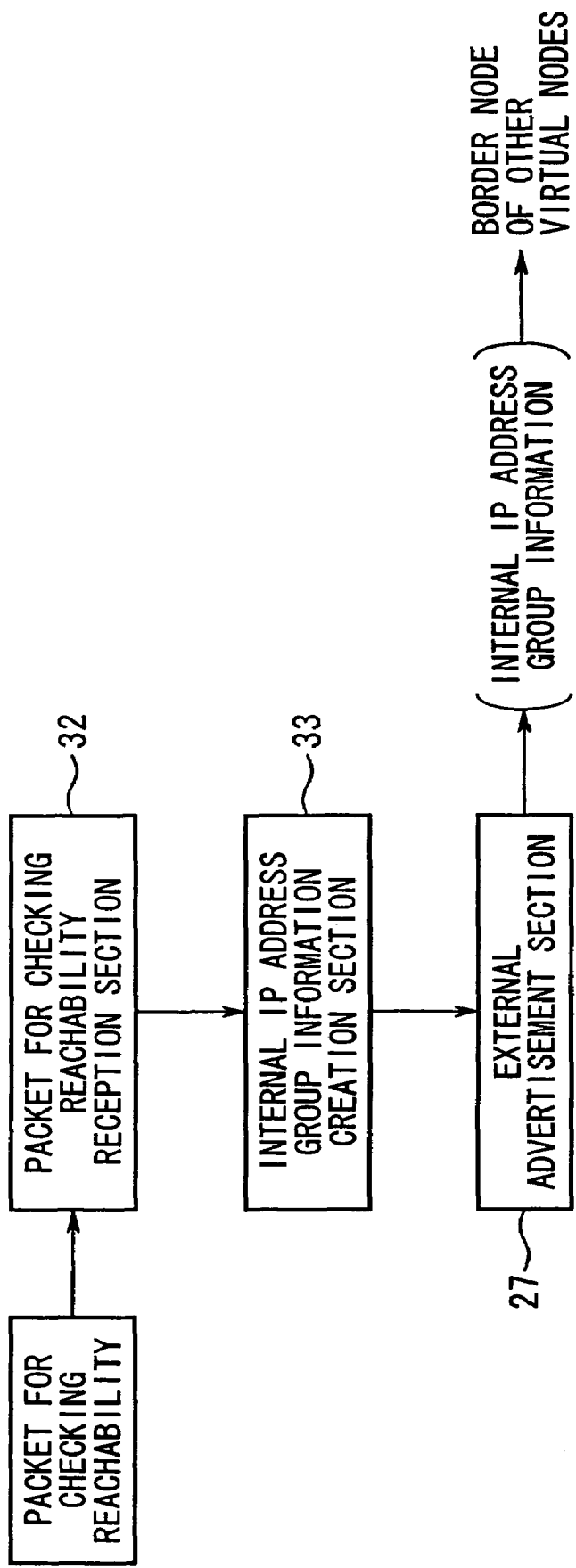
FIG. 42 is a block structure diagram of an essential portion of a border node according to the thirty-second preferred embodiment of the present invention.

It should be understood that, as shown in FIG. 42, this border node according to the thirty-second preferred embodiment of the present invention comprises: a reception section 32 for packets for checking reachability, which receives packets for checking reachability which include information to the effect that, from the other nodes within self virtual node, self node has the n-th smallest link cost with respect to said other nodes; an internal IP address group information creation section 33 which summarizes for each of said n values the IP addresses of the packets which have been received by said reception section 32 for packets for checking reachability, and creates internal IP address group information related to nodes within self virtual node; and an external advertisement section 27 which advertises this internal IP address group information which has thus been created by said internal IP address group information creation section 33 to the border node which corresponds to the interface with the other virtual node.

The Thirty-Third Preferred Embodiment

Figure 44:
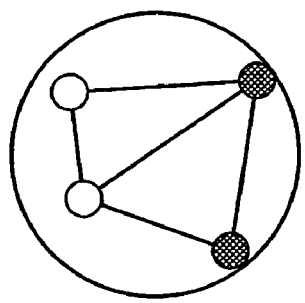
FIG. 44 is a general conceptual view of the scope of level 1 of a non border node according to a thirty-third preferred embodiment of the present invention.
Figure 43:
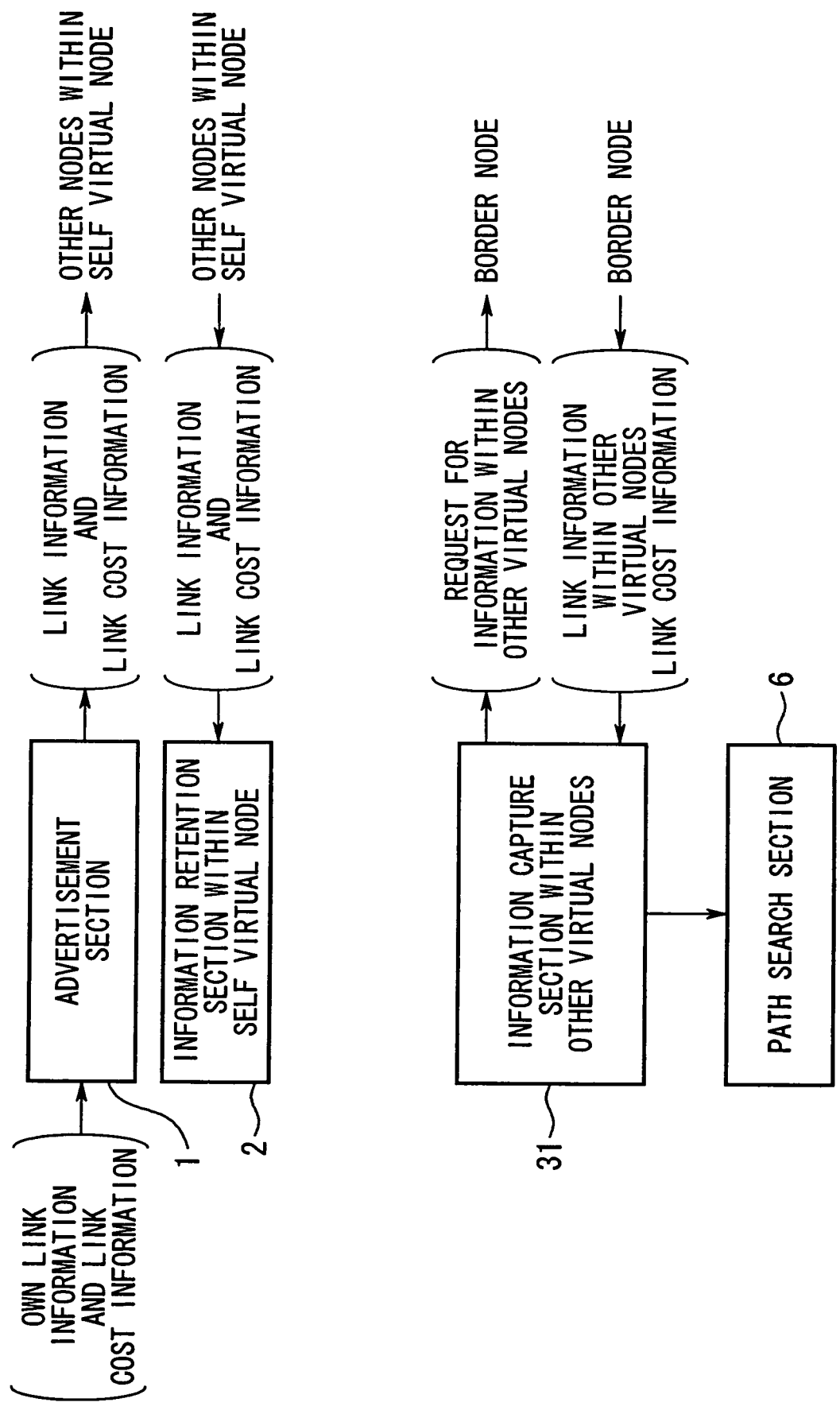
FIG. 43 is a block structure diagram of an essential portion of a non border node according to a thirty-third preferred embodiment of the present invention.

A non border node according to a thirty-third preferred embodiment of the present invention will now be explained with reference to FIGS. 43 and 44. FIG. 43 is a block structure diagram of an essential portion of a non border node according to this thirty-third preferred embodiment of the present invention. And FIG. 44 is a general conceptual figure of the scope of level 1 of the non border node according to this thirty-third preferred embodiment of the present invention. This non border node according to the thirty-third preferred embodiment of the present invention, as shown in FIG. 43, comprises an advertisement section 1 which advertises information about links which are connected to this link and link cost information about said links to the other nodes within self virtual node, and a retention section 2 for information within self virtual node which receives information about links within self virtual node and link information about the cost of said links from other nodes within self virtual node, and stores said information.

In other words, with this thirty-third preferred embodiment of the present invention, as shown in FIG. 44, normally, a non border node (shown by the white circle) only stores information relating to the situation within self virtual node. By doing this, it is possible to reduce the amount of data which must be handled.

However, with this embodiment, since it is not possible to perform path computation all the way up to the destination which is another virtual node, accordingly there is included a capture section 31 for information within other virtual nodes, which, before performing the path computation, requests and obtains, from a border node which corresponds to said interface, link information for between a border node which corresponds to an interface with self virtual node and a border node which corresponds to an interface with a virtual node upon a higher level, and link cost information for said link.

By doing this, the amount of information is reduced by, normally, only handling information within self virtual node, while, according to requirements, receiving information about the situation within other virtual nodes, so that it is possible to reduce the amount of information which must be handled within a fixed time.

The Thirty-Fourth Preferred Embodiment

Figure 46:
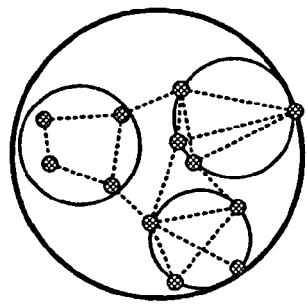
FIG. 46 is a general conceptual view of the scope of level 2 of a border node according to this thirty-fourth preferred embodiment of the present invention.

A border node according to a thirty-fourth preferred embodiment of the present invention will now be explained with reference to FIGS. 45 and 46. FIG. 45 is a block structure diagram of an essential portion of a border node according to this thirty-fourth preferred embodiment of the present invention. And FIG. 46 is a general conceptual figure of the scope of level 2 of the border node according to this thirty-fourth preferred embodiment. This non border node according to the thirty-fourth preferred embodiment of the present invention, as shown in FIG. 45, comprises: an advertisement section 34 which advertises to border nodes which correspond to interfaces upon the same level as self node link information about links upon the same level at self node which have been connected to self node, and link cost information for said links; and a same level border node information retention section 35 which receives, from border nodes which correspond to interfaces upon the same level as self node, advertisements of link information for links between self node and border nodes which correspond to interfaces upon the same level as self node, and link cost information for said links, and stores said information. In other words, with this non border node according to the thirty-fourth preferred embodiment of the present invention, as shown in FIG. 46, normally, the border nodes (shown by hatching) only store information between themselves and border nodes upon the same level as themselves. Due to this, it is possible to reduce the amount of data which must be handled.

However since, with this system, it is not possible to perform path computation for some destination which is in a virtual node on a higher level than self node itself, there is incorporated a capture section 36 for information within virtual nodes on higher levels, which, before the path computation, requests and receives link information about links with a border node which corresponds to an interface on a higher level than self node, and link cost information about said links, from the border node which corresponds to said interface.

By doing this, it is possible to reduce the amount of information which is to be handled within a fixed time by, normally, only handling information between self node and border nodes which are upon the same level, while, according to requirements, receiving information about the situation within virtual nodes which are upon higher levels than self node.

It should be understood that, by combining the non border node according to the thirty-third preferred embodiment of the present invention and the border node according to the thirty-fourth preferred embodiment of the present invention, it becomes possible to implement an embodiment in which, normally, nodes of each level only handle information between themselves and nodes upon the same level, while, according to requirements, they obtain and utilize information between nodes on levels higher than themselves.

The Thirty-Fifth Preferred Embodiment

Figure 47:
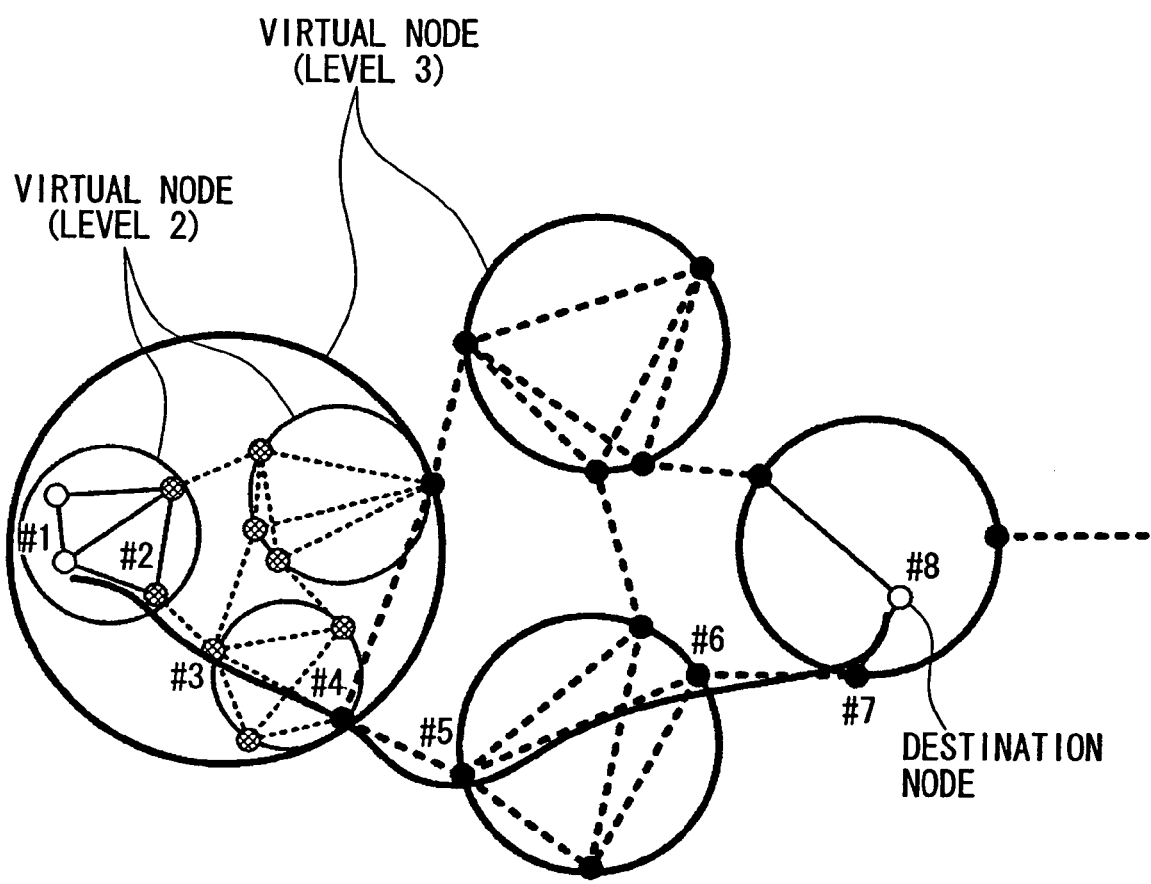
FIG. 47 is a figure for explanation of a path search method according to a thirty-fifth preferred embodiment.
Figure 48:
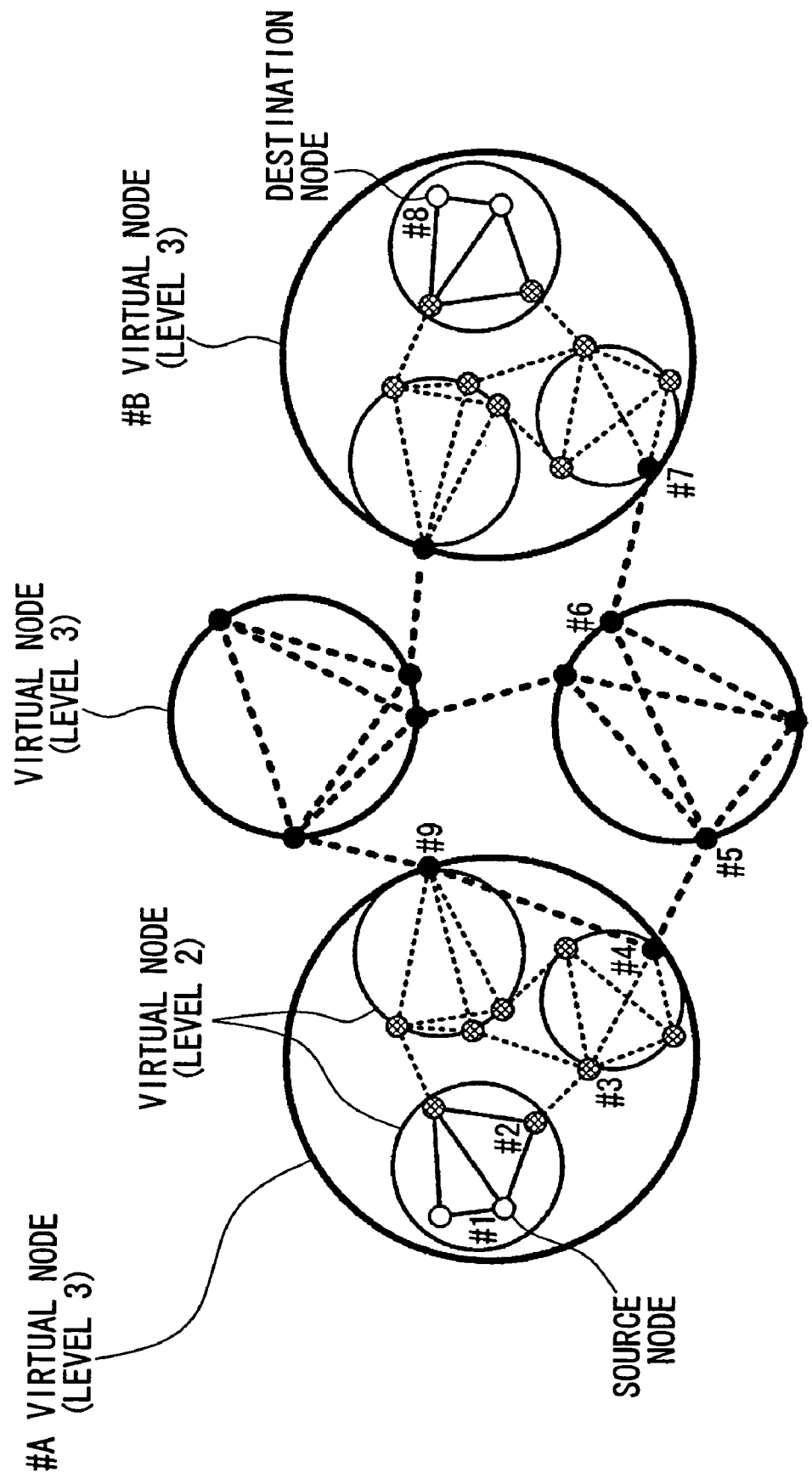
FIG. 48 is a figure for explanation of a path search method according to a thirty-sixth preferred embodiment of the present invention.

A thirty-fifth preferred embodiment of the present invention will now be explained with reference to FIGS. 47 and 48. FIGS. 47 and 48 are figures for explanation of this path search method according to this thirty-fifth preferred embodiment of the present invention. In this thirty-fifth preferred embodiment of the present invention, as a non border node, the non border node according to the thirty-third preferred embodiment of the present invention which was explained with reference to FIG. 43 is employed. In other words, referring to the FIG. 47 example, there are incorporated a capture section 31 for information within other virtual nodes which requests and obtains link information for links within said virtual node and link cost information about said links from the border node #7 which corresponds to the interface of the virtual node to which the destination node #8 belongs, and a path search section which, in addition to the path which has already been searched out to the border node #7 which corresponds to the interface with the virtual node to which the destination node #8 belongs, based upon said link information and said link cost information which have been obtained by said capture section 31 for information within other virtual nodes, as shown in FIG. 48, searches out a path from the border node #7 which corresponds to said interface to the destination node #8.

It should be understood that the operation of searching out a path from the source node #1 to the border node #7 is the same as that explained above with reference to the twenty-fourth preferred embodiment of the present invention.

Furthermore, for example, if the source node #1 desires to perform detailed path searching within the virtual node to which the border nodes #5 and #6 belong, then the capture section 31 for information within other virtual nodes requests and obtains link information for links within said virtual node and link cost information about said links from the border node #5 or the border node #6, and, based upon said link information and said link cost information which it has received, searches out a path from self node within the virtual node to which border node #5 and the border node #6 belong.

By doing this, the source node #1 is able to perform detailed path searching by obtaining information within any one of the virtual nodes.

The Thirty-Sixth Preferred Embodiment

Figure 49:
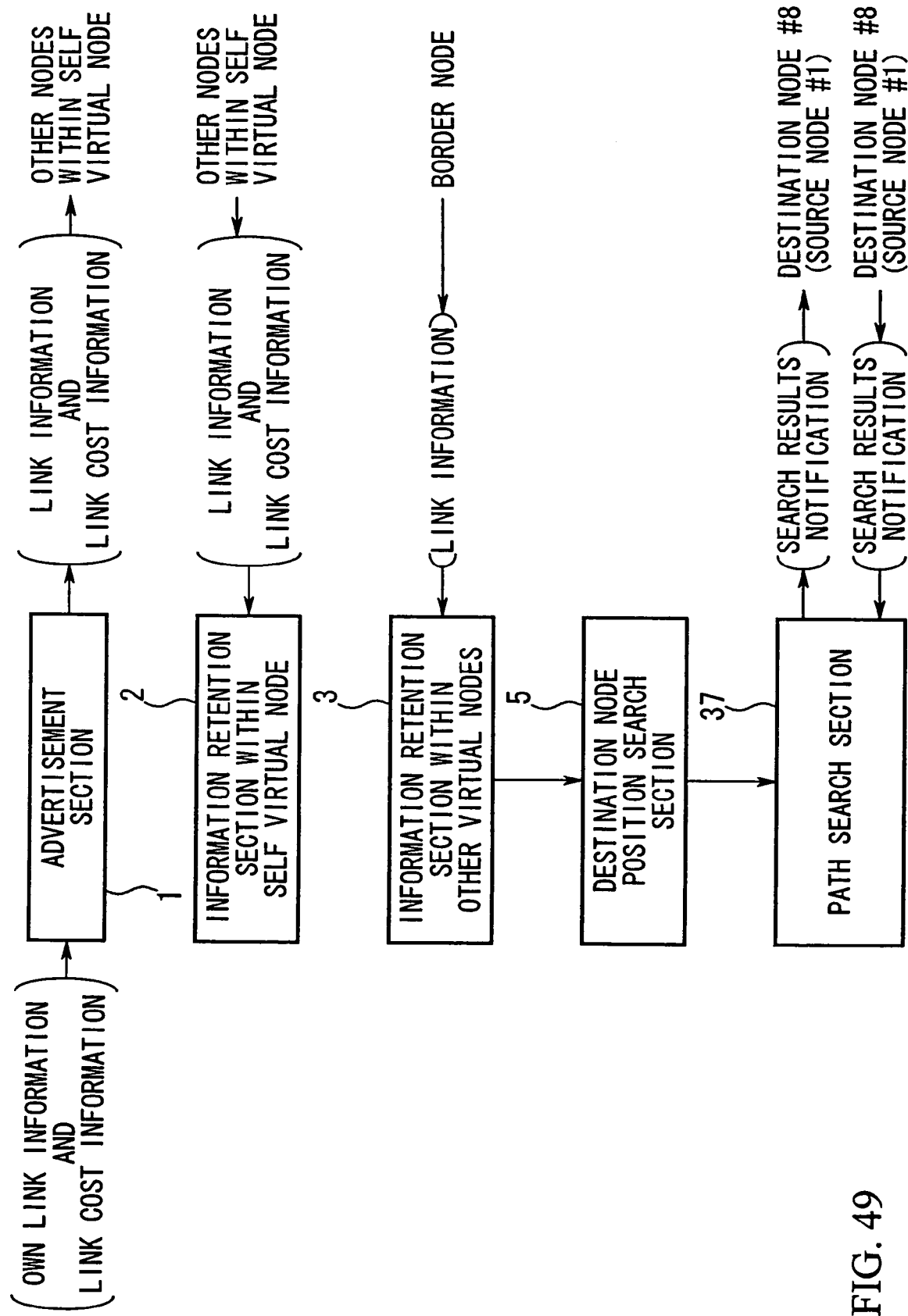
FIG. 49 is a block structure diagram of an essential portion of a non border node according to this thirty-sixth preferred embodiment of the present invention.

A path search method according to a thirty-sixth preferred embodiment of the present invention will now be explained with reference to FIGS. 48 through 50. FIG. 48 is a figure for explanation of this path search method according to this thirty-sixth preferred embodiment of the present invention, and is common with the thirty-fifth preferred embodiment. FIG. 49 is a figure showing the overall block structure of a non border node according to this thirty-sixth preferred embodiment of the present invention. And FIG. 50 is a sequence diagram for explanation of the path search method according to this thirty-sixth preferred embodiment of the present invention.

With this path search method according to this thirty-sixth preferred embodiment of the present invention, referring to the example in FIG. 50, the source node #1 for path establishment comprises a destination node position search section 5 which specifies the virtual node #B to which said destination node #8 belongs from the IP address of the destination node #8 for path establishment, based upon the external IP address group information, and a path search section 37 which, based upon link information for links between the border node #2 which corresponds to the interface with self virtual node and the border node #4 which corresponds to an interface with a virtual node which is on a higher level than self virtual node, and upon link cost information for said links, notifies to the destination node #8 for path establishment information which specifies on which level is the virtual node #A on the topmost level for which path computation is possible from self node to the border node #4 which corresponds to the interface, and the results of searching out paths from self node to the border node #4 which corresponds to said interface in order up to that one for which the link cost is the n-th smallest, and the destination node #8, based upon said information which has been notified, along with searching out a path from self node to the border node #4 which corresponds to the interface of the virtual node #A on said topmost level for which path computation up to the border node #4 which corresponds to the interface from the source node #1 is possible, also comprises a path search section 37 which combines the results of searching out a path up to said n-th level in said search results, and notifies the path for which the link cost is the least to the search node #1 as the final path which has been found.

In other words, as shown in FIG. 50, the source node #1 specifies the position of the destination node #8 with the destination node position search section 5 (in the step 1), searches out a path to the virtual nodes #4 and #9 upon the topmost level for which computation by the path search section 37 is possible (in the step 2), and notifies these search results to the destination node #8 (in the step 3). In the destination node #8, a path to the virtual nodes #4 and #9 is searched out by the path search section 37 (in the step 4), and, by adding the path to the virtual nodes #4 and #9 from the source node #1 which has been notified from the source node #1, selects the path for which the link cost becomes the minimum (in the step 5), and notifies these selection results to the source node #1 (in the step 6). In the source node #1, an LSP to the destination node #8 is established based upon this notification (in the step 7). It should be understood that this establishment of an LSP may also be performed from the destination node #8 (in the step 8). If the LSP is to be established from the destination node #8, it is possible to eliminate the step 6.

The beneficial feature of this path search method according to this thirty-sixth preferred embodiment of the present invention is that, in a case such as when, for example, it is necessary to establish a large number of LSPs from a single source node to a large number of destination nodes all together, and it is difficult for the side of the source node to bear the entire burden which is required to establish the LSPs, by sharing out the burden which is required for the path searching to the sides of the destination nodes, it is thereby possible to alleviate the burden which is imposed upon the source node by this path searching procedure.

The Thirty-Seventh Preferred Embodiment

Figure 51:
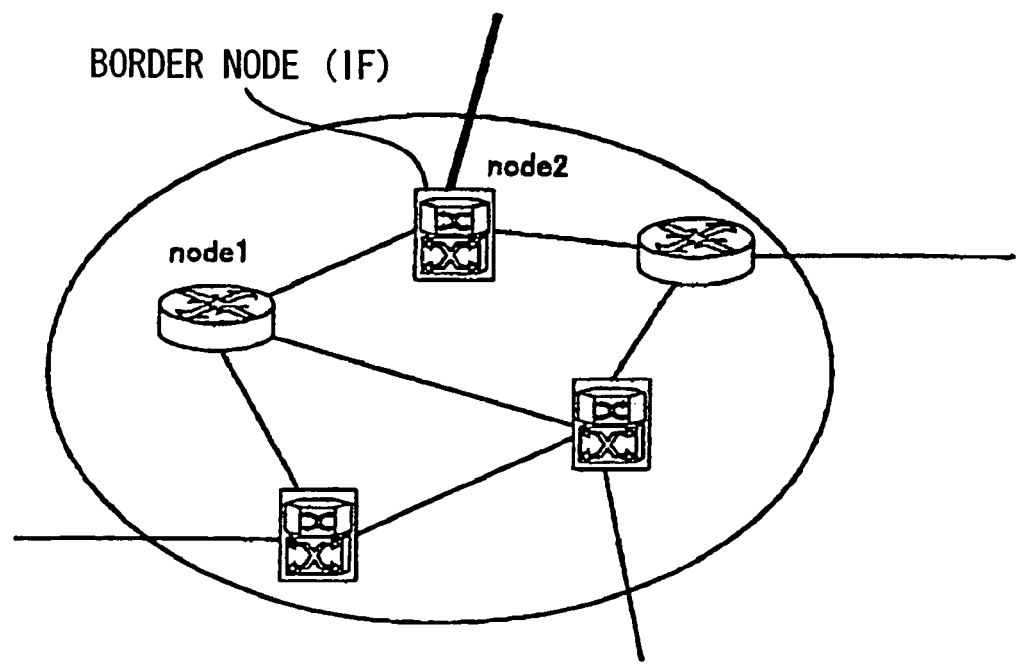
FIG. 51 is a figure for explanation of the definition of a border node.
Figure 52:
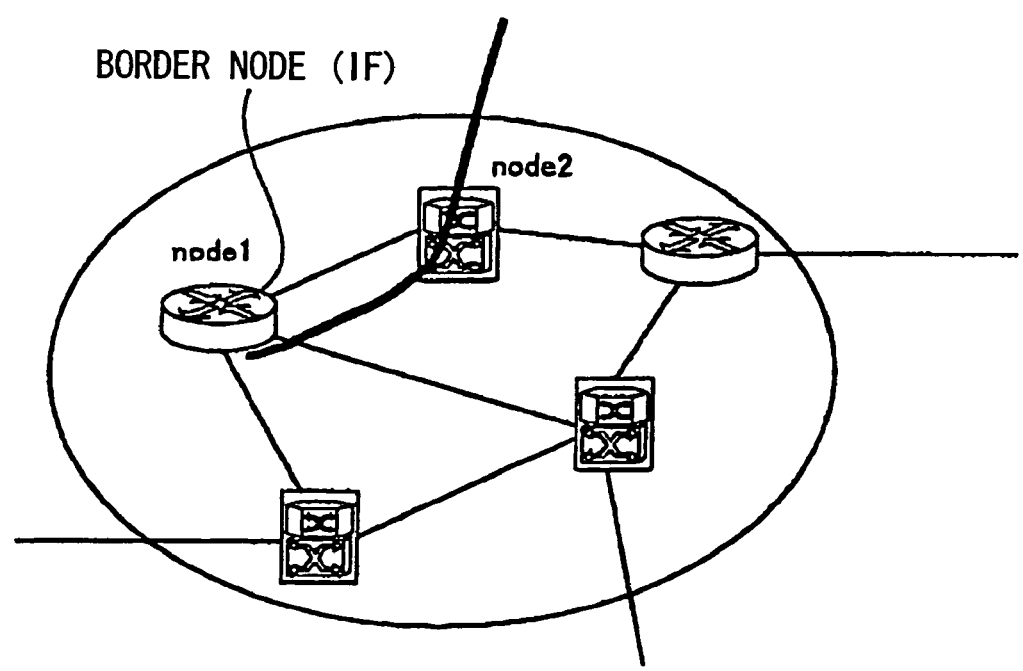
FIG. 52 is a figure for explanation of the definition of a border node.
Figure 53:
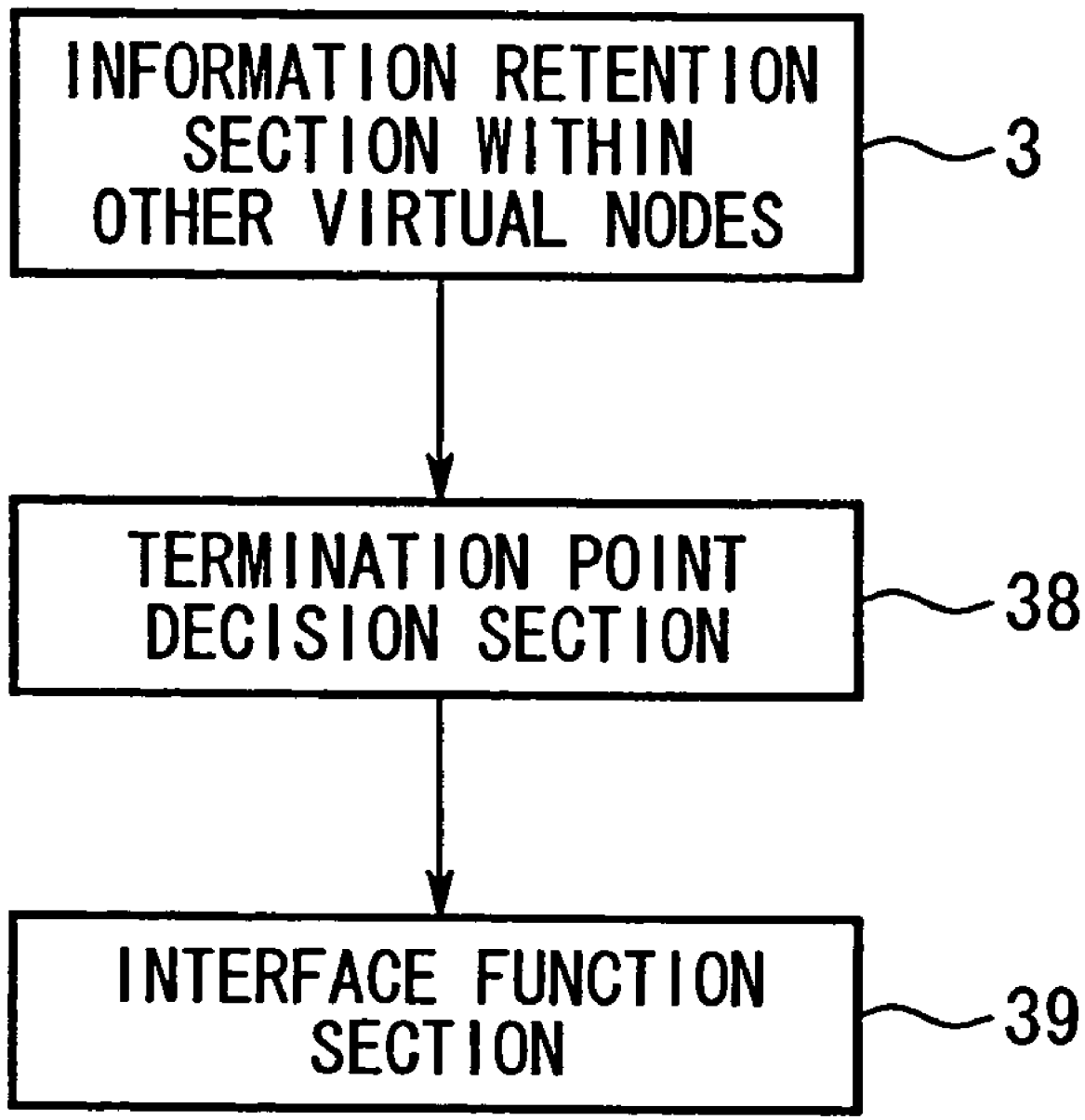
FIG. 53 is a block structure diagram of an essential portion of a node according to a thirty-seventh preferred embodiment of the present invention.

The establishment of a border node in a thirty-ninth preferred embodiment of the present invention will now be explained with reference to FIGS. 51 through 53. FIGS. 51 and 52 are figures for explanation of the definition of a border node according to this thirty-seventh preferred embodiment of the present invention, and is common with the thirty-seventh preferred embodiment. And FIG. 53 is a block structural diagram of an essential portion of a node according to this thirty-seventh preferred embodiment of the present invention. Since the layered network according to this thirty-seventh preferred embodiment of the present invention is implemented as a multi layer network, Lambda paths, TDM-LSPs, and packet paths are mixed together within links which are established between the virtual nodes.

This border node according to this thirty-seventh preferred embodiment of the present invention, within a virtual node which has been created, exercises autonomously a function as a border node in correspondence with the layer of a LSP which has been established between virtual nodes which are adjacent. For example, in FIG. 51, it is a Lambda path upon the Lambda layer which is established between virtual nodes which are adjacent. Accordingly, an optical cross connect device which corresponds to the node 2 is established as a border node. Furthermore, in FIG. 52, it is a packet path upon the IP layer which is established between virtual nodes which are adjacent. Accordingly, a router which corresponds to the node 1 is established as a border node. In this manner, the termination point of an LSP between virtual nodes which are adjacent is established as a border node of the virtual node.

In this border node according to this thirty-seventh preferred embodiment of the present invention, as shown in FIG. 53, there is provided a termination point decision section 38, and this termination point decision section 38: refers to the link information which has been stored in the retention section 3 for information within other virtual nodes and makes a decision as to whether or not a link which connects self virtual node and an other virtual node is connected to self node; if, according to the result of this decision, the link which connects self virtual node and an other virtual node is connected to self node, makes a decision as to whether or not self node corresponds to the termination point for the layer of the LSP which has been established upon said link; and if, according to the result of this decision, self node corresponds to said termination point, recognizes that self node is a border node which corresponds to said interface, and issues a command to the interface functional section 39 to exercise a function which corresponds to the interface.

The Thirty-Eighth Preferred Embodiment

A thirty-eighth preferred embodiment of the present invention will now be explained with reference to FIGS. 54 and 55. FIG. 54 is a figure for explanation of a method of dividing up into virtual nodes according to this thirty-eighth preferred embodiment of the present invention. And FIG. 55 is a block structural diagram of an essential portion of a node according to this thirty-eighth preferred embodiment of the present invention.

When dividing the nodes up into virtual nodes, it is inevitable that division into different nodes will be performed for nodes between which no link has been established from the beginning. Although there are virtual nodes which have been divided up by doing this, with this thirty-eighth preferred embodiment of the present invention, as shown in FIG. 54, during the network management process, for nodes within the same virtual node between which a link is established, if the resources are entirely utilized by other nodes, so that in practical terms the reachability has failed, (shown by the X signs in the figures), then they are divided up into different virtual nodes, thus being treated as though the link did not exist.

By doing this, simply, by comparison with the case of division into virtual nodes only according to the presence or absence of links, it is possible to construct a layered network which reflects the presence or absence of reachability in practice, so that it is possible to perform path searching and packet transmission at high accuracy and with good efficiency.

Figure 55:
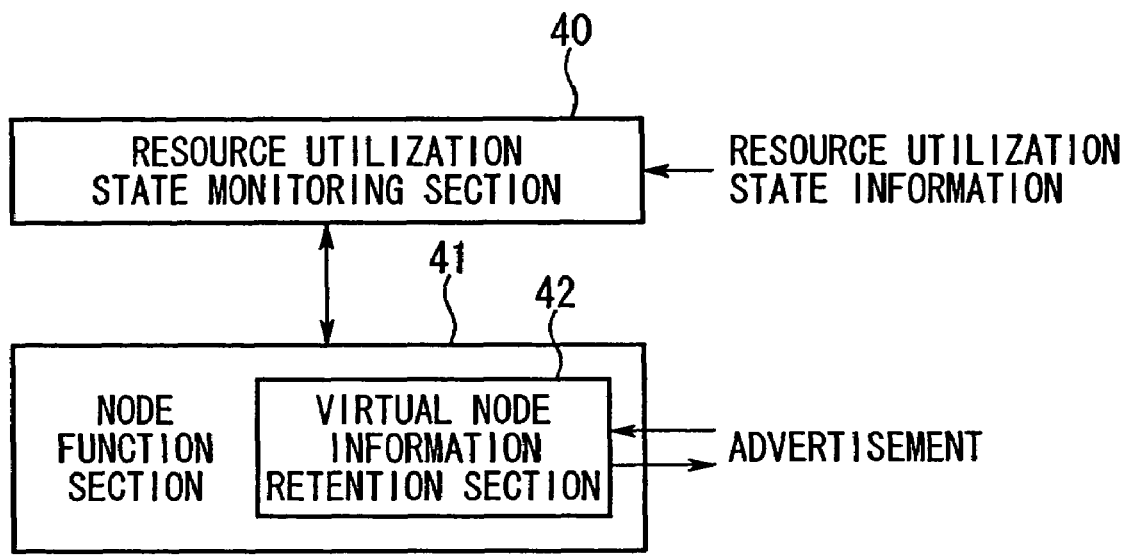
FIG. 55 is a block structure diagram of an essential portion of a node according to the thirty-eighth preferred embodiment of the present invention.

This node according to this thirty-eighth preferred embodiment of the present invention, as shown in FIG. 55, comprises a resource utilization state monitoring section 40 which observes the state of utilization of resources related to self node, and if, based upon the results of observation by this resource utilization state monitoring section 40, availability of resources for use in data transmission to other nodes within self virtual node disappears, and self node corresponds to said interface, outputs a command to the node functional section 41, and, along with exercising a function as a node which belongs to an other virtual node of level 1 to which self node has been connected, also updates the information about the virtual node to which self node belongs, which has been stored in the virtual node information retention section 42, along with change of said associated virtual node.

Furthermore, the virtual node information retention section 42, along with advertising the details of updates, also, when such an advertisement has been received from an other node, updates the information for the virtual note to which self node belongs, based upon said advertisement.

The Thirty-Ninth Preferred Embodiment

A thirty-ninth preferred embodiment of the present invention will now be explained with reference to FIGS. 54 and 56. FIG. 54 is a figure for explanation of a method of dividing up into virtual nodes according to this thirty-ninth preferred embodiment of the present invention, and is common with the thirty-eighth preferred embodiment. And FIG. 56 is a block structural diagram of an essential portion of a node according to this thirty-ninth preferred embodiment of the present invention.

When dividing the nodes up into virtual nodes, it is inevitable that division into different nodes will be performed for nodes between which no link has been established from the beginning. Although there are virtual nodes which have been divided up by doing this, with this thirty-ninth preferred embodiment of the present invention, as shown in FIG. 54, during the network management process, for nodes within the same virtual node between which a link is established, if the link cost has exceeded a threshold value, (shown by the X signs in the figures), then they are divided up into different virtual nodes, thus being treated as though the link did not exist.

By doing this, simply, by comparison with the case of division into virtual nodes only according to the presence or absence of links, it is possible to construct a layered network which reflects the excellence or poorness of reachability in practice, so that it is possible to perform path searching and packet transmission at high accuracy and with good efficiency.

Figure 56:
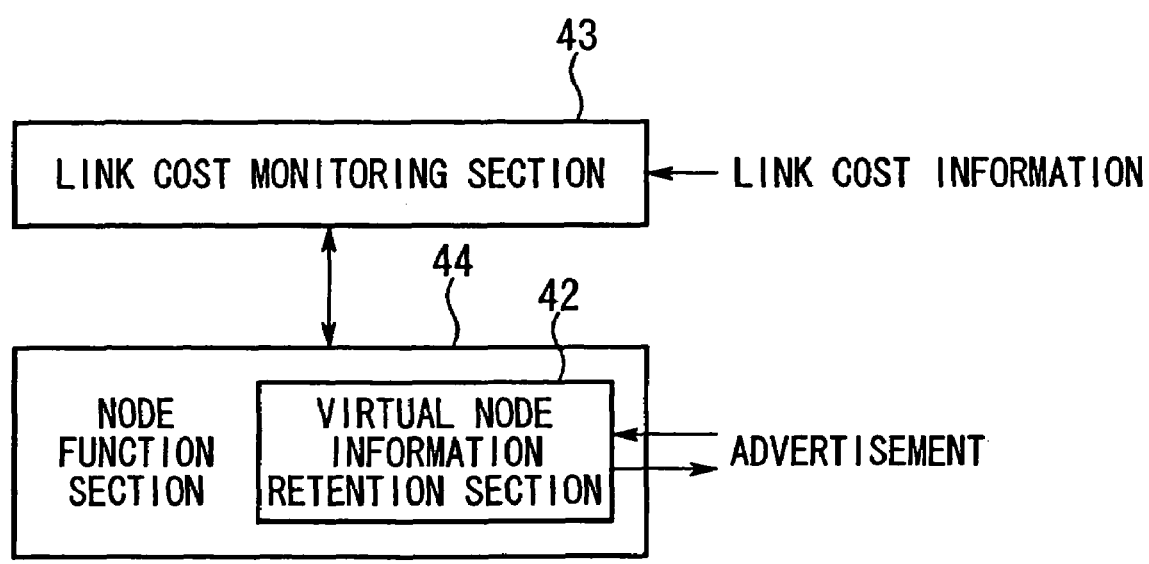
FIG. 56 is a block structure diagram of an essential portion of a node according to a thirty-ninth preferred embodiment of the present invention.

This node according to this thirty-ninth preferred embodiment of the present invention, as shown in FIG. 56, comprises a link cost monitoring section 43 which observes the link cost related to self node, and if, based upon the results of observation by this link cost monitoring section 43, the cost of links for use in data transmission to other nodes within self virtual node becomes greater than a threshold value, and self node corresponds to said interface, outputs a command to the node functional section 44, and, along with exercising a function as a node which belongs to an other virtual node of level 1 to which self node has been connected, also updates the information about the virtual node to which self node belongs, which has been stored in the virtual node information retention section 42, along with change of said associated virtual node.

Furthermore, the virtual node information retention section 42, along with advertising the details of these updates, also, when such an advertisement has been received from an other node, updates the information for the virtual note to which self node belongs, based upon said advertisement.

The Fortieth Preferred Embodiment

Figure 57:
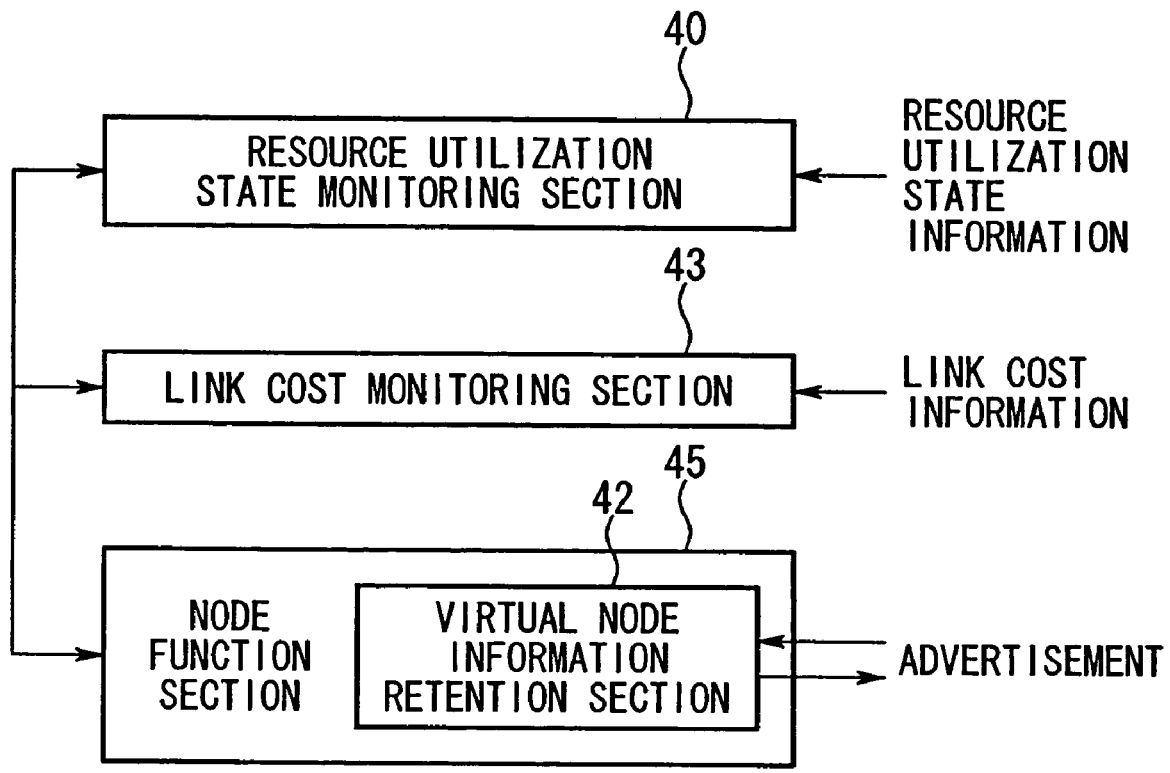
FIG. 57 is a block structure diagram of an essential portion of a node according to a fortieth preferred embodiment of the present invention.

The node according to the fortieth preferred embodiment of the present invention will now be explained with reference to FIG. 57. FIG. 57 is a block structural diagram of an essential portion of self node according to the fortieth preferred embodiment of the present invention. The node according to the fortieth preferred embodiment of the present invention is a device which combines the nodes of the nodes according to the thirty-eighth and the thirty-ninth preferred embodiments of the present invention. In other words, it commands the node functional section 45 to initiate its own functions by referring to both the resource utilization state information due to the resource utilization state monitoring section 40 and also the link cost information within the virtual node due to the link cost monitoring section 43. By doing this, it is possible to implement division into virtual nodes while accruing the benefits of both the thirty-eighth preferred embodiment and also the thirty-ninth preferred embodiment of the present invention.

The Forty-First Preferred Embodiment

Figure 58:
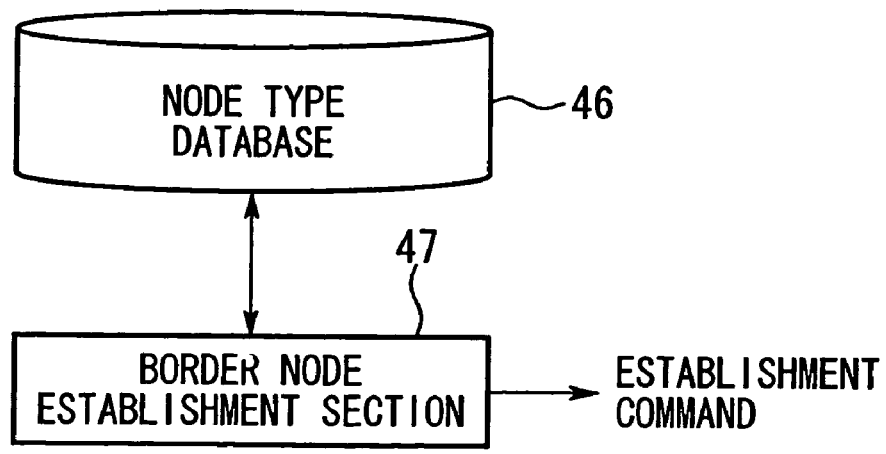
FIG. 58 is a block structure diagram of an essential portion of a network control device of a forty-first preferred embodiment of the present invention.

The forty-first preferred embodiment of the present invention is a preferred embodiment of a network control device which controls the layered network all together. Although, in the explanation of the forty-first through the forty-fourth preferred embodiments of the present invention, the explanation will be made in terms of only one network control device being provided to a layered network, if the following explanation is applied to only a part of the layered network, it would also be possible to explain in the same manner a mode of implementation which controlled the entire layered network using a plurality of network control devices. In the explanation of this forty-first preferred embodiment of the present invention, the establishment of a border node will be explained with reference to FIGS. 51, 52, and 58. FIGS. 51 and 52 are figures for explanation of the definition of a border node. And FIG. 58 is a block structure diagram showing an essential portion of the network control device according to the forty-first preferred embodiment of the present invention. Since the layered network of this forty-first preferred embodiment is implemented as a multi layer network, Lambda paths, TDM-LSPs, and packet paths are mixed together within links which are established between the virtual nodes.

The network control device establishes a border node corresponding to the layer of an LSP which has been established between adjacent virtual nodes within a virtual node which has been created. For example, in FIG. 51, it is a Lambda path upon the Lambda layer which is established between adjacent virtual nodes. Accordingly, an optical cross connect device which corresponds to a node 2 is established as a border node. Furthermore, in FIG. 52, it is a packet path upon the IP layer which is established between adjacent virtual nodes. Accordingly, a router which corresponds to a node 1 is established as a border node. In this manner, the termination point of an LSP between adjacent virtual nodes is established as a border node of self virtual node.

In the network control device according to this forty-first preferred embodiment of the present invention, as shown in FIG. 58, there is provided a node type database 46, in which information related to the types of nodes which are provided within the network is accumulated. And a border node establishment section 47 refers to self node type database 46, recognizes the types of the nodes within each virtual node, and determines upon a node to be established as a border node corresponding to the layer of a link between adjacent virtual nodes, and dispatches an establishment command for said node. The node which has received this establishment command recognizes itself as a border node, and accordingly exercises a function as a border node.

The Forty-Second Preferred Embodiment

A network control device according to a forty-second preferred embodiment of the present invention will now be explained with reference to FIGS. 54 and 59. FIG. 54 is a figure for explanation of the method of dividing up into virtual nodes of this forty-second preferred embodiment of the present invention, and is common with the thirty-eighth and the thirty-ninth preferred embodiments of the present invention. And FIG. 59 is a block structure diagram showing an essential portion of the network control device according to this forty-second preferred embodiment of the present invention.

When dividing up a node into virtual nodes, it is inevitable to divide nodes between which no link has been established from the beginning into different virtual nodes. Although there are virtual nodes which have been divided up by doing this, in the forty-second preferred embodiment of the present invention, as shown in FIG. 54, in the network management process, for nodes within the same virtual node between which a link is established, if the relevant resources are completely used by other nodes, and in practice their mutual reachability has disappeared (shown in the figure by a X sign), then they are considered as being ones between which no link exists, and accordingly they are divided up into different virtual nodes.

By doing this, simply, to compare with the case of dividing up into virtual nodes merely according to the presence or absence of links, it is possible to construct a layered network which reflects the actual presence or absence of mutual reachability, and thereby it is possible to perform path search and packet transmission with high accuracy and good efficiency.

Figure 59:
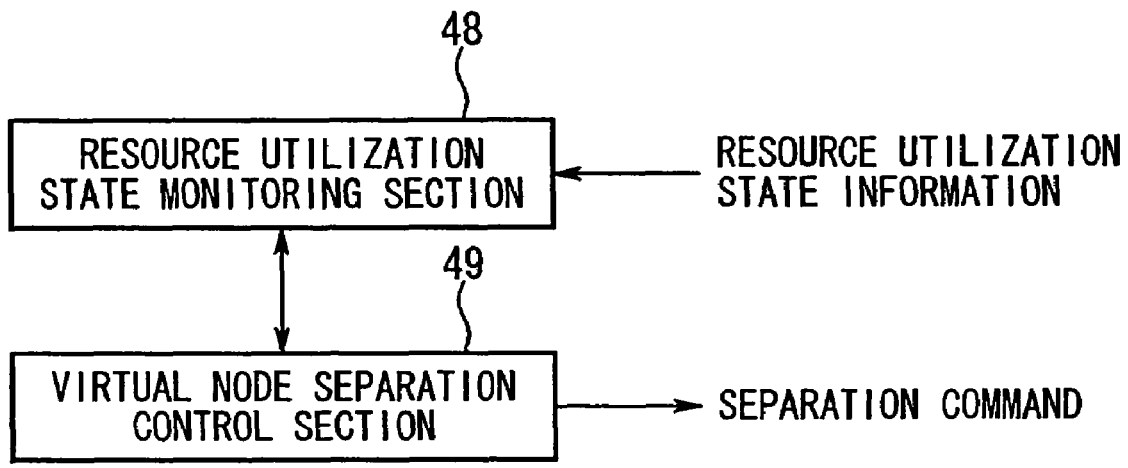
FIG. 59 is a block structure diagram of an essential portion of a network control device of a forty-second preferred embodiment of the present invention.

The network control device according to this forty-second preferred embodiment of the present invention, as shown in FIG. 59, comprises a resource utilization state monitoring section 48 which observes the resource utilization state of each node, and a virtual node separation control section 49 refers to the resource utilization state monitoring section 48, and commands each of the nodes to divide into new virtual nodes as required. In a node which has received this command, it renews the information about the virtual node to which it itself belongs, and then exercises a function as a node within the new virtual node.

The Forty-Third Preferred Embodiment

A network control device according to a forty-third preferred embodiment of the present invention will now be explained with reference to FIGS. 54 and 60. FIG. 54 is a figure for explanation of the method of dividing up into virtual nodes of this forty-third preferred embodiment of the present invention, and is common with the thirty-eighth, the thirty-ninth, and the forty-second preferred embodiments of the present invention. And FIG. 60 is a block structure diagram showing an essential portion of the network control device according to this forty-third preferred embodiment of the present invention.

When dividing up a node into virtual nodes, it is inevitable to divide nodes between which no link has been established from the beginning into different virtual nodes. Although there are virtual nodes which have been divided up by doing this, in this forty-third preferred embodiment of the present invention, as shown in FIG. 54, in the network management process, for nodes within the same virtual node between which a link is established, if the link cost has exceeded a threshold value (shown in the figure by an X sign), then they are considered as being ones between which no link exists, and accordingly they are divided up into different virtual nodes.

By doing this, simply, to compare with the case of dividing up into virtual nodes merely according to the presence or absence of links, it is possible to construct a layered network which reflects the magnitude of the actual mutual reachability, and thereby it is possible to perform path search and packet transmission with good efficiency.

Figure 60:
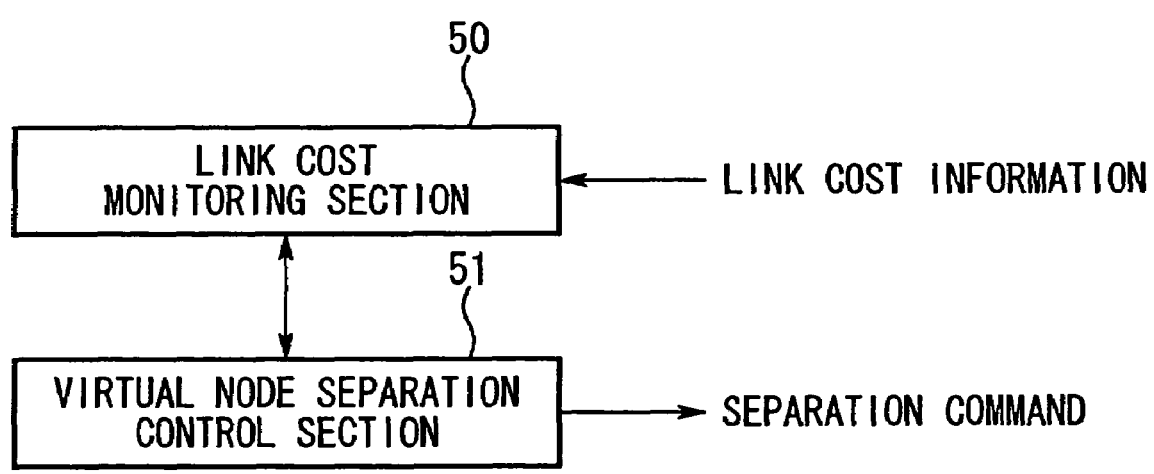
FIG. 60 is a block structure diagram of an essential portion of a network control device of a forty-third preferred embodiment of the present invention.

The network control device according to this forty-third preferred embodiment of the present invention, as shown in FIG. 60, comprises a link cost monitoring section 50 which observes the link cost of each node, and a virtual node separation control section 51 refers to the link cost monitoring section 50, and commands each of the nodes to divide into new virtual nodes as required. In a node which has received this command, it renews the information about the virtual node to which it itself belongs, and then exercises a function as a node within the new virtual node.

By applying the virtual node division method which has been explained with reference to this forty-third preferred embodiment of the present invention, it becomes possible to keep the link cost within each virtual node constant. Accordingly, there is the benefit that the requirement for advertising the link cost information to the exterior disappears. For example, the value of the threshold value may be taken as the link cost value of the virtual node for which the link cost is the least, so that the link cost of each virtual node remains constant.

The Forty-Fourth Preferred Embodiment

Figure 61:
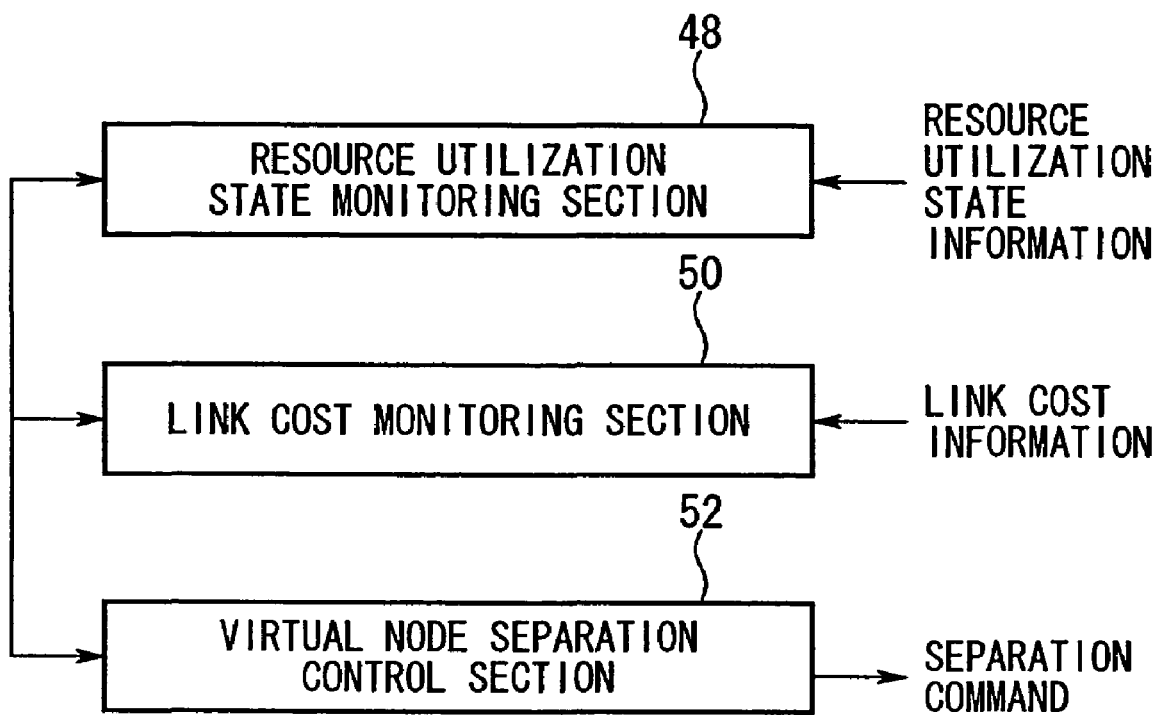
FIG. 61 is a block structure diagram of an essential portion of a network control device of a forty-fourth preferred embodiment of the present invention.
Figure 62:
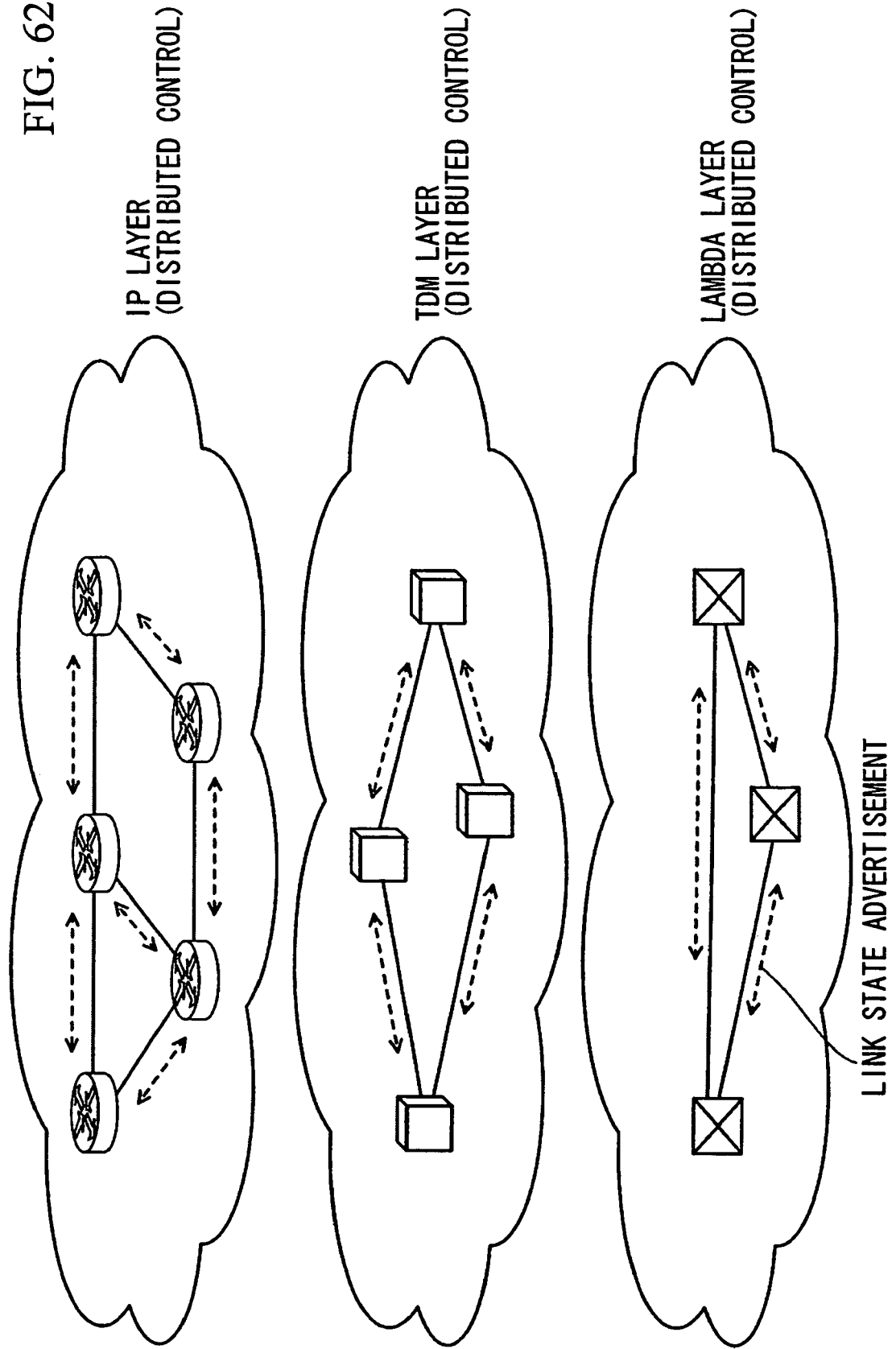
FIG. 62 is a figure showing an example of a network which is made from a plurality of network layers.

The network control device according to the forty-fourth preferred embodiment of the present invention will now be explained with reference to FIG. 61. FIG. 61 is a block structure diagram showing an essential portion of this network control device according to the forty-fourth preferred embodiment of the present invention. This network control device according to the forty-fourth preferred embodiment of the present invention is a combination of the network control devices according to the forty-second and the forty-third preferred embodiments of the present invention. In other words, the virtual node separation control section 52 commands the separation into virtual nodes by referring to both of the resource utilization state information between the nodes which is produced by the resource utilization state monitoring section 48 and also to the link cost information within the virtual nodes which is produced by the link cost monitoring section 50. By doing this, it is possible to implement separation into virtual nodes while obtaining the benefits of both the forty-second preferred embodiment and also the forty-third preferred embodiment of the present invention.

What is claimed is:

1. A layered network node which is provided in a network consisting of one or a plurality of layers, comprising:
    means for mutually interchanging link state information about a present node and links which are connected to the present node with other nodes;
    means for storing the link state information for one or for all of the nodes within said network which has been obtained by said interchanging means;
    means for selecting a path for a Label Switch Path (LSP) of one or a plurality of types of layer, based upon the link state information which has been stored in said storing means according to an LSP establishment request; and
    means for changing the path which has been selected and established by said selection means, according to an LSP change request, based upon the link state information which has been stored in said storing means,
    wherein the network to which said node belongs is a layered network, the layered network comprises virtual networks of a plurality of levels, each of the virtual networks belonging to each level comprises one or a plurality of virtual nodes belonging to the each level, each of the virtual nodes serves as a cell, each cell comprises one or a plurality of nodes, a virtual node in a virtual network belonging to a lower level, which is a level other than the highest level, is a node in a virtual network belonging to a level higher than the lower level, and if a link exists which connects between different virtual nodes of the same level or of different levels, the border between the link and each of the different virtual nodes is an interface of each of the different virtual nodes,
    and the layered network node further comprises a link state database which accumulates link state information which is advertised from other nodes within a virtual node to which self node belongs or from other virtual nodes,
    and the nodes which fulfill a function of interfacing with nodes within the virtual node or with the exterior of the virtual node are defined as border nodes,
    and the layered network node further comprises: a link state abstraction section comprising means for, when the present node is positioned at this border node, creating interface information for the exterior of the virtual node based upon the link state information interior to the virtual node; and
    an advertisement section which advertises said interface information which has been created to the exterior of the virtual node.

2. The layered network node according to claim 1, further comprising means for recognizing a link group, among a plurality of links which mutually connect virtual nodes together, which connects between the same virtual node; and
    processing means for treating the links which are included within the link group which has been recognized by said recognition means as a single virtual link.

3. The layered network node according to claim 1, further comprising:
    means for recognizing a first link group, among a plurality of which mutually connect virtual nodes together, which connects between the same virtual node;
    means for further classifying the first link group which has been recognized by said recognition means into second link groups which possess the same switching capability;
    and processing means for treating the links which are included within the second link group which has been classified by said classification means as a single virtual link.

4. The layered network node according to claim 1, wherein said link state abstraction section comprises switching capability allotment means for performing allotment of the switching capability within the virtual node to which the present node belongs by a link which is connected to the present node to a link which corresponds to an interface which connects the virtual node and moreover to which the present node belongs and the exterior;
    and said interface information is information about the switching capability which has been allotted to said interfaces by said switching capability allotment means.

5. The layered network node according to claim 1, wherein said link state abstraction section comprises:

switching capability allotment means for performing allotment of the switching capability within the virtual node to which the present node belongs by a link which is connected to the present node to a link which corresponds to an interface which connects the virtual node to which the present node belongs and the exterior;

and cost allotment means for allotting a transmission cost to each switching capability which has been allotted by said switching capability allotment means;

and said interface information is information about the switching capability which has been allotted to said interfaces by said switching capability allotment means, and information about the transmission costs which have been allocated to the switching capabilities of said interfaces by said cost allotment means.

6. The layered network node according to claim 4 or claim 5, wherein said information about the switching capability which has been allotted to said interfaces is created in correspondence with each layer of a Label Switch Path (LSP) which can be established between the present node as a border node or a virtual border node, and another border node or another virtual border node which belongs within the same virtual node.

7. The layered network node according to claim 4 or claim 5, wherein said information about the switching capability which has been allotted to said interfaces is information which is related to the switching capability of a border node or a virtual border node to which the link which constitutes said interface is directly connected.

8. The layered network node according to claim 1, wherein said advertisement section comprises means for performing an advertisement to the exterior of the virtual node each time a change in switching capability of said border node occurs.

9. The layered network node according to claim 1, wherein said advertisement section comprises means for performing an advertisement to the exterior of the virtual node at a fixed interval.

10. The layered network node according to claim 5, wherein said information about transmission cost is generated as the reciprocal of the total number of interfaces which are not in use to which switching capability of said layer which is included in the virtual node is allotted.

11. The layered network node according to claim 5, wherein said information about transmission cost is generated, in relation to the number of interfaces to which switching capability of said layer which is included in the virtual node is allotted which are in use, and the total number of interfaces, as the number of interfaces in use divided by the total number of interfaces.

12. The layered network node according to claim 5, wherein said information about transmission cost, between a border node within the virtual node and another border node which belongs to the same border node as said border node, is information which is determined for each layer of a Label Switch Path (LSP) which is established as the cost when establishing a Label Switch Path (LSP) of any layer.

13. The layered network node according to claim 12, wherein said cost allotment means comprise means for calculating a cost value of the path for which the value, which is obtained by adding, along the path when establishing a Label Switch Path (LSP) between a border node within the virtual node and another border node which belongs to the same border node as said border node, the link cost of the link and the node cost of the node or the virtual node, becomes minimum.

14. The layered network node according to claim 12, wherein said cost is the value which is obtained by adding the link cost of the link and the node cost of the node or the virtual node along the path of the minimum number of hops which is established between a border node within the virtual node and another border node which belongs to the same border node as said border node;

and comprising means for, if there exists a plurality of said paths of the minimum number of hops, selecting from among cost value candidates which are aggregates of a plurality of values which are obtained by said addition, as the cost value, that one for which its value becomes minimum.

15. The layered network node according to claim 13 or claim 14, wherein said value which is obtained by said addition is the reciprocal of the number of interfaces which are not in use to which switching capability of said layer which is included in the virtual nodes along said path is allotted.

16. The layered network node according to claim 13 or claim 14, wherein said value which is obtained by said addition is given, in relation to the number of interfaces to which switching capability of said layer which is included in the nodes along said path is allotted which are in use, and the total number of interfaces, by the number of interfaces used divided by the total number of interfaces.

17. The layered network node according to claim 5 or claim 12, wherein a node which corresponds to an interface of a virtual node comprises means for computing information about said transmission cost, or said cost, based upon said link state information at a time interval which is fixed in advance.

18. The layered network node according to claim 5 or claim 12, wherein a node which corresponds to an interface of a virtual node comprises means for computing information about said transmission cost, or said cost, based upon said link state information, whenever change of the utilization state of the interface within the virtual node is notified by advertisement of link state information and the utilization state of the interface changes.

19. A network comprising: one or a plurality of layers; and a layered network node which comprises:

means for mutually interchanging with other nodes link state information about a present node and links which are connected to the present node;

means for storing the link state information for one or for all of the nodes within said network which has been obtained by said interchanging means;

means for selecting a path for a Label Switch Path (LSP) of one or a plurality of types of layer, based upon the link state information which has been stored in said storing means according to an LSP establishment request; and means for changing the path which has been selected and established by said selection means, according to an LSP change request, based upon the link state information which has been stored in said storing means, wherein the network to which said node belongs is a layered network, the layered network comprises virtual networks of a plurality of levels, each of the virtual networks belonging to each level comprises one or a plurality of virtual nodes belonging to the each level, each of the virtual nodes serves as a cell, each cell comprises one or a plurality of nodes, a virtual node in a virtual network belonging to a lower level, which is a level other than the highest level, is a node in a virtual network belonging to a level higher than the lower level, and if a link exists which connects different virtual nodes of the same level or of different levels, the border between the link and each of the different virtual nodes is an interface of each of the different virtual nodes, and the layered network node further comprises a link state database which accumulates link state information which is advertised from other nodes within a virtual node to which self node belongs or from other virtual nodes, and the nodes which fulfill a function of interfacing with nodes within the virtual node or with the exterior of the virtual node are defined as border nodes, and the layered network node further comprises: a link state abstraction section comprising means for, when the present node is positioned at this border node, creating interface information for the exterior of the virtual node based upon the link state information interior to the virtual node; and an advertisement section which advertises said interface information which has been created to the exterior of the virtual node.

20. A method for layered path selection when establishing a Label Switch Path (LSP) of any layer within a network which comprises a layered network node according to claim 1, comprising the steps of:

when selecting a path from a source node to a destination node, deciding, by referring to said link state database of the lowest level 1, whether or not, among said virtual nodes of level 1, the destination node is present within a virtual node which includes the source node;

if the source node and the destination node are not present within the same virtual node, deciding, by referring to said link state database of the next higher level 2, whether or not the destination node is present within a virtual node of said level 2 which includes the source node;

by repeating this decision until the source node and the destination node are included within the same virtual node, selecting a virtual node of a level N (where N is a natural number) which includes both the source node and the destination node;

when selecting a path of level N from the source node to the destination node within self virtual node of level N which has been selected, selecting the path selection of a virtual node group which is included within said virtual node of level N which has been selected by said selection means of said level N based upon said link state database of level N;

when further selecting a path of the next lowest level (N−1) from the source node to the destination node from among the virtual nodes which are included in this path of level N which has been selected, selecting by said selection means of said level (N−1) based upon said link state database of the next lowest level (N−1) than said virtual node which has been selected; and by repeating this until the lowest level 1, selecting a path from the source node to the destination node.

21. A method for layered path selection when establishing a Label Switch Path (LSP) of any layer within a network which comprises a layered network node according to claim 1, comprising the steps of:

when selecting a path from a source node to a destination node, in a network which is made up from virtual nodes of a topmost level N, deciding, by referring to said link state database of said level N, whether or not the source node and the destination node are present within the same virtual node;

if the source node and the destination node are present within the same virtual node, deciding, by referring to said link state database of the next lower level (N−1) within self virtual node, whether or not the source node and the destination node are present within the same virtual node in the network of the next lower level (N−1) within self virtual node;

selecting a virtual node of the level (n−k) which includes both the source node and the destination node, by repeating this decision until the source node and the destination node are included within different virtual nodes, and selecting the virtual node of the next highest level (n−k) thereto (where k is a natural number);

when selecting a path of level (n−k) from the source node to the destination node within self virtual node, selecting the path selection of a virtual node group which is included within said virtual node of level (n−k) which has been selected by said selection means of said level (n−k) based upon said link state database of said level (n−k);

when further selecting a path of the next lowest level (n−k−1) from the source node to the destination node from among the virtual nodes which are included in this path of level (n−k) which has been selected, selecting by said selection means of said level (n−k−1) based upon said link state database of the next lowest level (n−k−1) than said virtual node which has been selected; and by repeating this until the lowest level 1, selecting a path from the source node to the destination node.

22. The layered path selection method according to claim 20 or claim 21, wherein, for a virtual node of a lower level than the level which includes both said source node and said destination node, the computation for selecting the path within the present node is performed by that border node, among the border nodes which are included within self virtual node, which is allotted as an input-output interface of said path.

23. The layered path selection method according to claim 20 or claim 21, wherein, for a virtual node of a lower level than the level which includes both said source node and said destination node, the computation for selecting the path within the present node is performed by that border node, among the border nodes which are included within self virtual node, which is determined in advance as a representative node.

24. A computer-readable storage medium storing a program having computer-executable instructions when executed by a processor, when establishing a Label Switch Path (LSP) of any layer within a network which comprises a layered network node according to claim 1, to execute procedures of:

when selecting a path from a source node to a destination node, deciding, by referring to said link state database of the lowest level 1, whether or not, among said virtual nodes of level 1, the destination node is present within a virtual node which includes the source node;

if the source node and the destination node are not present within the same virtual node, deciding, by referring to said link state database of the next higher level 2, whether or not the destination node is present within a virtual node of said level 2 which includes the source node;

by repeating this decision until the source node and the destination node are included within the same virtual node, selecting a virtual node of a level N (where N is a natural number) which includes both the source node and the destination node;

when selecting a path of level N from the source node to the destination node within self virtual node of level N which has been selected, selecting the path selection of a virtual node group which is included within said virtual node of level N which has been selected by said selection means of said level N based upon said link state database of level N;

when further selecting a path of the next lowest level (N−1) from the source node to the destination node from among the virtual nodes which are included in this path of level N which has been selected, selecting by said selection means of said level (N−1) based upon said link state database of the next lowest level (N−1) than said virtual node which has been selected; and by repeating this until the lowest level 1, selecting a path from the source node to the destination node.

25. A computer-readable storage medium storing a program having computer-executable instructions when executed by a processor, when establishing a Label Switch Path (LSP) of any layer within a network which comprises a layered network node according to claim 1, to execute procedures of:

when selecting a path from a source node to a destination node, in a network which is made up from virtual nodes of a topmost level N, deciding, by referring to said link state database of said level N, whether or not the source node and the destination node are present within the same virtual node;

if the source node and the destination node are present within the same virtual node, deciding, by referring to said link state database of the next lower level (N−1) within self virtual node, whether or not the source node and the destination node are present within the same virtual node in the network of the next lower level (N−1) within self virtual node;

selecting a virtual node of the level (n−k) which includes both the source node and the destination node, by repeating this decision until the source node and the destination node are included within different virtual nodes, and selecting the virtual node of the next highest level (n−k) thereto (where k is a natural number);

when selecting a path of level (n−k) from the source node to the destination node within self virtual node, selecting the path selection of a virtual node group which is included within said virtual node of level (n−k) which has been selected by said selection means of said level (n−k) based upon said link state database of said level (n−k);

when further selecting a path of the next lowest level (n−k−1) from the source node to the destination node from among the virtual nodes which are included in this path of level (n−k) which has been selected, selecting by said selection means of said level (n−k−1) based upon said link state database of the next lowest level (n−k−1) than said virtual node which has been selected; and by repeating this until the lowest level 1, selecting a path from the source node to the destination node.

26. A node comprising:

advertising means; first receiving-and-storing means; and second receiving-and-storing means;

wherein the node constitutes a virtual node of level 1 in a layered network, the layered network comprising virtual networks of a plurality of levels 1 through N, each of the virtual networks belonging to each level comprising one or a plurality of virtual nodes belonging to the each level, each of the virtual nodes serving as a cell, each cell comprising one or a plurality of nodes, a virtual node in a virtual network belonging to a lower level, which is a level other than the highest level, being a node in a virtual network belonging to a level higher than the lower level, if a link exists in said layered network which connects between different virtual nodes of the same level or of different levels, the border between the link and each of the different virtual nodes being an interface of each of the different virtual nodes, and when the highest level virtual node to which said interface is related is of level M where M≦N, said interface serving as a plurality of hierarchical interfaces of level 1 through level M, the advertising means advertises to an other node within self virtual node link information about a link which has been connected to self node and link cost information for said link, the first receiving-and-storing means receives, from an other node within self virtual node, said advertisement of link information within self virtual node and link cost information for said link, and stores said information, and the second receiving-and-storing means receives, from a node which corresponds to said interface within self virtual node, said advertisement of link information between said node and a node which corresponds to an interface with a virtual node of level 2 or greater, and link cost information for said link, and stores said information.

27. The node according to claim 26, further comprising:

means for transmitting its own IP address to a node which corresponds to an interface of self virtual node; and means for storing external IP address group information, which is information about an IP address of an other node which belongs to a virtual node other than self virtual node, and about the virtual node to which said IP address belongs, which have been transmitted from the node which corresponds to said interface.

28. The node according to claim 26, further comprising:

means for transmitting its own IP address to a node which corresponds to an interface of self virtual node; and means for requesting and obtaining, from the node which corresponds to said interface, external IP address group information, which is information about an IP address of an other node which belongs to a virtual node other than self virtual node, and about the virtual node to which said IP address belongs.

29. The node according to claim 26, further comprising:

means for transmitting its own IP address and link cost information between itself and a node which corresponds to an interface with self virtual node to the node which corresponds to said interface; and means for storing external IP address group information, which is information about an IP address of an other node which belongs to a virtual node other than self virtual node, and about the virtual node to which said IP address belongs, which has been transmitted from the node which corresponds to said interface, and link cost information from the node which corresponds to said interface to said other node, in correspondence to the IP address of said other node.

30. The node according to claim 26, further comprising:

means for transmitting its own IP address and link cost information between itself and a node which corresponds to an interface with self virtual node to the node which corresponds to said interface; and means for requesting and obtaining, from the node which corresponds to said interface, designates the IP address of said other node, external IP address group information, which is information about an IP address of an other node which belongs to a virtual node other than self virtual node, and about the virtual node to which said IP address belongs, and link cost information from the node which corresponds to said interface to said other node.

31. The node according to claim 26, further comprising means for dispatching a packet for checking reachability to the node which corresponds to said interface of self virtual node.

32. The node according to claim 31, further comprising means for computing respective link costs for nodes which correspond to a plurality of said interfaces of said virtual node, wherein said dispatching means comprise means for dispatching a packet for checking reachability to the node which corresponds to said interface for which the link cost is the least, according to the results of computation by this computation means.

33. The node according to claim 31, further comprising means for computing respective link costs for nodes which correspond to a plurality of said interfaces of said virtual node, wherein said dispatching means comprise means for dispatching packets for checking reachability to the nodes which correspond to said interfaces for which the link cost, according to the results of computation by this computation means, is the smallest in order until the nth, where n is a natural number.

34. The node according to claim 31, further comprising means for computing respective link costs for nodes which correspond to a plurality of said interfaces of said virtual node, wherein said dispatching means comprise means for dispatching packets for checking reachability to the nodes which correspond to said interfaces for which the link cost, according to the results of computation by this computation means, is the smallest in order until the nth (where n is a natural number), said packets including information about said order.

35. A node comprising:
advertising means; and receiving-and-storing means,
wherein the node constitutes a virtual node of level 1 in a layered network, the layered network comprising virtual networks of a plurality of levels 1 through N, each of the virtual networks belonging to each level comprising one or a plurality of virtual nodes belonging to the each level, each of the virtual nodes serving as a cell, each cell comprising one or a plurality of nodes, a virtual node in a virtual network belonging to a lower level, which is a level other than the highest level, being a node in a virtual network belonging to a level higher than the lower level, if a link exists in said layered network which connects between different virtual nodes of the same level or of different levels, the border between the link and each of the different virtual nodes being an interface of each of the different virtual nodes, and when the highest level virtual node to which said interface is related is of level M where M≦N, said interface serving as a plurality of hierarchical interfaces of level 1 through level M,
the advertising means advertises link information about a link which has been connected to self node to an other node within self virtual node and link cost information for said in link, and
the receiving-and-storing means receives said advertisement of link information within self virtual node and link cost information for said link from an other node within self virtual node, and stores said information.

36. The node according to claim 35, further comprising means for, ahead of path computation, requesting and obtaining, from said node which corresponds to said interface, link information between a node which corresponds to the interface with self virtual node and a node which corresponds to an interface with a virtual node of level 2 or higher, and link cost information for said link.

37. A node comprising:
advertising means; first receiving-and-storing means; and second receiving-and-storing means,
wherein the node constitutes a virtual node of level 1 in a layered network, the layered network comprising virtual networks of a plurality of levels 1 through N, each of the virtual networks belonging to each level comprising one or a plurality of virtual nodes belonging to the each level, each of the virtual nodes serving as a cell, each cell comprising one or a plurality of nodes, a virtual node in a virtual network belonging to a lower level, which is a level other than the highest level, being a node in a virtual network belonging to a level higher than the lower level, if a link exists in said layered network which connects between different virtual nodes of the same level or of different levels, the border between the link and each of the different virtual nodes being an interface of each of the different virtual nodes, and when the highest level virtual node to which said interface is related is of level M where M≦N, said interface serving as a plurality of hierarchical interfaces of level 1 through level M, wherein if self node itself corresponds to said interface:
the advertising means advertises to an other node within self virtual node link information about a link within self virtual node which has been connected to self node and link cost information for said link, and link information for a link with a node which corresponds to an interface of another virtual node which has been connected to self node, and link cost information for said link,
the first receiving-and-storing means receives, from an other node within self virtual node, said advertisement of link information within self virtual node and link cost information for said link, and stores said information, and
the second receiving-and-storing means receives, from a node which corresponds to said interface with another virtual node, advertisement of link information with a node which corresponds to said interface of a higher level, and link cost information for said link, and stores said information.

38. The node according to claim 37, further comprising:
means for gathering together and storing IP address information from other nodes within self virtual node;
means for advertising the IP address information which has been gathered together by this gathering together and storing means to a node which corresponds to an interface of another virtual node; and
means for storing external IP address information, which is information about the IP address of another node which belongs to a virtual node other than self virtual node and about the virtual node to which said IP address belongs, and which has been advertised from the node which corresponds to the interface of the other virtual node, and transmitting it to another node within self virtual node.

39. The node according to claim 37, further comprising:
means for gathering together and storing IP address information from other nodes within self virtual node;
means for advertising the IP address information which has been gathered together by this gathering together and storing means to a node which corresponds to an interface of another virtual node;

means for storing external IP address information, which is information about the IP address of another node which belongs to a virtual node other than self virtual node and about the virtual node to which said IP address belongs, and which has been advertised from the node which corresponds to the interface of the other virtual node; and means for offering the external IP address group information which has been stored in said storing means to said other nodes, according to requests from said other nodes.

40. The node according to claim 37, further comprising:

means for gathering together and storing IP address information from other nodes within self virtual node, and link cost information between said other nodes and self node;

means for advertising the IP address information and link cost information which have been gathered together by this gathering together and storing means to a node which corresponds to an interface of another virtual node; and means for storing external IP address information, which is information about the IP address of another node which belongs to a virtual node other than self virtual node and about the virtual node to which said IP address belongs, and which has been advertised from the node which corresponds to the interface of the other virtual node, and link cost information from said node which corresponds to the interface of the other virtual node to said other node, in correspondence to the IP address of said other node, and transmitting it to another node within self virtual node.

41. The node according to claim 37, further comprising:

means for gathering together and storing IP address information from other nodes within self virtual node, and link cost information between said other nodes and self node;

means for advertising the IP address information and link cost information which have been gathered together by this gathering together and storing means to a node which corresponds to an interface of another virtual node;

means for storing external IP address information, which is information about the IP address of another node which belongs to a virtual node other than self virtual node and about the virtual node to which said IP address belongs, and which has been advertised from the node which corresponds to the interface of the other virtual node, and link cost information from said node which corresponds to the interface of the other virtual node to said other node, in correspondence to said IP address of said other node; and means for offering the external IP address group information and the link cost information which have been stored in said storing means to said other nodes, according to requests from said other nodes.

42. The node according to claim 37, further comprising:

means for receiving a packet for checking reachability from another node within self virtual node;

means for collecting together IP addresses of packets which have been received by said receiving means and generating internal IP address group information which is related to nodes within self virtual node;

means for interchanging and harmonizing the internal IP address group information which has been generated by said generating means with other nodes which correspond to said interface within self virtual node and adjusting it appropriately, and synchronizing it as unified internal IP address group information for self virtual node; and means for advertising this internal IP address group information which has been unified by said synchronizing means to a node which corresponds to an interface with an other virtual node.

43. The node according to claim 37, wherein said advertisement means comprise:

means for deciding whether or not an advertisement path is present from an other node which corresponds to said interface within self virtual node to a node which corresponds to an interface with the same other virtual node; and means for, when the decision result from said decision means is "yes", performing advertisement via any advertisement path of self node or of said other node to the node which corresponds to said interface of said other virtual node.

44. The node according to claim 37, further comprising:

means for receiving a packet for checking reachability from an other node within self virtual node;

means for summarizing the IP addresses of packets which have been received by said receiving means and generating internal address group information which is related to a node within self virtual node; and means for advertising the internal IP address group information which has been generated by said generating means to the node which corresponds to the interface with the other virtual node.

45. The node according to claim 37, further comprising:

means for receiving from an other node within self virtual node a packet for checking reachability which includes information to the effect that self node is the one with the n-th cheapest link cost from the point of view of said other node;

means for summarizing the IP addresses of packets which have been received by said receiving means and generating internal IP address group information which is related to a node within self virtual node for each of said n values; and means for advertising the internal IP address group information which has been generated by said generating means to the node which corresponds to the interface with the other virtual node.

46. A node comprising:

advertising means; and receiving-and-storing means, wherein the node constitutes a virtual node of level 1 in a layered network, the layered network comprising virtual networks of a plurality of levels 1 through N, each of the virtual networks belonging to each level comprising one or a plurality of virtual nodes belonging to the each level, each of the virtual nodes serving as a cell, each cell comprising one or a plurality of nodes, a virtual node in a virtual network belonging to a lower level, which is a level other than the highest level, being a node in a virtual network belonging to a level higher than the lower level, if a link exists in said layered network which connects between different virtual nodes of the same level or of different levels, the border between the link and each of the different virtual nodes being an interface of each of the different virtual nodes, and when the highest level virtual node to which said interface is related is of level M where $M \leq N$, said interface serving as a plurality of hierarchical interfaces of level 1 through level M, wherein if self node itself corresponds to said interface:
the advertising means advertises to a node which corresponds to an interface on the same level as self node link information about a link on the same level as self node which has been connected to self node and link cost information for said link, and
the receiving-and-storing means receives, from a node which corresponds to an interface on the same level with self node, advertisement of link information with a node which corresponds to said interface on the same level with self node, and link cost information for said link, and stores said information.

47. The node according to claim 46, further comprising means for, ahead of path computation, requesting and obtaining, from said node which corresponds to said interface, link information with a node which corresponds to an interface with the next highest level than self node, and link cost information for said link.

48. The node according to any one of claims 26 through 28, wherein the source node from which a path to the destination node is to be established comprises:
determining means for determining a virtual node to which the destination node belongs, based upon the IP address of the destination node to which the path is to be established and external IP address group information; and
means for searching for a path from the source node to a node which corresponds to an interface in the virtual node which has been determined by the determining means, based upon link information of a link between a node which corresponds to an interface in self virtual node and a node which corresponds to an interface in a virtual node on level 2 or higher level, and link cost information for the link.

49. The node according to claim 48, further comprising:
means for requesting and obtaining, from a node which corresponds to an interface of a virtual node to which said destination node belongs, link information for within said virtual node, and link cost information for said link; and
means for searching for, in addition to the path which has been searched out by said means for searching out a path to a node which corresponds to an interface of a virtual node to which said destination node belongs, a path to said destination node from said node which corresponds to said interface, based upon link information which has been obtained by said requesting and obtaining means, and link cost information for said link.

50. The node according to claim 48, further comprising:
means for requesting and obtaining, from a node which corresponds to an interface of a virtual node which is included in a path from self node to said destination node, link information for within said virtual node, and link cost information for said link; and
means for searching out a path within said virtual node which is included in the path from self node to said destination node, based upon said link information and said link cost information for said link which have been obtained by said requesting and obtaining means.

51. The node according to any one of claims 26 through 28, wherein the source node from which a path to the destination node is to be established comprises:
means for determining a virtual node to which the destination node belongs, based upon the IP address of the destination node and external IP address group information; and
means for notifying the destination node of: information which specifies the level of a virtual node of the topmost level for which the computation of a path from the source node to a node corresponding to an interface in a virtual node on level 2 or higher level is possible; and information which specifies n paths having smaller link costs which have been searched from among paths from the source node to the mode corresponding to the interface in the virtual node on level 2 or higher level, based upon: information about a link between a node corresponding to an interface in self virtual node and the node corresponding to the interface in the virtual node on level 2 or higher level; and link cost information for the link, and
the destination node comprises means for searching out a path from the destination node to a node corresponding to an interface in the virtual node of the topmost level based upon the information which has been notified, and for notifying the source node of a path having the minimum link cost as a finally found path based upon combinations of the path from the destination to the node corresponding to the interface in the virtual node of the topmost level and n paths.

52. The node according to any one of claims 26, 35, 37, and 46, further comprising:
means for referring to link information which has been stored in said storing means and deciding whether or not a link which connects self virtual node and an other virtual node is connected to self node;
means for when, according to the decision result of this decision means, a link which connects self virtual node and an other virtual node is connected to self node, deciding whether or not self node corresponds to a termination point for a layer of an LSP which has been established over said link; and
means for when, according to the decision result of this decision means, self node corresponds to said termination point, recognizing that self node is a node which corresponds to said interface, and exercising a function which corresponds to said interface.

53. The node according to any one of claims 26, 35, 37, and 46, further comprising:
means for observing the resource utilization state related to self node;
means for, if, based upon the results of observation by this observation means, no room is available in the resources which are used for data transmission to another node within self virtual node and self node corresponds to said interface, along with exercising a function as a node which belongs to an other virtual node of level 1 to which self node is connected, also updating information about the virtual node to which self node belongs along with change of said associated virtual node;
means for advertising the change of contents of this updating means; and
means for, when a said advertisement has been received from an other node, updating the information about the virtual node to which self node belongs based upon said advertisement.

54. The node according to any one of claims 26, 35, 37, and 46, further comprising:
means for observing the cost of a link which is related to self node;
means for, if, based upon the results of observation by this observation means, the link cost which is used for data transmission to an other node within self virtual node is greater than a threshold value, and self node corresponds to said interface, along with activating a function as a node which belongs to an other virtual node of level 1 to which self node is connected, updating the information about the virtual node to which self node belongs along with change of said associated virtual node;

means for advertising the updated contents which have been updated by this updating means; and means for, when a said advertisement has been received from an other node, updating the information about the virtual node to which self node belongs based upon said advertisement.

55. The layered network comprising a plurality of nodes, each of the plurality of nodes being a node according to any one of claims 26, 35, 37, and 46.

56. The method for building a layered network according to claim 55, wherein, when, corresponding to a layer of an LSP which has been established in a link between self virtual node and another virtual node, a node which is endowed with a function of terminating a Label Switch Path (LSP) of said layer has terminated a Label Switch Path (LSP) of said layer, said node is established as a node which corresponds to said interface.

57. The method for building a layered network according to claim 55, wherein, when there is no capacity in resources which are used for data transmission over links which have been established between nodes, said nodes are separated into different virtual nodes.

58. The method for building a layered network according to claim 55, wherein when the link cost for data transmission over links which have been established between nodes has exceeded a threshold value, said nodes are separated into different virtual nodes.

59. The network control device which controls the plurality of nodes which make up a layered network according to claim 55, comprising means for, when, corresponding to a layer of a Label Switch Path (LSP) which has been established in a link between self virtual node and another virtual node, a node which is endowed with a function of terminating a Label Switch Path (LSP) of said layer has terminated a Label Switch Path (LSP) of said layer, establishing said node as a node which corresponds to said interface.

60. The network control device which controls the plurality of nodes which make up a layered network according to claim 55, comprising means for, when there is no vacant capacity in resources which are used for data transmission over links which have been established between nodes, dividing up said nodes into different virtual nodes.

61. The network control device which controls the plurality of nodes which make up a layered network according to claim 55, comprising means for, when the link cost for data transmission over links which have been established between nodes has exceeded a threshold value, dividing up said nodes into different virtual nodes.

* * * * *